US012652568B2

(12) United States Patent
Rahman et al.

(10) Patent No.: US 12,652,568 B2
(45) Date of Patent: Jun. 9, 2026

(54) QUANTIZING TIME-DOMAIN CHANNEL PROPERTIES

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 18/582,507

(22) Filed: Feb. 20, 2024

(65) Prior Publication Data

US 2024/0323736 A1    Sep. 26, 2024

Related U.S. Application Data

(60) Provisional application No. 63/471,122, filed on Jun. 5, 2023, provisional application No. 63/465,468, filed (Continued)

(51) Int. Cl.
| | |
|---|---|
| *H04W 24/10* | (2009.01) |
| *H04L 5/00* | (2006.01) |
| *H04W 72/0446* | (2023.01) |

(52) U.S. Cl.
CPC ........... *H04W 24/10* (2013.01); *H04L 5/0051* (2013.01); *H04L 5/0053* (2013.01); *H04W 72/0446* (2013.01)

(58) Field of Classification Search
CPC ..... H04W 24/10; H04L 5/0051; H04L 5/0053

(Continued)

(56) References Cited

U.S. PATENT DOCUMENTS

2022/0312380 A1    9/2022  Chen et al.
2025/0317779 A1*  10/2025  Lee ........................ H04W 24/10

FOREIGN PATENT DOCUMENTS

CN       114257347 A    3/2022
EP        1659748 A1    5/2006

OTHER PUBLICATIONS

"3rd Generation Partnership Project; Technical Specification Group Radio Access Network; Evolved Universal Terrestrial Radio Access (E-UTRA); Physical channels and modulation (Release 17)," 3GPP TS 36.211 V17.0.0, Dec. 2021, 250 pages.

(Continued)

*Primary Examiner* — Dang T Ton

(57)    ABSTRACT

Apparatuses and methods for quantizing time-domain channel properties. A method for operating a user equipment (UE) includes receiving a configuration about a time domain channel property (TDCP) report. The configuration includes information about K delay values $\{\tau_i\}$ for i=1, . . . , K, where K≥1. The method further includes determining, based on the configuration, TDCP amplitudes corresponding to the K delay values, respectively; determining, based on the configuration, the TDCP report; and transmitting the TDCP report. The TDCP report includes indicators $[k_1 \ldots k_K]$ indicating (i) values $[a_1 \ldots a_K]$ and (ii) corresponding TDCP amplitude values obtained from: $1-a_i$, i=1, . . . , K. A mapping from $k_i$ to $a_i$ is given in a table.

20 Claims, 15 Drawing Sheets

Related U.S. Application Data on May 10, 2023, provisional application No. 63/463,802, filed on May 3, 2023, provisional application No. 63/463,496, filed on May 2, 2023, provisional application No. 63/461,501, filed on Apr. 24, 2023, provisional application No. 63/456,748, filed on Apr. 3, 2023, provisional application No. 63/451,443, filed on Mar. 10, 2023, provisional application No. 63/448,593, filed on Feb. 27, 2023.

(58) Field of Classification Search
USPC .................................. 370/329, 401, 402, 403
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 17)," 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)," 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)," 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)," 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.

"3rd Generation Partnership Project; Technical Specification Group Radio Access Network; NR; Multiplexing and channel coding (Release 17)," 3GPP TS 38.212 V17.0.0, Dec. 2021, 190 pages.

"3rd Generation Partnership Project; Technical Specification Group Radio Access Network; NR; Physical layer procedures for data (Release 17)," 3GPP TS 38.214 V17.0.0, Dec. 2021, 217 pages.

Fraunhofer IIS et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)," 3GPP TS 38.211 V17.0.0, Dec. 2021, 134 pages.

International Search Report and Written Opinion issued May 30, 2024 regarding International Application No. PCT/KR2024/002415, 8 pages.

Ericsson, "On CSI enhancements for Rel-18 NR MIMO evolution", 3GPP TSG-RAN WG1 Meeting #112, R1-2301526, Feb. 2023, 50 pages.

Cewit et al., "Discussion on CSI Enhancements for high/medium UE velocities and coherent JT (CJT)", 3GPP TSG RAN WG1 Meeting #109-e, R1-2204748, May 2022, 6 pages.

European Search Report dated Mar. 26, 2026, in connection with European Application No. 24764145.9, 13 pages.

Ericsson, "On CSI enhancements for Rel-18 NR MIMO evolution," R1-2303783, 3GPP TSG-RAN WG1 Meeting #112bis-e, e-meeting, Apr. 17-21, 2023, 46 pages.

MediaTek Inc., "Csi enhancement," R1-2305669, 3GPP TSG RAN WG1 #113, Incheon, Korea, May 22-26, 2023, 14 pages.

* cited by examiner

1100

Port layout 3D grid of beams in
(1st port dim., 2nd port dim., freq. dim.)

$O_3 N_3 - 1$

Frequency dim.

2nd port dim.

$O_2 N_2 - 1$

0

1

1

0

0 1 2

$O_1 N_1 - 1$

1st port dim.

1400

1800

Receive a configuration about a TDCP report.          ~1810

Determine TDCP amplitudes corresponding to *K* delay values.          ~1820

Determine the TDCP report.          ~1830

Transmit the TDCP report.          ~1840

QUANTIZING TIME-DOMAIN CHANNEL PROPERTIES

CROSS-REFERENCE TO RELATED APPLICATION AND CLAIM OF PRIORITY

This application claims priority under 35 U.S.C. § 119(e) to U.S. Provisional Patent Application No. 63/448,593 filed on Feb. 27, 2023, U.S. Provisional Patent Application No. 63/451,443 filed on Mar. 10, 2023, U.S. Provisional Patent Application No. 63/456,748 filed on Apr. 3, 2023, U.S. Provisional Patent Application No. 63/461,501 filed on Apr. 24, 2023, U.S. Provisional Patent Application No. 63/463, 496 filed on May 2, 2023, U.S. Provisional Patent Application No. 63/463,802 filed on May 3, 2023, U.S. Provisional Patent Application No. 63/465,468 filed on May 10, 2023, and U.S. Provisional Patent Application No. 63/471,122 filed on Jun. 5, 2023. The above-identified provisional patent applications are hereby incorporated by reference in their entirety.

TECHNICAL FIELD

The present disclosure relates generally to wireless communication systems and, more specifically, quantization of the time-domain channel properties and reporting of the quantized time-domain channel properties.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for quantization for reporting of time-domain channel properties.

In one embodiment, a user equipment (UE) is provided. The UE includes a transceiver configured to receive a configuration about a time domain channel property (TDCP) report. The configuration includes information about K delay values $\{\tau_i\}$ for i=1, ..., K, where K≥1. The UE further includes a processor operably coupled to the transceiver. The processor, based on the configuration, is configured to determine TDCP amplitudes corresponding to the K delay values, respectively, and determine the TDCP report. The transceiver is further configured to transmit the TDCP report. The TDCP report includes indicators [$k_1$ ... $k_K$] indicating (i) values [$a_1$ ... $a_K$] and (ii) corresponding TDCP amplitude values obtained from: 1−$a_i$, i=1, ..., K. A mapping from $k_i$ to $a_i$ is given in a table.

In another embodiment, a base station (BS) is provided. The BS includes a processor and a transceiver operably coupled to the processor. The transceiver is configured to transmit a configuration about a TDCP report, the configuration including information about K delay values $\{\tau_i\}$ for i=1, ..., K, where K≥1; and receive the TDCP report that includes indicators [$k_1$ ... $k_K$] indicating (i) values [$a_1$ ... $a_K$] and (ii) TDCP amplitude values obtained from: 1−$a_i$, i=1, ..., K. A mapping from $k_i$ to $a_i$ is given in a table.

In yet another embodiment, a method for operating a UE is provided. The method includes receiving a configuration about a TDCP report. The configuration includes information about K delay values $\{\tau_i\}$ for i=1, ..., K, where K≥1. The method further includes determining, based on the configuration, TDCP amplitudes corresponding to the K delay values, respectively; determining, based on the configuration, the TDCP report; and transmitting the TDCP report. The TDCP report includes indicators [$k_1$ ... $k_K$] indicating (i) values [$a_1$ ... $a_K$] and (ii) corresponding TDCP amplitude values obtained from: 1−$a_i$, i=1, ..., K. A mapping from $k_i$ to $a_i$ is given in a table.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit." "receive." and "communicate." as well as derivatives thereof, encompass both direct and indirect communication. The terms "include" and "comprise." as well as derivatives thereof, mean inclusion without limitation. The term "or" is inclusive, meaning and/or. The phrase "associated with." as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRA WINGS

For a more complete understanding of the present disclosure and its advantages, reference is now made to the following description taken in conjunction with the accompanying drawings, in which like reference numerals represent like parts:

DETAILED DESCRIPTION

Figure 1:
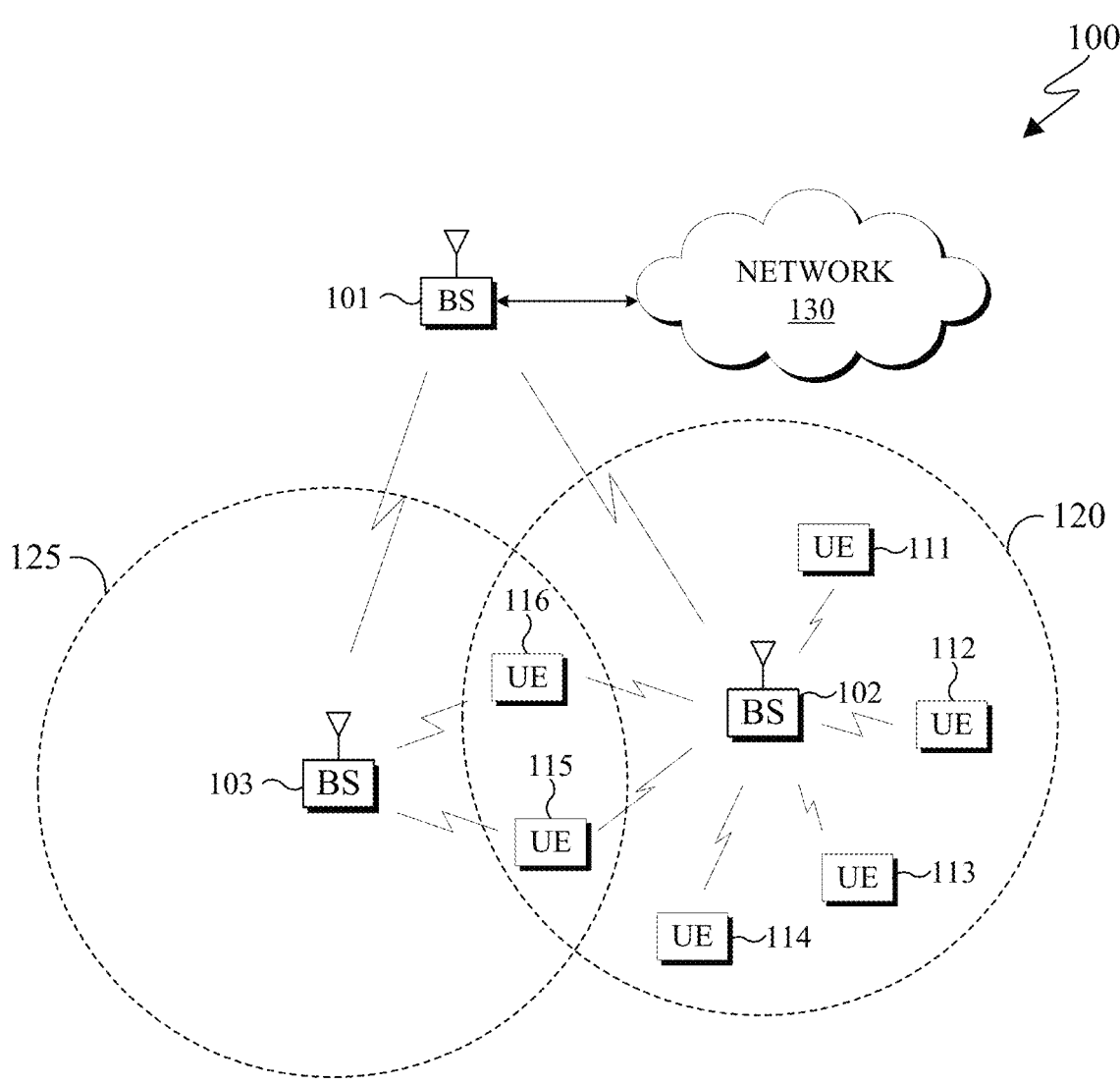
FIG. 1 illustrates an example wireless network according to embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0. "E-UTRA, Physical Layer Procedures" (herein "REF 3"); 3GPP TS 36.321 v17.0.0. "E-UTRA, Medium Access Control (MAC) protocol specification" (herein "REF 4"); 3GPP TS 36.331 v17.0.0. "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); and 3GPP TS 38.211 v17.0.0, "E-UTRA, NR, Physical channels and modulation" (herein "REF 10").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets. "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz. or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz. (THz) bands.

Figure 2:
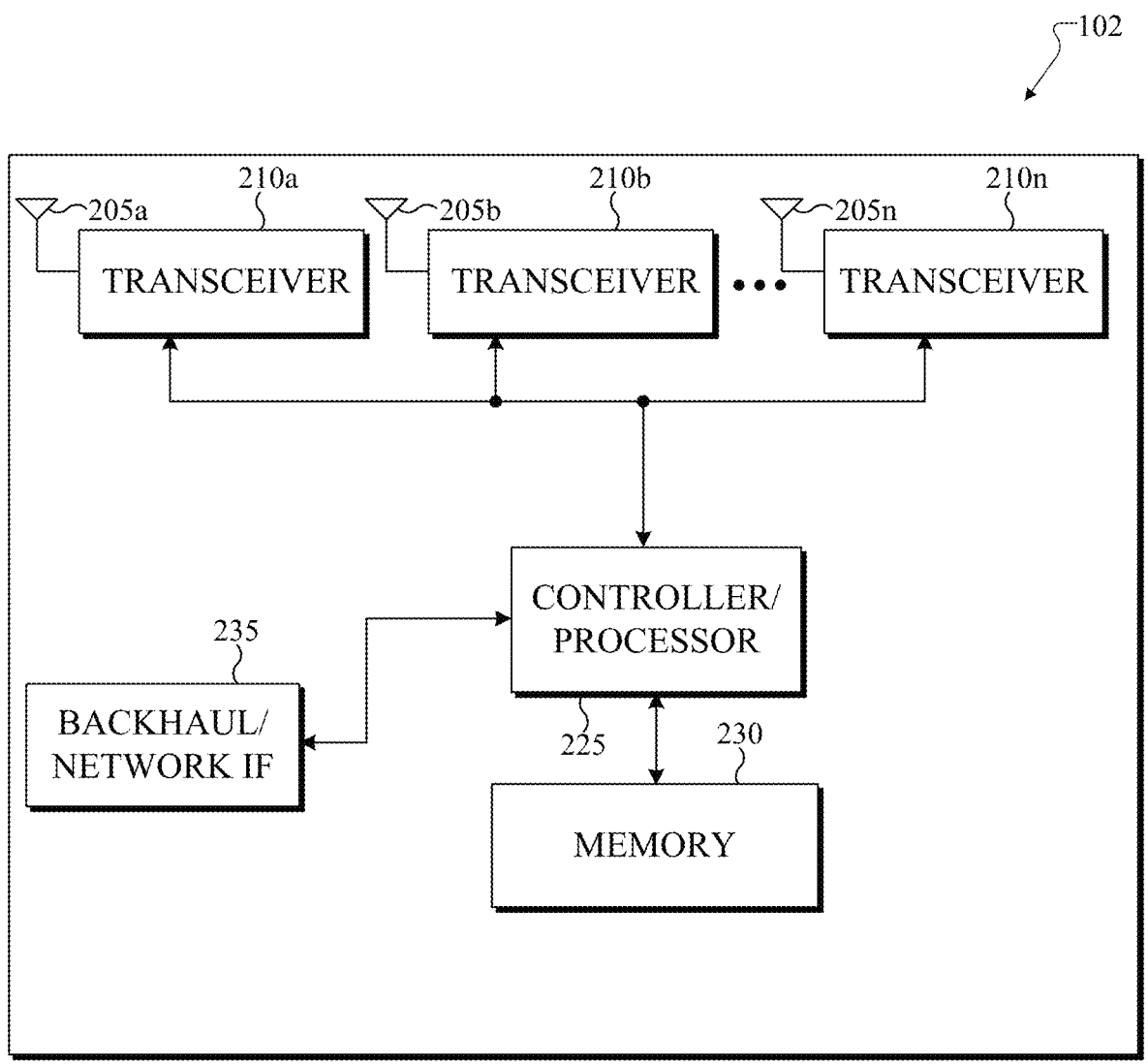
FIG. 2 illustrates an example gNodeB (gNB) according to embodiments of the present disclosure.
Figure 3:
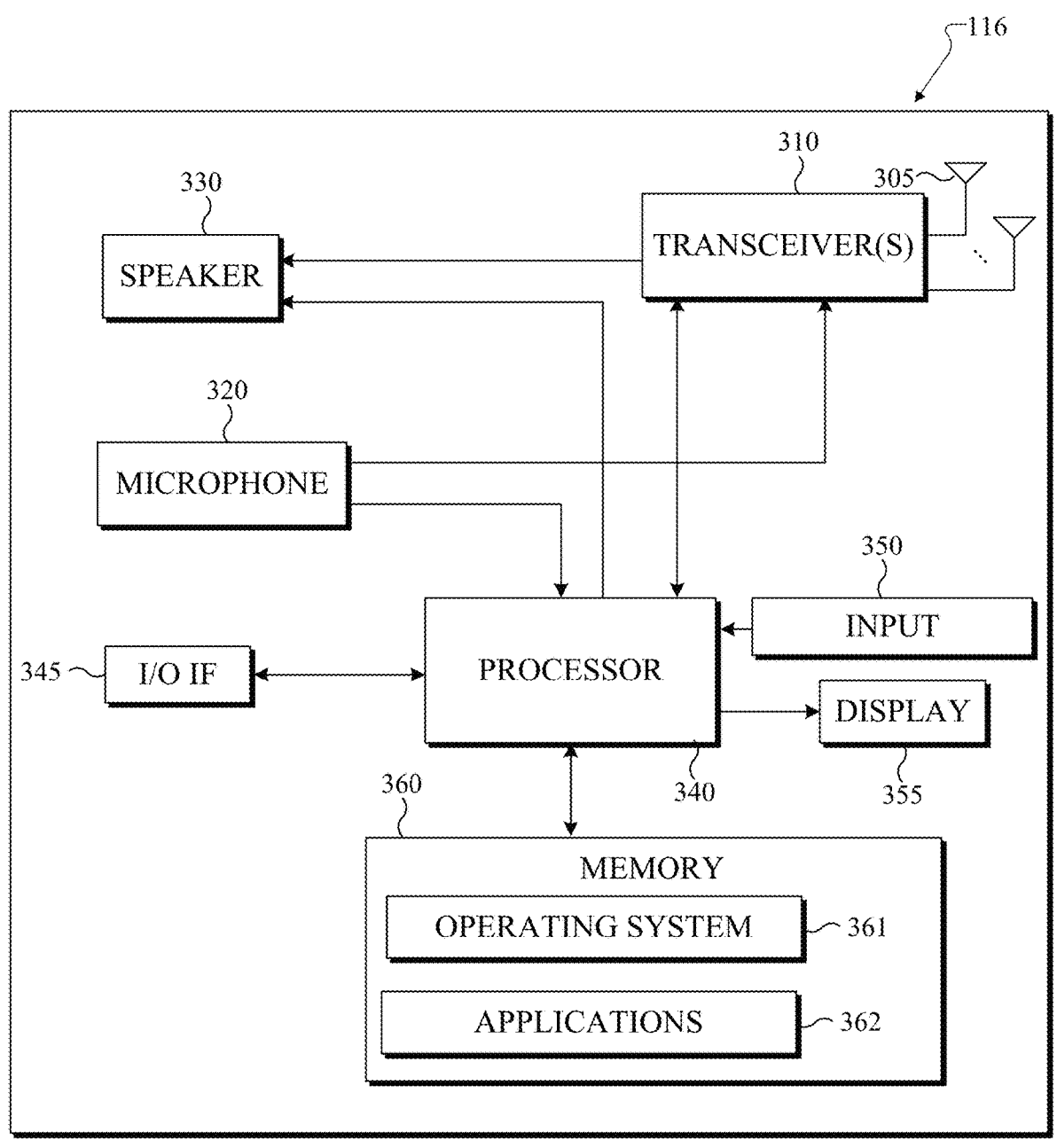
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device," For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for reporting of time-domain channel properties. In certain embodiments, one or more of the BSs 101-103 include circuitry, programing, or a combination thereof for supporting reporting of time-domain channel properties.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for reporting of time-domain channel properties. Any of a wide variety of other functions could be supported in the gNB 102 by the controller/processor 225.

The controller/processor 225 is also capable of executing programs and other processes resident in the memory 230, such as processes for supporting reporting of time-domain channel properties. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for reporting of time-domain channel properties. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone. UEs could be configured to operate as other types of mobile or stationary devices.

Figures 4, 5:
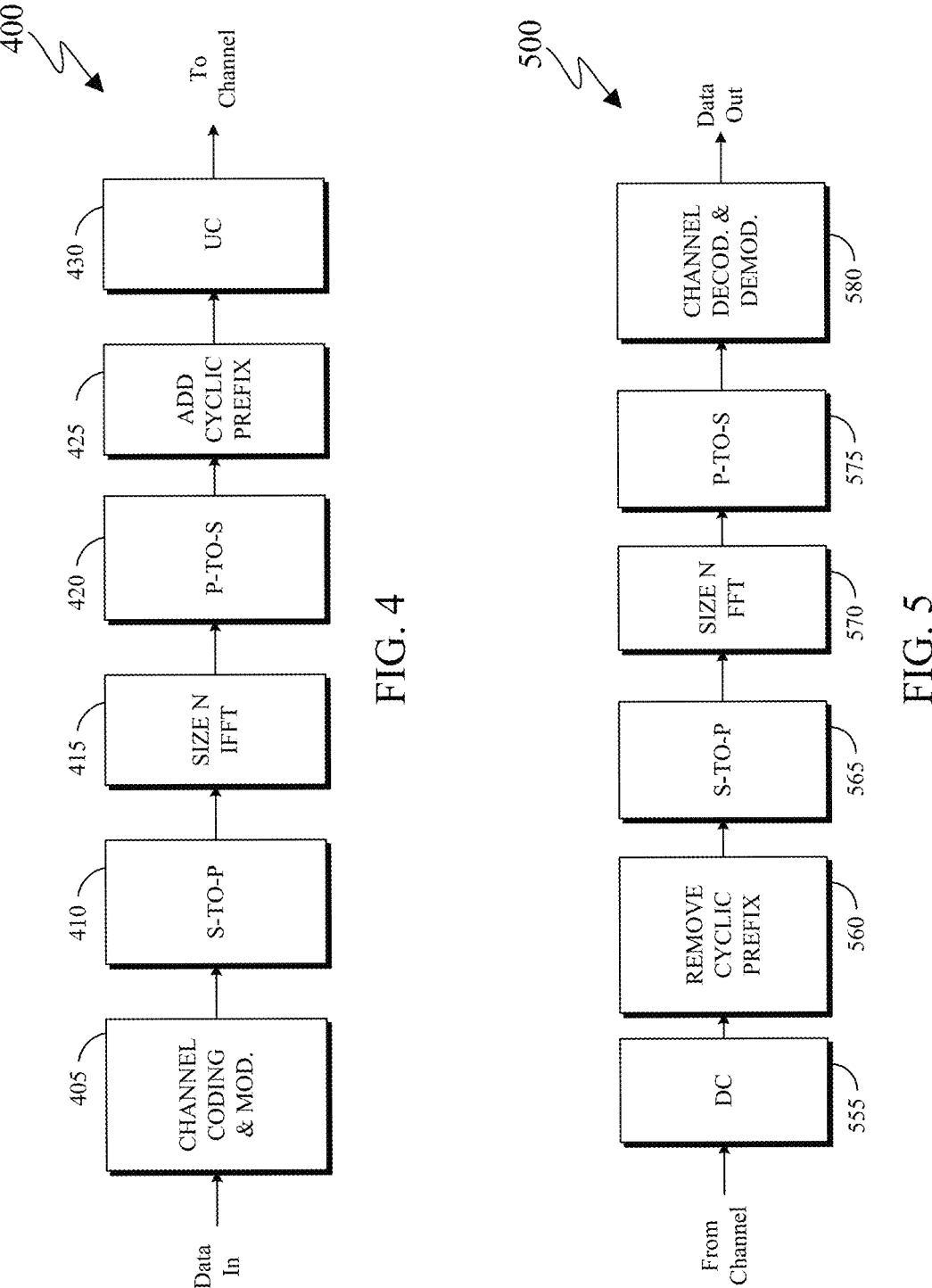
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to support reporting of time-domain channel properties as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the down-link from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB} REs$$

for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

A UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $$N_{symb} = 2 \cdot \left( N_{symb}^{UL} - 1 \right) - N_{SRS}, \text{ where } N_{SRS} = 1$$

if a last subframe (or slot) symbol is used to transmit SRS and $N_{SRS}=0$ otherwise.

Figure 6:
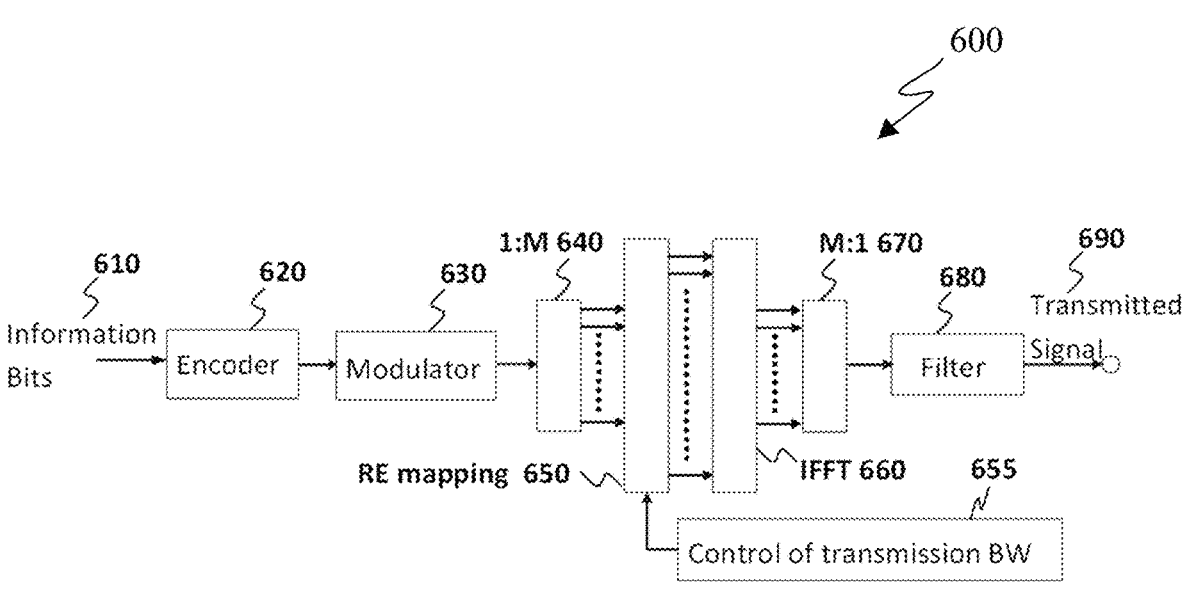
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
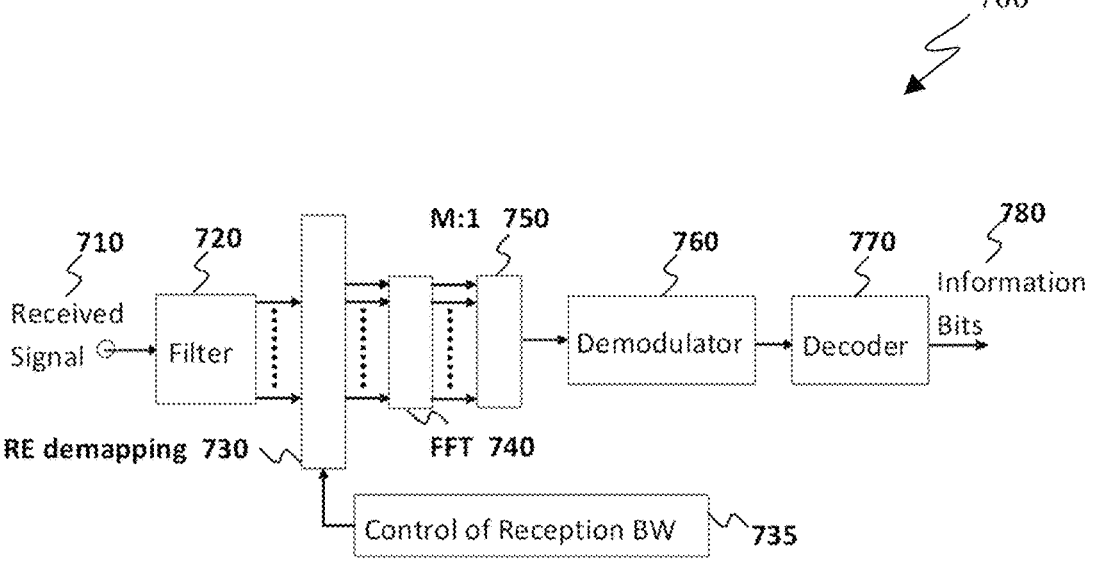
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
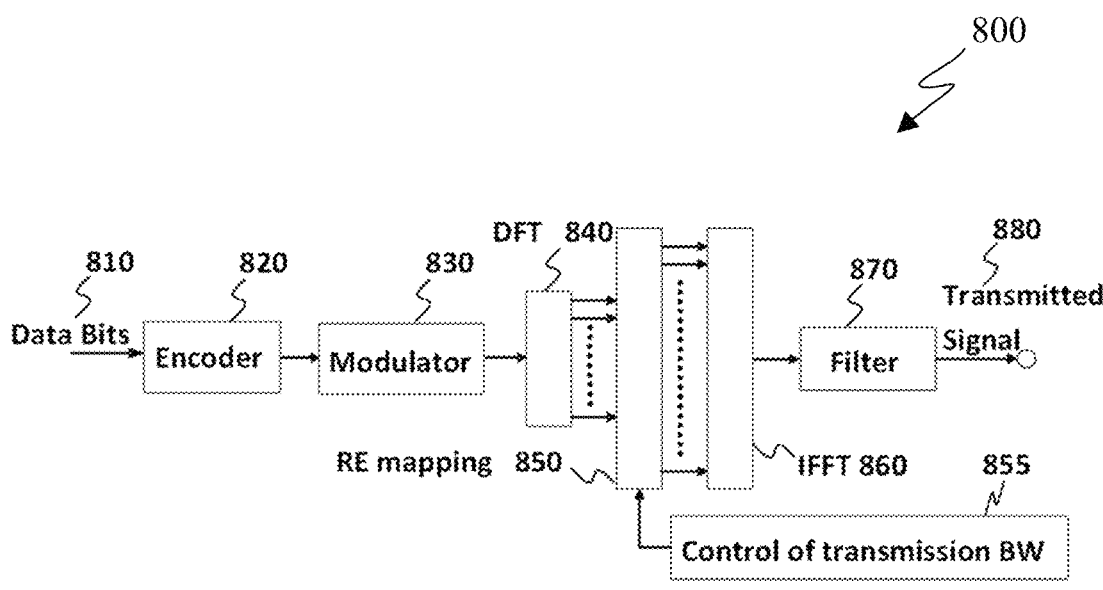
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
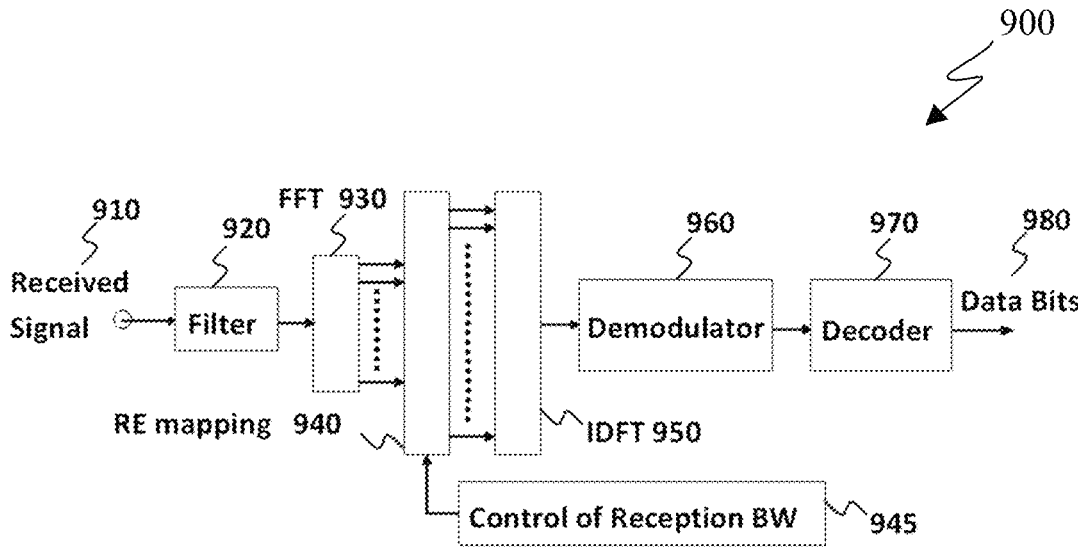
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
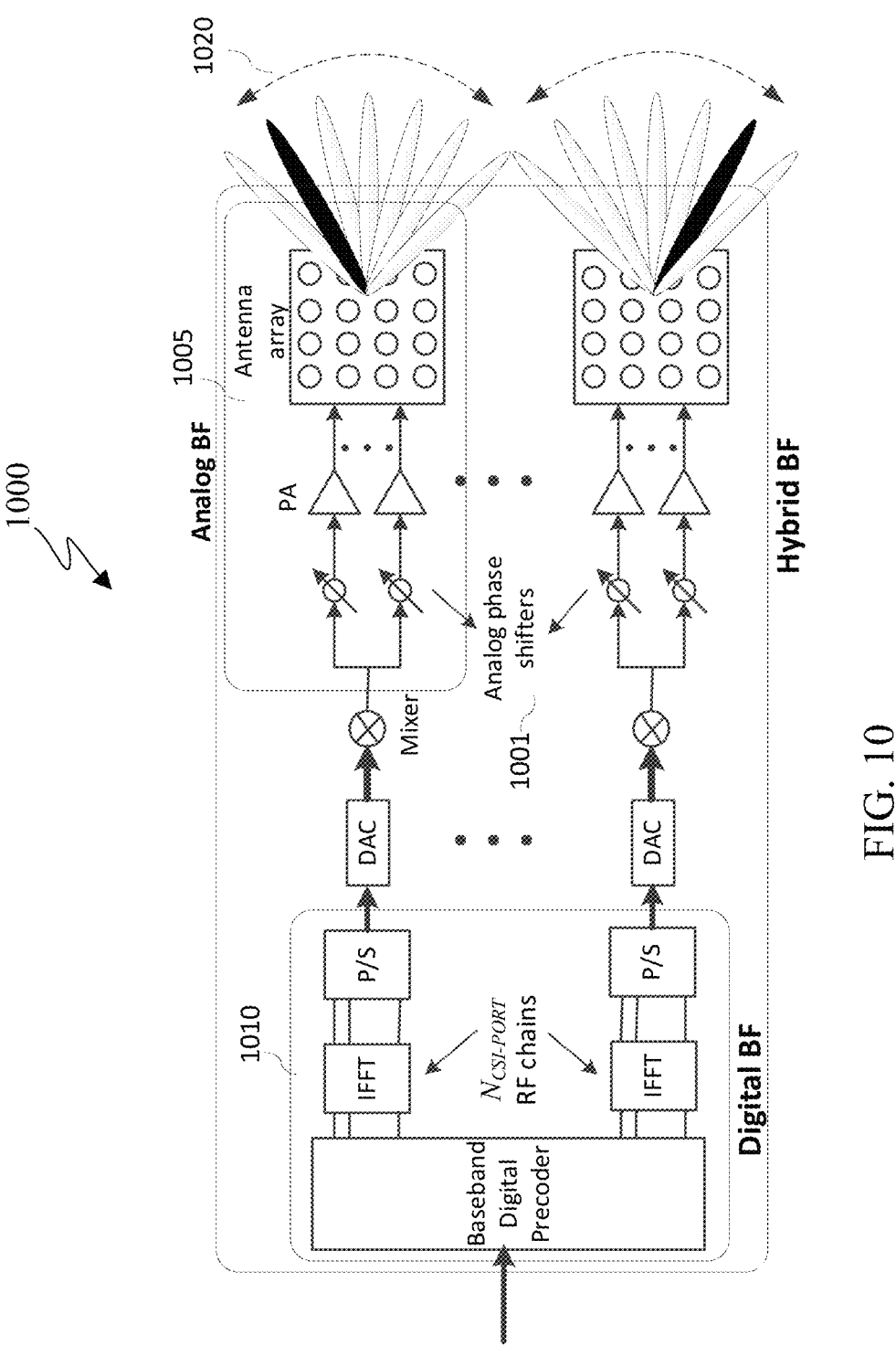
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports-which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is an important factor. For this reason, three types of CSI reporting mechanism corresponding to three types of CSI-RS measurement behavior are supported in Rel. 13 LTE: 1) 'CLASS A' CSI reporting which corresponds to non-precoded CSI-RS. 2) CLASS B' reporting with K=1 CSI-RS resource which corresponds to UE-specific beamformed CSI-RS. 3) CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (comprising multiple ports). Here, (at least at a given time/frequency) CSI-RS ports have narrow beam widths and hence not cell wide coverage, and (at least from the gNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

Embodiments of the present disclosure recognize that in a wireless communication system. MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

Various embodiments of the present disclosure recognize that measuring an RS burst is needed in order to obtain the Doppler components of the channel. Accordingly, various embodiments of the present disclosure provide mechanisms for measuring an RS burst (measuring time varying channel over a measurement window) and reporting of time-domain channel properties (TDCP), such as Doppler components of the channel or correlation values for one or more lags/delays.

In addition, various embodiments of the present disclosure provide mechanisms for reporting of TDCP (such as Doppler components of the channel), and multiplexing the TDCP report on UCI. Those embodiments of the present disclosure provide mechanisms related to acquisition of TDCP at the gNB and to reporting TDCP based on a tracking reference signal (TRS) based RS burst measurement, including TDCP multiplexed with UCI on PUSCH (UCI part 1 and UCI part 2). For PUSCH, various embodiments provide mechanisms for reporting TDCP on only one of UCI part 1 and UCI part 2, and on both UCI part 1 and UCI part 2, and when on UCI part 2, where in one of multiple of groups G0, G1, and G2.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
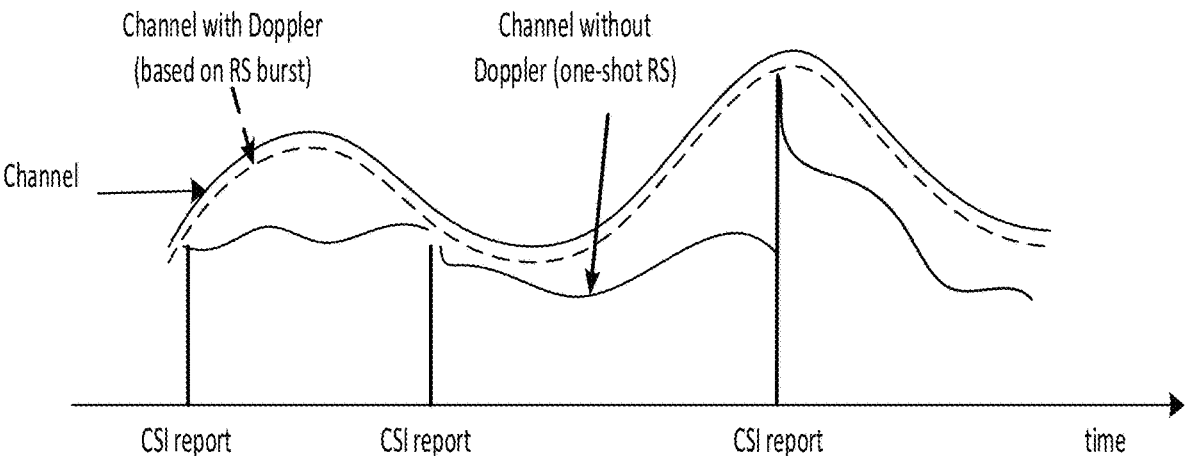
FIG. 11 illustrates an example of channel measurement with and without Doppler components according to embodiments of the present disclosure.

FIG. 11 illustrates an example of channel measurement with and without Doppler components 1100 according to embodiments of the present disclosure. The embodiment of the channel measurement with and without Doppler components 1100 illustrated in FIG. 11 is for illustration only. FIG. 11 does not limit the scope of this disclosure to any particular implementation of the channel measurement with and without Doppler components.

When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Alternatively, the gNB can use the obtained Doppler components of the UL channel to beamform CSI-RS for CSI reporting by the UE. An illustration of channel measurement with and without Doppler components is shown in FIG. 11. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHZ, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
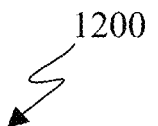
FIG. 12 illustrates an example antenna port layout according to embodiments of the present disclosure.
Figure 12:
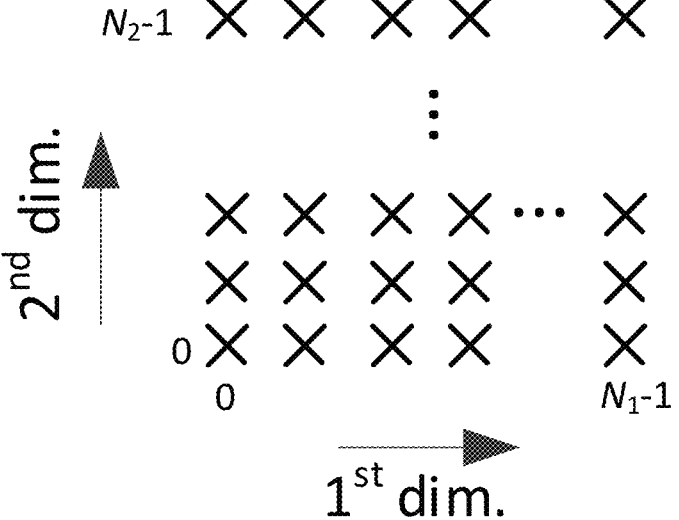

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout.

As illustrated in FIG. 12, $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. Therefore, for a dual-polarized antenna port layout, the total number of antenna ports is $2N_1N_2$ when each antenna maps to an antenna port. An illustration is shown in FIG. 12 where "X" represents two antenna polarizations. In this disclosure, the term "polarization" refers to a group of antenna ports. For example, antenna ports j=X+0, X+1, . . . , $X+P_{CSIRS}/2-1$ comprise a first antenna polarization, and antenna ports j=X+$P_{CSIRS}$/2, X+$P_{CSIRS}$/2+1, . . . , X+$P_{CSIRS}$-1 comprise a second antenna polarization, where $P_{CSIRS}$ is a number of CSI-RS antenna ports and X is a starting antenna port number (e.g., X=3000, then antenna ports are 3000, 3001, 3002, . . . ).

Figure 13:
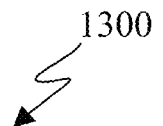
FIG. 13 illustrates a 3D grid of oversampled discrete Fourier transform (DFT) beams according to embodiments of the present disclosure.

FIG. 13 illustrates a 3D grid of oversampled DFT beams 1300 according to embodiments of the present disclosure. The embodiment of the 3D grid of oversampled DFT beams 1400 illustrated in FIG. 13 is for illustration only. FIG. 13 does not limit the scope of this disclosure to any particular implementation of the 3D grid of oversampled DFT beams.

As illustrated, FIG. 13 shows a 3D grid 1300 of the oversampled DFT beams (1st port dim., 2nd port dim., freq. dim.) in which a 1st dimension is associated with the 1st port dimension,
a 2nd dimension is associated with the 2nd port dimension, and a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.5 of REF8, a UE is configured with higher layer parameter codebookType set to 'typeII-r16' for an enhanced Type II CSI reporting in which the pre-coders for all SBs (or FD units) and for a given layer l=1, . . . v, where v is the associated RI value, is given by either $$W^l = AC_l B^H =$$ (Eq. 1)

$$[a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H =$$ (Eq. 2)

$$\begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$

$$[b_0 b_1 \ldots b_{M-1}]^H = \begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where:
$N_1$ is a number of antenna ports in a first antenna port dimension (having the same antenna polarization),
$N_2$ is a number of antenna ports in a second antenna port dimension (having the same antenna polarization),
$P_{CSI-RS}$ is a number of CSI-RS ports configured to the UE,
$N_3$ is a number of SBs for PMI reporting or number of FD units or number of FD components (that comprise the CSI reporting band) or a total number of precoding matrices indicated by the PMI (one for each FD unit/component),
$a_i$ is a $2N_1N_2 \times 1$ (Eq. 1) or $N_1N_2 \times 1$ (Eq. 2) column vector, or $a_i$ is a $P_{CSIRS} \times 1$ (Eq. 1) or $P_{CSIRS}/2 \times 1$ port selection column vector, where a port selection vector is a defined as a vector which contains a value of 1 in one element and zeros elsewhere,
$b_f$ is a $N_3 \times 1$ column vector,
$c_{l,i,f}$ is a complex coefficient.
In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$, where

19

$x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1}\sum_{f=0}^{M_i-1} c_{l,i,f}(a_i b_{i,f}^H) \qquad (Eq.\ 3)$$

and $$W^l = \begin{bmatrix} \sum_{i=0}^{L-1}\sum_{f=0}^{M_i-1} c_{l,i,f}(a_i b_{i,f}^H) \\ \sum_{i=0}^{L-1}\sum_{=0}^{M_i-1} c_{l,i+L,f}(a_i b_{i,f}^H) \end{bmatrix}, \qquad (Eq.\ 4)$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $W^{(R)}=1/\sqrt{R}[W^1\ W^2\ \ldots\ W^R]$. Eq. 2 is considered in the rest of the disclosure. The embodiments of the disclosure, however, are general and are also application to Eq. 1, Eq. 3 and Eq. 4.

Here $L \leq P_{CSI-RS}/2$ and $M \leq N_3$. If $L=P_{CSI-RS}/2$, then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \ldots & e^{j\frac{2\pi \cdot (N_3-1)n_{3,l}^{(f)}}{O_3 N_3}} \end{bmatrix}^T.$$

When $O_3=1$, the FD basis vector for layer $l \in \{1, \ldots, \upsilon\}$ (where $\upsilon$ is the RI or rank value) is given by $$w_f = \begin{bmatrix} y_{0,l}^{(f)} & y_{1,l}^{(f)} & \ldots & y_{N_3-1,l}^{(f)} \end{bmatrix}^T, \text{ where } y_{t,l}^{(f)} =$$

$$e^{j\frac{2\pi t n_{3,l}^{(f)}}{N_3}} \text{ and } n_{3,l} = \begin{bmatrix} n_{3,l}^{(0)}, \ldots, n_{3,l}^{(M-1)} \end{bmatrix} \text{ where } n_{3,l}^{(f)} \in \{0, 1, \ldots, N_3-1\}.$$

In another example, discrete cosine transform DCT basis is used to construct/report basis B for the $3^{rd}$ dimension. The m-th column of the DCT compression matrix is simply given by $$[W_f]_{nm} =$$

$$\begin{cases} \frac{1}{\sqrt{K}}, & n=0 \\ \sqrt{\frac{2}{K}}\cos\frac{\pi(2m+1)n}{2K}, & n=1, \ldots K-1 \end{cases}, \text{ and } K=N_3, m=0, \ldots, N_3-1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad (Eq.\ 5)$$

where $A=W_1$ corresponds to the Rel. 15 $W_1$ in Type II CSI codebook [REF8], and $B=W_f$.

The $C_f=\tilde{W}_2$ matrix comprises of all the required linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($p_{l,i,f}$) is reported as $$p_{l,i,f} = p_{l,i,f}^{(1)} p_{l,i,f}^{(2)}$$

where $$p_{l,i,f}^{(1)}$$

is a reference or first amplitude which is reported using an A1-bit amplitude codebook where A1 belongs to $\{2, 3, 4\}$, and $$p_{l,i,f}^{(2)}$$

is a differential or second amplitude which is reported using an A2-bit amplitude codebook where A2≤A1 belongs to $\{2, 3, 4\}$.

For layer 1, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 \leq \lceil \beta \times 2LM \rceil < 2LM$ and β is higher layer configured. The remaining $2LM-K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*, f*), where $X=\lceil \log_2 K_{NZ}\rceil$ or $\lceil \log_2 2L \rceil$.

i. Strongest coefficient $c_{l,i^*,f^*}=1$ (hence its amplitude/phase are not reported)

Two antenna polarization-specific reference amplitudes is used.

i. For the polarization associated with the strongest coefficient $c_{l,i*,f*}=1$, since the reference amplitude $$P_{l,i,f}^{(1)} = 1,$$

it is not reported ii. For the other polarization, reference amplitude $$p_{l,i,f}^{(1)}$$

is quantized to 4 bits

1. The 4-bit amplitude alphabet is $\{1, (1/2)^{1/4}, (1/4)^{1/4}, (1/8)^{1/4}, \ldots, (1/2^{14})^{1/4}\}$.

For $\{c_{l,i,f}, (i, f) \neq (i*, f*)\}$:

i. For each polarization, differential amplitudes $p_{l,i,f}^{(2)}$ of the coefficients calculated relative to the associated polarization-specific reference amplitude and quantized to 3 bits 1. The 3-bit amplitude alphabet is $\{1, 1/\sqrt{2}, 1/2, 1/2\sqrt{2}, 1/4, 1/4\sqrt{2}, 1/8, 1/8\sqrt{2}\}$.

2. Note: The final quantized amplitude $p_{l,i,f}$ is given by $$p_{l,i,f}^{(1)} \times p_{l,i,f}^{(2)}$$

ii. Each phase is quantized to either 8PSK ($N_{ph}=8$) or 16PSK ($N_{ph}=16$) (which is configurable).

For the polarization $r* \in \{0,1\}$ associated with the strongest coefficient $c_{l,i*,f*}$, we have $r*=\lfloor i*/L \rfloor$ and the reference amplitude $$p_{l,i,f}^{(1)} = p_{l,r*}^{(1)} = 1.$$

For the other polarization $r \in \{0,1\}$ and $r \neq r*$, we have $r=(\lfloor i*/L \rfloor+1) \bmod 2$ and the reference amplitude $$p_{l,i,f}^{(1)} = p_{l,r}^{(1)}$$

is quantized (reported) using the 4-bit amplitude codebook mentioned above.

A UE can be configured to report M FD basis vectors. In one example, $M=\lceil p \times N_3/R \rceil$, where R is higher-layer configured from $\{1,2\}$ and p is higher-layer configured from $\{1/4, 1/2\}$. In one example, the p value is higher-layer configured for rank 1-2 CSI reporting. For rank >2 (e.g., rank 3-4), the p value (denoted by $v_0$) can be different. In one example, for rank 1-4, $(p, v_0)$ is jointly configured from $\{(1/2, 1/4), (1/4, 1/4), (1/8, 1/8)\}$, i.e., $M=\lceil p \times N_3/R \rceil$ for rank 1-2 and $M=\lceil v_0 \times N_3/R \rceil$ for rank 3-4. In one example, $N_3=N_{SB} \times R$ where $N_{SB}$ is the number of SBs for CQI reporting. In the rest of the disclosure, M is replaced with $M_v$ to show its dependence on the rank value $v$, hence p is replaced with $p_v$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{1, \ldots, v\}$ of a rank v CSI reporting. Alternatively, a UE can be configured to report $M_v$ FD basis vectors in two-step as follows.

In step 1, an intermediate set (InS) comprising $$N_3' < N_3$$

basis vectors is selected/reported, wherein the InS is common for all layers.

In step 2, for each layer $l \in \{1, \ldots, v\}$ of a rank $v$ CSI reporting, $M_v$ FD basis vectors are selected/reported freely (independently) from $N'_3$ basis vectors in the InS.

In one example, one-step method is used when $N_3 \leq 19$ and two-step method is used when $N_3 > 19$. In one example, $$N_3' = \lceil \alpha M_v \rceil$$

where $\alpha > 1$ is either fixed (to 2 for example) or configurable.

The codebook parameters used in the DFT based frequency domain compression (Eq. 5) are (L, $p_v$ for $v \in \{1,2\}$, $p_v$ for $v \in \{3,4\}$, $\beta$, $\alpha$, $N_{ph}$). The set of values for these codebook parameters are as follows.

L: the set of values is $\{2,4\}$ in general, except $L \in \{2, 4, 6\}$ for rank 1-2, 32 CSI-RS antenna ports, and R=1.

($p_v$ for $v \in \{1,2\}$, $p_v$ for $v \in \{(1/2, 1/4), (1/4, 1/4), (1/4, 1/8)\}$.

$\beta \in \{1/4, 1/2, 3/4\}$.

$N_{ph}=16$.

The set of values for these codebook parameters are as in Table A.

TABLE A

| paramCombination | L | $P_v$ | | $\beta$ |
|---|---|---|---|---|
| | | $v \in \{1, 2\}$ | $v \in \{3, 4\}$ | |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

In Rel. 17 (further enhanced Type II port selecting codebook), $M \in \{1,2\}$, $$L = \frac{K_1}{2}$$

where $K_1 = \alpha \times P_{CSIRS}$, and codebook parameters (M, $\alpha$, $\beta$) are configured from Table B.

TABLE B

| paramCombination-r17 | M | $\alpha$ | $\beta$ |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |

TABLE B-continued

| paramCombination-r17 | M | α | β |
|---|---|---|---|
| 6 | 2 | ¾ | ½ |
| 7 | 2 | 1 | ½ |
| 8 | 2 | 1 | ¾ |

The above-mentioned framework (Eq. 5) represents the precoding-matrices for multiple ($N_3$) FD units using a linear combination (double sum) over 2L (or $K_1$) SD beams/ports and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows.

$$W = A_l C_l B_l^H = W_1 \tilde{W}_2 W_t^H, \qquad \text{(Eq. 5A)}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The remainder of the present disclosure is applicable to both space-frequency (Eq. 5) and space-time (Eq. 5A) frameworks.

Various embodiments of the present disclosure provide mechanisms for measuring a CS-RS burst that can be used to obtain time-domain (TD) or Doppler-domain (DD) component(s)/properties of the channel. The measured channel can be used to report TDCP or DD components, either alone (separate) or together with the other CSI components (e.g., based on space-frequency compression). For reporting, TDCP or DD components need to be quantized. The present disclosure provides several examples of quantization schemes when the TDCP or DD components corresponds to $Y \geq 1$ (auto-)correlation values corresponds to Y lags/delays/taps measured based on the CSI-RS burst. In one example, the CSI-RS burst can be at least one TRS resource, i.e., a NZP CSI-RS resource configured for tracking.

Various embodiments of the present disclosure provide a UE configured to measure at least one CS-RS burst to obtain/report time-domain channel properties (TDCP). The TDCP report can either be a standalone (separate) report or multiplexed together with the other CSI components (e.g., CSI or beam report). A CSI-RS burst can be based on one or multiple TRS resources (i.e., a NZP CSI-RS resource configured for tracking), where when multiple, the TRS resources can be periodic/semi-persistent (P/SP) or aperiodic (AP) or a combination (e.g., 1 AP, and the rest P/SP).

Various embodiments of the present disclosure provide mechanisms for measuring a CS-RS burst that can be used to obtain time-domain (TD) or Doppler-domain (DD) component(s)/properties of the channel. The measured channel can be used to report TDCP or DD components, either alone (separate) or together with the other CSI components (e.g., based on space-frequency compression).

Figure 14:
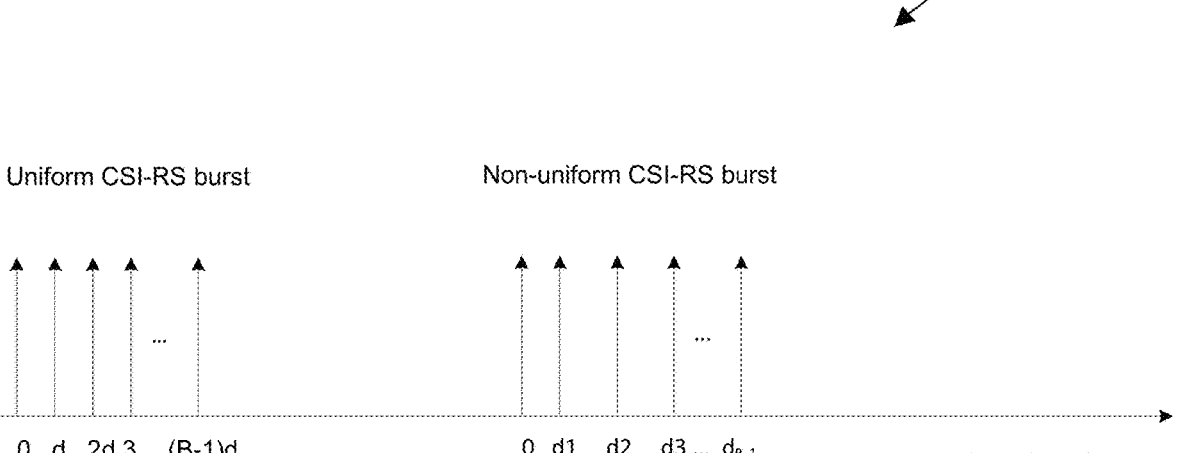
FIG. 14 illustrates an example of a UE configured to receive a burst of non-zero power (NZP) CSI reference signal (CSI-RS) resources according to embodiments of the present disclosure.

FIG. 14 illustrates an example of a UE configured to receive a burst of non-zero power (NZP) CSI reference signal (CSI-RS) resources 1400 according to embodiments of the present disclosure. The embodiment of the UE configured to receive a burst of non-zero power (NZP) CSI reference signal (CSI-RS) resources 1400 illustrated in FIG. 14 is for illustration only. FIG. 1400 does not limit the scope of this disclosure to any particular implementation of the UE configured to receive a burst of non-zero power (NZP) CSI reference signal (CSI-RS) resources 1400.

In one embodiment, as shown in FIG. 14, a UE is configured to receive a burst of non-zero power (NZP) CSI-RS resource(s), referred to as CSI-RS burst for brevity, in B time slots comprising a measurement window, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1 = d_1$, $e_2 = d_2 - d_1$, $e_3 = d_3 - d_2$, ..., so on, where $e_i \neq e_j$ for at least one pair (i, j) with i≠j.

In one example, the UE receives the CSI-RS burst, estimates the B instances of the DL channel measurements, and uses the channel estimates to obtain the TDCP or DD component(s) of the DL channel. The CSI-RS burst can be linked to (or associated with) a single CSI reporting setting (e.g., via higher layer parameter CSI-ReportConfig), wherein the corresponding CSI report includes an information about the TDCP or Doppler component(s) of the DL channel.

In one example, the UE receives the CSI-RS burst, estimates the B instances of the DL channel measurements, and uses the channel estimates to obtain/determine the TDCP report. The CSI-RS burst can be linked to (or associated with) a single CSI reporting setting (e.g., via higher layer parameter CSI-ReportConfig), wherein the corresponding CSI report includes (or corresponds to) the TDCP report.

In one example, the UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, ..., B-1\}$. When the DL channel estimate in slot t is a matrix $G_t$ of size $N_{Rx} \times N_{Tx} \times N_{Sc}$, then $h_t = \text{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, $1 \to 2 \to 3 \to$ and so on, implying that the concatenation starts from the first dimension, then moves second dimension, and continues until the last dimension. Let $H_B = [h_0 \ h_1 \ ... \ h_{B-1}]$ be a concatenated DL channel. The TDCP report can be obtained based on $H_B$. Further, the Doppler component(s) of the DL channel can be obtained based on $H_B$. For example, $H_B$ can be represented as $$C\Phi^H = \sum_{s=0}^{N-1} c_s \phi_s^H$$

where $\Phi=[\phi_0\ \phi_1\ \ldots\ \phi_{N-1}]$ is a Doppler domain (DD) basis matrix whose columns comprise basis vectors, $C=[c_0\ c_1\ \ldots\ c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix $\Phi$ and the coefficient matrix C. Likewise. TDCP (e.g., $Y\geq 1$ correlation values can also be obtained based on $H_B$, details as described below.

Figure 15:
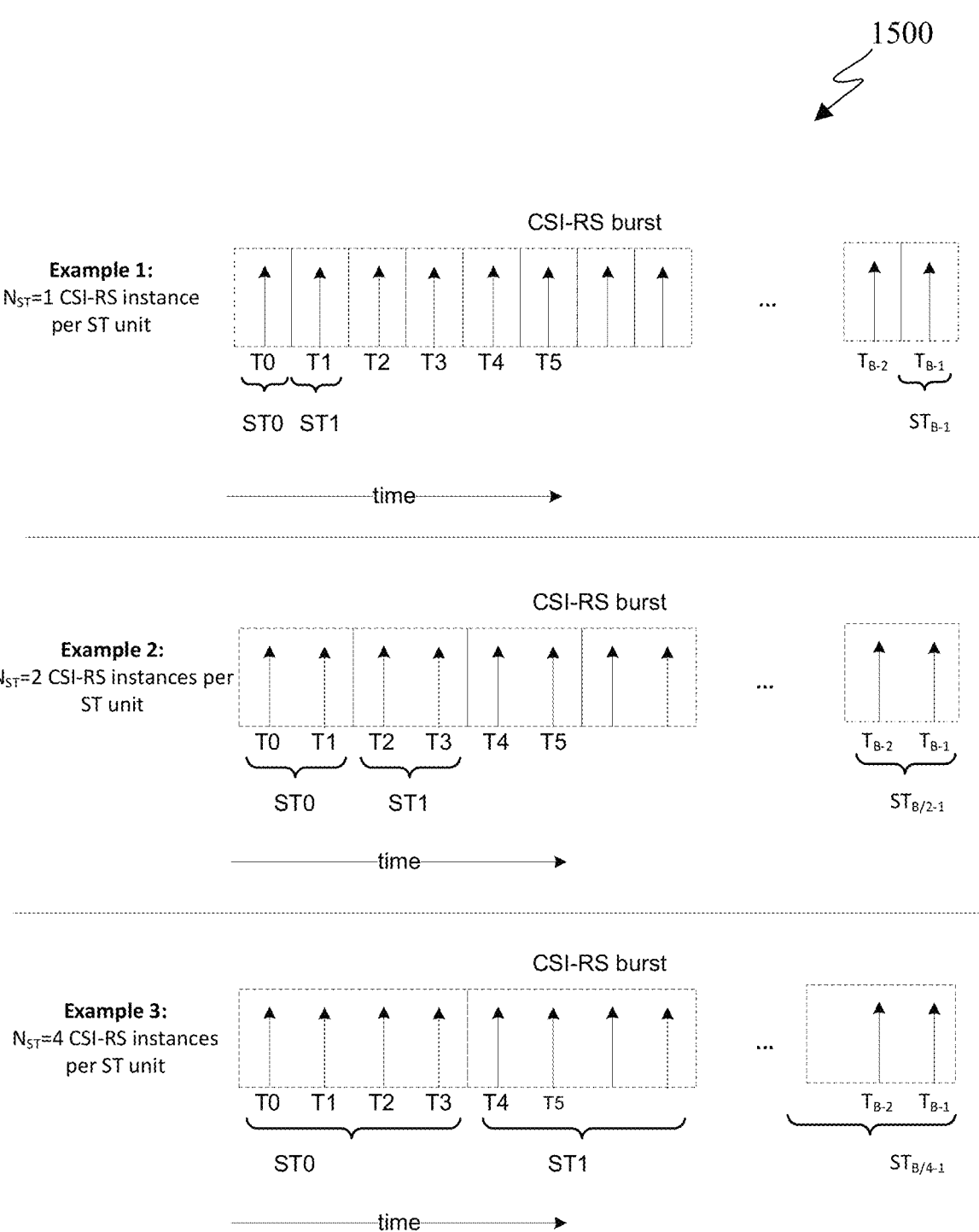
FIG. 15 illustrates an example of a UE configured to determine a value of $N_4$ based on the value B in a CSI-RS burst according to embodiments of the present disclosure.

FIG. 15 illustrates an example of a UE configured to determine a value of $N_4$ based on the value B in a CSI-RS burst 1500 according to embodiments of the present disclosure. The embodiment of the UE configured to determine a value of $N_4$ based on the value B in a CSI-RS burst 1500 illustrated in FIG. 15 is for illustration only. FIG. 15 does not limit the scope of this disclosure to any particular implementation of the UE configured to determine a value of $N_4$ based on the value B in a CSI-RS burst 1500.

Let $N_4$ be the length of the DD basis vectors $\{\phi_s\}$, e.g., each basis vector is a length $N_4 \times 1$ column vector.

In one embodiment, a UE is configured to determine/report a CSI report, where the CSI report includes TDCP or Doppler component(s) of the channel. Such a configuration can be via higher layer CSI-ReportConfig including reportQuantity or reportQuantity-r18 set to 'new quantity' or 'TDCP' or 'DD', where 'new quantity' corresponds to at least one of the following.

In one example, 'new quantity' or 'TDCP' or 'DD' is (or is based on or corresponds to) Doppler spread.

In one example, 'new quantity' or 'TDCP' or 'DD' is (or is based on or corresponds to) Doppler shift.

In one example, "new quantity" or 'TDCP' or 'DD' is (or is based on or corresponds to) UE speed.

In one example, 'new quantity' or 'TDCP' or 'DD' is (or is based on or corresponds to) time-domain correlation or time-domain (auto-) correlation.

In one example, a linear prediction model is assumed to predict channel coefficient(s) (amplitude/phase) variations over time.

In one example, the linear prediction model corresponds to $c_t=p_1\times c_{t-1}$, where $c_t$ is a predicted channel coefficient at time slot t, and $p_1$ is a predictor coefficient. When t=1 (reference time), $c_0$ is a reference predictor coefficient, which can correspond to a reference (e.g., CSI reference resource) or a latest (TypeII) CSI reported in an earlier slot.

In one example, the linear prediction model corresponds to $c_t=p_1\times c_{t-1}+p_2\times c_{t-2}$, where $c_t$ is a predicted channel coefficient at time slot t, and $p_i$ for i=1, 2 is a predictor coefficient. When t=1 (reference time), $c_0$ is a reference predictor coefficient, which can correspond to a reference (e.g., CSI reference resource) or a latest (TypeII) CSI reported in an earlier slot.

In one example, the linear prediction model corresponds to $$c_t = \sum_{i=1}^{p} p_i c_{t-i},$$

where p is a number (length) of predictor coefficients, $c_t$ is a predicted channel coefficient at time slot t, and $p_i$ for i=1, 2 is a predictor coefficient. When t=1 (reference time), $c_0$ is a reference predictor coefficient, which can correspond to a reference (e.g., CSI reference resource) or a latest (TypeII) CSI reported in an earlier slot.

In one example, a time-domain or DD compression is used to report time domain correlation. For example, a CSI-RS burst (e.g., based on a TRS) measured within a measurement window, details as described in this disclosure, can be used to obtain time-domain channel measurements within the measurement window and a Type II (linear combination of basis vectors) like framework is comprised to report compressed time-domain or DD channel components. In one example, the reported content includes a set of N basis vectors (e.g., TD or DD basis vectors) $\Phi=[\phi_0\ \phi_1\ \ldots\ \phi_{N-1}]$ (e.g., DFT) and corresponding coefficients $\{c_0,\ \ldots\ c_{N-1}\}$. In one example, vectors $\phi_0\ \phi_1\ \ldots\ \Sigma_{N-1}$ can be length-N orthogonal DFT vectors. In one example, each coefficient is represented as $c_n=a_n\phi_n$, where $a_n$ and $\phi_n$ respectively are amplitude (or power) and phase values. In one example, amplitude/phase of all N coefficients are reported. In one example, amplitude/phase of N−1 coefficients are reported, and amplitude/phase of the one remaining coefficient $c_{n*}$ is not reported. The amplitude/phase of the coefficient $c_{n*}$ can be fixed (e.g., to 1). The index n* of the coefficient $c_{n*}$ can be fixed (e.g., to 1), or reported (e.g., as part of the reporting as the strongest/reference coefficient index), or is configured to the UE (e.g., via higher layer, or MAC CE, or DCI).

In one example, the time domain correlation reporting corresponds to $Y=K\geq 1$ or $K\geq 1$ (normalized) time domain correlation(s) calculated lag(s) or delay(s) or tap(s) $\tau_k$ where k=0, 1, ... , K−1. The details of such reporting are provided herein.

In the present disclosure, the notation K and Y may be used interchangeably to indicate the number of delay values.

In one embodiment, a UE is configured with a CSI reporting (e.g., via higher layer) associated with at least one CSI-RS resource for tracking (i.e., at least one TRS resource) or multiple TRS resources), where the CSI report includes a quantized version of time domain correlation(s) associated with $Y=K\geq 1$ or $K\geq 1$ delays or lags or taps, which can be calculated based on a correlation (or auto-correlation) profile of the measured DL channel. Before quantization, the time domain correlation(s) can be normalized (e.g., divided) by a reference, where the reference can be fixed (e.g., delay/tap=0 or 1 or the first non-zero delay/tap based on the measured TRS resource, or the reference can be configured (e.g., via higher layer) or reported by the UE (as part of the CSI report, either via part 1 or part 2 of a two-part UCI). In one example, the normalized value can also be reported by the UE. In one example, the notation K for the number of taps/lags/delays is replaced with Y.

As described above (and also later in this disclosure), the TDCP therefore can be defined as (wideband if one value if reported for entire CSI reporting band) normalized correlation between two CSI-RS resources or two CSI-RS occasions (of one or two CSI-RS resources), from a NZP-CSI-RS-ResourceSet configured with higher layer parameter trs-info, that are separated by a delay $\tau$, where $\tau=D_n$ is an n-th delay value from a set of $Y\geq 1$ delay values $\{D_1, \ldots, D_Y\}$. In one example, $D_n$ is in terms of number of OFDM symbols, and the set $\{D_n\}$ of can be configured via higher layer (RRC).

When the K tap/lag values are fixed or configured to the UE, the CSI report includes the K correlation or auto-correlation values corresponding to the K lags/taps.

When the K tap/lag values are also reported by the UE, the CSI report includes both (A) K tap/lag values, and (B) the K correlation or auto-correlation values corresponding to the K lags/taps.

The UE determines/calculates the correlation (or auto-correlation) profile of the measured DL channel, which corresponds to N time domain correlation values associated with N delays/taps/lags, and selects K (out of N) 'strongest' delays/lags/taps whose time domain correlation (or auto-correlation) values are 'strong', e.g., the absolute value of the correlation (or auto-correlation) is the highest/largest. In one or more embodiments, N≥K, or N=K.

Or, the UE determines/calculates the correlation (or auto-correlation) profile of the measured DL channel, which corresponds to K normalized correlation values associated with K delays/taps/lags.

In one example, the unit of the lag/delay/tap values is in terms of number of time slots.

In one example, the unit of the lag/delay/tap values is in terms of number of OFDM symbols.

In one example, at least one of the following examples is used/configured regarding the calculation of time domain correlation(s).

In one example, the time domain correlation for a delay/lag/tap $\tau$ can be calculated in the frequency domain as $$c(\tau) = \frac{1}{\gamma} \sum_{s=1}^{S} \sum_{f=0}^{F-1} (Q),$$

where $$Q = X_{t_2^{(s)},f} X_{t_1^{(s)},f}^* \text{ or } X_{t_1^{(s)},f} X_{t_2^{(s)},f}^* \text{ or } X_{t_1^{(s)},f}^* X_{t_2^{(s)},f} \text{ or }$$

$$X_{t_2^{(s)},f}^* X_{t_1^{(s)},f}, \gamma \text{ or } Y_f\left(t_1^{(s)} + \tau\right) Y_f^*\left(t_1^{(s)}\right)$$

assuming $$t_2^{(s)} - t_1^{(s)} = \tau,$$

we have $$X_{t_2^{(s)},f} = Y_f\left(t_1^{(s)} + \tau\right)$$

$$X_{t_1^{(s)},f} = Y_f\left(t_1^{(s)}\right)\right), \gamma \text{ or } X_{t_1^{(s)},f} = Y_f\left(t_1^{(s)}\right)$$

is a normalization factor, S is the number of symbol pairs such that their (relative) tap/lag is $\tau$, i.e., $$t_2^{(s)} - t_1^{(s)} = \tau, F$$

is the number of subcarriers carrying the TRS resource(s) for measurement, and $X_{t,f}$ is the TRS resource measured at a time-frequency RE location (t, f). In one example, $\gamma$=SF. In one example, $$\gamma = \frac{1}{2} \sum_{s=1}^{S} \sum_{f=0}^{F-1} \left(X_{t_1^{(s)},f} X_{t_1^{(s)},f}^* + X_{t_2^{(s)},f} X_{t_2^{(s)},f}^*\right).$$

In one example, $$\gamma = \sqrt{\sum_{s=1}^{S} \sum_{f=0}^{F-1} \left|X_{t_1^{(s)},f}\right|^2} \sqrt{\sum_{s=1}^{S} \sum_{f=0}^{F-1} \left|X_{t_2^{(s)},f}\right|^2}.$$

If S=1, then $$c(\tau) = \frac{1}{\gamma} \sum_{f=0}^{F-1} (Q), \text{ where } Q = X_{t_2,f} X_{t_1,f}^*$$

or $X_{t_1,f} X_{T_2,f}^*$ or $X_{t_1,f}^* X_{t_2,f}$ or $X_{t_2,f}^* X_{t_1,f}$ or $$Y_f(t_1 + \tau) Y_f^*(t_1)$$

(assuming $t_2 - t_1 = \tau$, we have $X_{t_2,f} = Y_f(t_1 + \tau)$ and $X_{t_1,f} = Y_f(t_1)$).

Alternatively, $$c(\tau) = \frac{1}{\gamma} \sqrt{\sum_{s=1}^{S} \sum_{f=0}^{F-1} \left(X_{t_2^{(s)},f} X_{t_1^{(s)},f}^*\right)}.$$

In one example, $\gamma = \sqrt{SF}$. In one example $$\gamma = \sqrt{\frac{1}{2} \sum_{s=1}^{S} \sum_{f=0}^{F-1} \left(X_{t_1^{(s)},f} X_{t_1^{(s)},f}^* + X_{t_2^{(s)},f} X_{t_2^{(s)},f}^*\right)}.$$

In one example, $$\gamma^2 = \sqrt{\sum_{s=1}^{S} \sum_{f=0}^{F-1} \left|X_{t_1^{(s)},f}\right|^2} \sqrt{\sum_{s=1}^{S} \sum_{f=0}^{F-1} \left|X_{t_2^{(s)},f}\right|^2}.$$

Alternatively, $$c(\tau) = \frac{1}{\gamma} \left|\sum_{s=1}^{S} \sum_{f=0}^{F-1} \left(X_{t_2^{(s)},f} X_{t_1^{(s)},f}^*\right)\right|$$

or $$\frac{1}{\gamma} \text{abs}\left(\sum_{s=1}^{s} \sum_{f=0}^{F-1} \left(X_{t_2^{(s)},f} X_{t_1^{(s)},f}^*\right)\right).$$

In one example, $\gamma$=SF. In one example, $$\gamma = \left|\frac{1}{2} \sum_{s=1}^{S} \sum_{f=0}^{F-1} \left(X_{t_1^{(s)},f} X_{t_1^{(s)},f}^* + X_{t_2^{(s)},f} X_{t_2^{(s)},f}^*\right)\right|.$$

Alternatively, $$c(\tau) = \frac{1}{\gamma} \sqrt{\left|\sum_{s=1}^{S} \sum_{f=0}^{F-1} \left(X_{t_2^{(s)},f} X_{t_1^{(s)},f}^*\right)\right|}.$$

In one example, $\gamma=\sqrt{SF}$. In one example, $$\gamma = \sqrt{\frac{1}{2}\left|\sum_{s=1}^{S}\sum_{f=0}^{F-1}\left(X_{t_1^{(s)},f}X_{t_1^{(s)},f}^* + X_{t_2^{(s)},f}X_{t_2^{(s)},f}^*\right)\right|},$$

In one example, the normalization factor $\gamma$ is used to ensure that amplitude of the correlation value is between 0 and 1.

In one example, the time domain correlation for a delay/lag/tap $\tau$ can be calculated in the frequency domain as $d(\tau)=|c(\tau)|sign(c(\tau))$, where $c(\tau)$ is according to one or more examples herein, and $sign(x)$ is the sign of a number x, i.e., $sign(x)=+1$ when $x\geq0$ and $sign(x)=-1$ when $x<0$, or i.e., $sign(x)=+1$ when $x>0$ and $sign(x)=-1$ when $x<0$, and $sign(x)=0$ when $x=0$.

In one example, the time domain correlation for a delay/lag/tap $\tau$ can be calculated in the time domain as $$c(\tau) = \frac{1}{\gamma}\sum_{s=1}^{S}\sum_{d=0}^{D-1}\left(Y_{t_2^{(s)},d}Y_{t_1^{(s)},d}^*\right),$$

where $Y_{t,d}=ifft(X_{t,f})$ $\gamma$ is a normalization factor, S is the number of symbol pairs such that their (relative) tap/lag is $\tau$, $$\text{i.e., } t_2^{(s)} - t_1^{(s)} = \tau, T$$

is the number of time delays associated with the TRS resource(s) for measurement, and $Y_{t,d}$ is the TRS resource associated with a time delay pair (t, d). In one example, $\gamma=SF$. In one example, $$\gamma = \frac{1}{2}\sum_{s=1}^{S}\sum_{f=0}^{F-1}\left(Y_{t_1^{(s)},d}Y_{t_1^{(s)},d}^* + Y_{t_2^{(s)},d}Y_{t_2^{(s)},d}^*\right).$$

Alternatively, $$c(\tau) = \frac{1}{\gamma}\sqrt{\sum_{s=1}^{S}\sum_{f=0}^{F-1}\left(Y_{t_2^{(s)},d}Y_{t_1^{(s)},d}^*\right)}.$$

In one example, $\gamma=\sqrt{SF}$. In one example, $$\gamma = \sqrt{\frac{1}{2}\sum_{s=1}^{S}\sum_{f=0}^{F-1}\left(Y_{t_1^{(s)},d}Y_{t_1^{(s)},d}^* + Y_{t_2^{(s)},d}Y_{t_2^{(s)},d}^*\right)}.$$

Alternatively, $$c(\tau) = \frac{1}{\gamma}\left|\sum_{s=1}^{S}\sum_{f=0}^{F-1}\left(Y_{t_2^{(s)},d}Y_{t_1^{(s)},d}^*\right)\right|$$

or $$\frac{1}{\gamma}abs\left(\sum_{s=1}^{s}\sum_{f=0}^{F-1}\left(Y_{t_2^{(s)},d}Y_{t_1^{(s)},d}^*\right)\right).$$

In one example, $\gamma=SF$. In one example, $$\gamma = \left|\frac{1}{2}\sum_{s=1}^{S}\sum_{f=0}^{F-1}\left(Y_{t_1^{(s)},d}Y_{t_1^{(s)},d}^* + Y_{t_2^{(s)},d}Y_{t_2^{(s)},d}^*\right)\right|.$$

Alternatively, $$c(\tau) = \frac{1}{\gamma}\sqrt{\left|\sum_{s=1}^{S}\sum_{f=0}^{F-1}\left(Y_{t_2^{(s)},d}Y_{t_2^{(s)},d}^*\right)\right|}.$$

In one example, $\gamma=\sqrt{SF}$. In one example, $$\gamma = \sqrt{\frac{1}{2}\left|\sum_{s=1}^{S}\sum_{f=0}^{F-1}\left(Y_{t_1^{(s)},d}Y_{t_1^{(s)},d}^* + Y_{t_2^{(s)},d}Y_{t_2^{(s)},d}^*\right)\right|}.$$

In one example, the time domain correlation for a delay/lag/tap $\tau$ can be calculated in the time domain as $d(\tau)=|c(\tau)|sign(c(\tau))$, where $c(\tau)$ is according to one or more examples herein.

In one example, at least one of the following examples is used/configured regarding the number of TRS resource(s) configured for reporting/calculation of time domain correlation(s).

In one example, the UE is configured with such CSI reporting based on a M=1 TRS resource (i.e., intra TRS reporting). Let p be the periodicity of the TRS resource, then the set of candidate lag values include $\tau=0$, p, 2p, . . . , i.e., $\tau \in \{n\times p: n=0, 1, 2 . . . \}$. In one example, p can be configured via higher layer parameter periodicityAndOffset in IE NZP-CSI-RS-Resource that configures the TRS resource.

In one example, the maximum value of n is fixed (e.g., n=1 or 2).

In one example, the maximum value of n is configured (e.g., via RRC).

In one example, the maximum value of n is determined based on a threshold on the correlation (auto-correlation value), e.g., the value of n is such that the corresponding correlation $c(n^*)$ is $c(n^*)\geq thr\times c(0)$, where thr is a threshold value (fixed, configured, or reported by the UE).

In one example, the set of values of n for the candidate lag values for the CSI reporting is fixed (e.g., n=0, 1, 2).

In one example, the set of values of n for the candidate lag values for the CSI reporting is configured (e.g., via RRC).

In one example, the set of values of n for the candidate lag values for the CSI reporting is determined based on a threshold on the correlation (auto-correlation value).

In one example, the UE is configured with such CSI reporting based on M>1 TRS resources or TRS resource sets (i.e., inter TRS reporting). The multiple TRS resources or TRS resource sets can be configured via a TRS resource set (e.g., multiple TRS resources in the same TRS resource set) or multiple TRS resource sets (e.g., 2 sets).

In one example, M=2. Let $p_1$ and $p_2$ be the periodicities of the two TRS resources and $o_1$ and $o_2$ be the offsets of the two TRS resources. In one example, $p_i$ and $o_i$ can be configured via higher layer parameter periodicityAndOffset in IE NZP-CSI-RS-Resource corresponding to the i-th TRS resource.

In one example, $p_1=p_2=p$, then the set of candidate lag values S includes at least one of $S_0$, $S_1$, and $S_2$, where $S_0=\{\tau=0, p, 2p, . . . \}$, i.e., $\{\tau=np:n=0, 1, 2 . . . \}$.

$S_1=\{\tau=D_1, D_1+p, D_1+2p . . . \}$, i.e., $\{\tau=D_1+np:n=0, 1, 2 . . . \}$. Here $D_1=o_2-o_1$ or $o_1-o_2$.

$S_2 = \{\tau=D_2, D_2+p, D_2+2p \ldots\}$, i.e., $\{\tau=D_2+np:n=0, 1, 2 \ldots\}$. Here $D_2=p-o_2+o_1$ or $p-o_1+o_2$.

In one example, $p_1 \neq p_2$, then the set of candidate lag values S includes at least one of $S_{0,i}$, $S_{1,i}$, and $S_{2,i}$, where $i=1, 2$ $S_{0,1} = \{\tau=0, p_1, 2p_1, \ldots\}$, i.e., $\{\tau=np_1:n=0, 1, 2 \ldots\}$.

$S_{0,2} = \{\tau=0, p_2, 2p_2, \ldots\}$, i.e., $\{\tau=np_2:n=0, 1, 1 \ldots\}$. Or $S_{0,2} = \{\tau=p_2, 2p_2, \ldots\}$, i.e, $\{\tau=np_2:n=1, 2 \ldots\}$.

$S_{1,1} = \{\tau=D_1, D_1+p_1, D_1+2p_1 \ldots\}$, i.e., $\{\tau=D_1+np_1:n=0, 1, 2 \ldots\}$. Here $D_1=o_2-o_1$ or $o_1-o_2$.

$S_{1,2} = \{\tau=D_1, D_1+p_2, D_1+2p_2 \ldots\}$, i.e., $\{\tau=D_1+np_2:n=0, 1, 2 \ldots\}$. Here $D_1=o_2-o_1$ or $o_1-o_2$.

$S_{2,1} = \{\tau=D_2, D_2+p_1, D_2+2p_1 \ldots\}$, i.e., $\{\tau=D_2+np_1:n=0, 1, 2 \ldots\}$. Here $D_2=p_1-o_2+o_1$ or $p_1-o_1+o_2$.

$S_{2,2} = \{\tau=D_2, D_2+p_2, D_2+2p_2 \ldots\}$, i.e., $\{\tau=D_2+np_2:n=0, 1, 2 \ldots\}$. Here $D_2=p_2-o_2+o_1$ or $p_2-o_1+o_2$.

In one example, only one value corresponding to $M>1$ is allowed/supported (e.g., 2 or 4).

In one example, $M=4$ for frequency range 1 (FR1). In one example, $M=2$ for FR2.

In one example, when $M=4$, a NZP-CSI-RS-ResourceSet consists of four periodic NZP CSI-RS resources in two consecutive slots with two periodic NZP CSI-RS resources in each slot.

In one example, when $M=2$, a NZP-CSI-RS-ResourceSet consists of two periodic CSI-RS resources in one slot.

In one example, the value of K can be subject to UE capability, the UE can report a set of supported values for K or a max value of K, and the based on the reported capability, the NW can configure a value of K to the UE.

In one example, the K TRS resources or resource sets can be periodic only.

In one example, one the K TRS resources or resource sets can be aperiodic and the remaining $K-1$ can be periodic. This can be subject to UE capability.

In one example, the K TRS resources or resource sets can be aperiodic. This can be subject to UE capability.

In one example, the UE is configured with such CSI reporting based on a $M=1$ TRS resource or $M>1$ TRS resources, where the value of M is configured. When $M=1$, the details are according to one or more examples herein, and when $M>1$, the details are according to one or more examples herein.

In one example, at least one of the following examples is used/configured regarding the value of K for reporting/calculation of time domain correlation(s).

In one example, the value of K can be fixed, e.g., $K=4$.

In one example, the value of K can be configured, e.g., via higher layer RRC signaling, and/or indicated via MAC CE and/or DCI (e.g., as a part of the triggering state of the CSI request field in the DCI that triggers an aperiodic reporting of the CSI report). In one example, a set of candidate values of K includes $\{1, x_1, \ldots, x_N\}$, where $x_i>1$ and $N \geq 1$, i.e., at least one value $K=1$ and another value $K>1$ are supported. The configuration of $K=1$ vs $K>1$ can be explicit (by configuring the value K) or implicit (e.g., via a parameter). The values $x_1, \ldots, x_N$ can be subject to UE capability.

In one example, the value of K can be determined based on a threshold. The threshold can be relative to the $\tau(0)$. In one example, a set of candidate values of K includes $\{1, x_1, \ldots, x_N\}$, where $x_i>1$ and $N \geq 1$. i.e., at least one value $K=1$ and another value $K>1$ are supported.

In one example, the value of K can be reported by the UE, e.g., via UCI part 1 of a two-part UCI comprising UCI part 1 and UCI part 2. In one example, a set of candidate values of K includes $\{1, x_1, \ldots, x_N\}$, where $x_i>1$ and $N \geq 1$, i.e., at least one value $K=1$ and another value $K>1$ are supported.

In one example, the max value of K or the set of supported values of K can be reported by the UE via UE capability reporting. If the UE reports the support for multiple K values, one of them can be configured, e.g., via higher layer, or MAC CE or DCI (e.g., as a part of the triggering state of the CSI request field in the DCI that triggers an aperiodic reporting of the CSI report). In one example, a set of candidate values of K includes $\{1, x_1, \ldots, x_N\}$, where $x_i>1$ and $N \geq 1$. i.e., at least one value $K=1$ and another value $K>1$ are supported.

In one example, the max value of K (say $K_{max}$) is configured (e.g., via RRC) or indicated via MAC CE and/or DCI (e.g., as a part of the triggering state of the CSI request field in the DCI that triggers an aperiodic reporting of the CSI report), and the UE can report $k \leq K_{max}$ correlation(s) or auto-correlation value(s). In this case, a value of k or, optionally, an indicator related to or usable to infer a payload size (or the number of correlation values k) of the report, can be reported via UCI part 1 of a two-part UCI comprising UCI part 1 and UCI part 2 (which can be transmitted on PUCCH or PUSCH). Or a value of k or, optionally, an indicator related to or usable to infer a payload size (or the number of correlation values k) of the report, can be reported via a (one part) UCI (which can be transmitted on PUCCH). In case of PUCCH, in order to ensure a fixed payload size (number of bits) for this reporting, a number of zero-padding bits can be appended with the CSI reported.

In one example, the value of K can also be a function of the period and/or offset of TRS resource(s).

In one example, the value of K (or the value of $k \leq K$) is signaled to the UE as a part of the triggering state of the CSI request field in the DCI that triggers an aperiodic reporting of the CSI report including the correlation or auto-correlation value(s), or indicator(s) indicating the correlation or auto-correlation value(s).

In one example, the value of the threshold ($\theta$) on the correlation (auto-correlation) value(s) is also reported by the UE. For instance, the CSI report can also include an indicator indicating the value of the threshold either in UCI part 1 or in UCI part 2.

In one example, the value of the threshold ($\theta$) on the correlation (auto-correlation) value(s) is also reported by the UE together with the value K. For instance, the CSI report can also include a joint indicator or two separate indicators indicating the values of $\theta$ and K. When a joint indicator is used, it can be reported via either in UCI part 1 or in UCI part 2. When two separate indicators are used, they can be reported together via either UCI part 1 or UCI part, or separately, one via UCI part 1 and another via UCI part 2.

In one example, the value of the threshold ($\theta$) on the correlation (auto-correlation) value(s) is also reported by the UE together with the value $k \leq K$. For instance, the CSI report can also include a joint indicator or two separate indicators indicating the values of $\theta$ and k. When a joint indicator is used, it can be reported via either in UCI part 1 or in UCI part 2. When two separate indicators are used, they can be reported together via either UCI part 1 or UCI part, or separately, one via UCI part 1 and another via UCI part 2.

In one example, the value of the threshold ($\theta$) on the correlation (auto-correlation) value(s) is signaled to the UE as a part of the triggering state of the CSI request field in the DCI that triggers an aperiodic reporting of the CSI report including the correlation or auto-correlation value(s), or indicator(s) indicating the correlation or auto-correlation value(s).

In one example, the value of the threshold ($\theta$) on the correlation (auto-correlation) value(s) is signaled to the UE together with the value K as a part of the triggering state of the CSI request field in the DCI that triggers an aperiodic reporting of the CSI report including the correlation or auto-correlation value(s), or indicator(s) indicating the correlation or auto-correlation value(s). For instance, the CSI request field can indicate a triggering state that includes either a joint indicator/parameter or two separate indicators/parameters indicating the values of $\theta$ and K.

In one example, the value of the threshold ($\theta$) on the correlation (auto-correlation) value(s) is signaled to the UE together with the value k≤K as a part of the triggering state of the CSI request field in the DCI that triggers an aperiodic reporting of the CSI report including the correlation or auto-correlation value(s), or indicator(s) indicating the correlation or auto-correlation value(s). For instance, the CSI request field can indicate a triggering state that includes either a joint indicator/parameter or two separate indicators/parameters indicating the values of $\theta$ and k.

In one example, at least one of the following examples is used/configured regarding the reporting/calculation of K correlation value(s).

In one example, the reporting is absolute, i.e., each of K values is determined/reported independently from other values.

In one example, the reporting is differential (relative) with respect to a reference. In one example, the reference is $\tau=0$, the lag/tap 0. That is, the correlation value corresponding to a tap/lag $\tau=k$ is reported/determined w.r.t. to the same corresponding to $\tau=0$. In one example, the reference can be fixed (e.g., delay/tap=0 or 1 or the first non-zero delay/tap based on the measured TRS resource, or the reference can be configured (e.g., via higher layer) or reported by the UE (as part of the CSI report, either via part 1 or part 2 of a two-part UCI). In one example, the normalized value of the reference lag/tap can also be reported by the UE.

In one example, the differential/relative correlation is determined as c'(k)=c(k)−c(0). The UE reports correlation c(0) for $\tau=0$, and c'(k) for $\tau=k\neq0$. Or the differential/relative correlation is determined as c'(k)=c(k)−c(r). The UE reports correlation c(r) for $\tau=r$, and c'(k) for $\tau=k\neq r$.

In one example, the differential/relative correlation is determined as c'(k)=c(k)/c(0). The UE reports correlation c(0) for $\tau=0$, and c'(k) for $\tau=k\neq0$. Or the differential/relative correlation is determined as c'(k)=c(k)/c(r). The UE reports correlation c(r) for $\tau=r$, and c'(k) for $\tau=k\neq r$.

In one example, at least one of the following examples is used/configured regarding the frequency domain granularity of the reporting/calculation of K correlation value(s).

In one example, the reporting/calculation of K correlation value(s) is in a wideband (WB) manner, i.e., K correlation values are reported common for the entire CSI reporting band.

In one example, the reporting/calculation of K correlation value(s) is in a subband (SB) manner, i.e., K correlation values are reported for each SB in the CSI reporting band. In addition, a reference (WB) correlation can also be reported such that Sub-band correlation level (s)=sub-band correlation index (s)−wideband correlation index.

In one example, at least one of the following examples is used/configured regarding the indicator(s) indicating the K correlation value(s).

In one example, the CSI report includes an (one joint) indicator which indicates K correlation or auto-correlation values jointly.

In one example, the CSI report includes a separate indicator for each of the K correlation or auto-correlation values.

In one example, when indices of the K lags/taps are also reported, the CSI report also includes one (joint) indicator which indicates the indices of the K taps/labs, or K separate indicators, one for each of the K taps/lags. The CSI report also induces one joint indicator or separate indicators indicating the corresponding K correlation values.

In one example, at least one of the following examples is used/configured regarding the codebook to indicate the amplitude and/or phase of the K correlation value(s).

In one example, amplitude of each of the K values is reported using b bits.

In one example, b=2. The 4 values are uniform in a dB scale, [x, x−y, x−2y, x−3y] or, [x−y, x−2y, x−3y, x−4y]. In one example, x=0. In one example, y=3. In one example, y=3/2=1.5. In one example, y=1.

In one example, b=2. The 4 values are uniform in a dB scale, [x, x−y, x−2y, x−3y] or, [x−y, x−2y, x−3y, x−4y]. In one example, x=0 or x=−ay, where a>0 (e.g., a=7 or 8 or 9 or 3 or 4 or 5). In one example, y=3. In one example, y=3/2=1.5. In one example, y=1.

In one example, x is fixed, (e.g., x=0 or x=−ay, where a>0), and y is also fixed (e.g., y=3, 3/2=1.5, or 1).

In one example, x is fixed, (e.g., x=0 or x=−ay, where a>0), and y is configured (e.g., y=3, 3/2=1.5, or 1 based on RRC signaling).

In one example, x is configured, (e.g., x=0 or x=−ay, where a>0 based on RRC signaling), and y is configured (e.g., y=3, 3/2=1.5, or 1 based on RRC signaling).

In one example, x is configured, (e.g., x=0 or x=−ay, where a>0 based on RRC signaling), y is fixed (e.g., y=3, 3/2=1.5, or 1).

In one example, b=2. The 4 values are uniform in a linear scale, $$\left[ x, \frac{x}{y}, \left(\frac{x}{y}\right)^2, \left(\frac{x}{y}\right)^3 \right]$$

or $$\left[ x, \sqrt{\frac{x}{y}}, \frac{x}{y}, \left(\frac{x}{y}\right)^{\frac{3}{2}} \right].$$

In one example, x=1. In one example, y=2.

In one example, b=2 and 4 values are 1−v, where v is one of the first four values (Indicator 0-3) Table 1, i.e., $$\left\{ \frac{1}{8\sqrt{2}}, \frac{1}{8}, \frac{1}{4\sqrt{2}}, \frac{1}{4} \right\}.$$

In one example, b=2 and 4 values are $1-v^2$ where v is one of the first four values (Indicator 0-3) of Table 1, i.e., $$\left\{ \frac{1}{8\sqrt{2}}, \frac{1}{8}, \frac{1}{4\sqrt{2}}, \frac{1}{4} \right\}.$$

Equivalently, 4 values are 1−u, where u is one of the values $$\left\{\frac{1}{128}, \frac{1}{64}, \frac{1}{32}, \frac{1}{16}\right\}.$$

In one example, b=2 and 4 values are 1−v, where v is one of the first four values (Indicator 0-3) of Table 2, i.e., $$\left\{\left(\frac{1}{32768}\right)^{1/4}, \frac{1}{\sqrt{128}}, \left(\frac{1}{8192}\right)^{1/4}, \frac{1}{8}\right\}.$$

Or equivalently, 4 values are {0.9257 0.9116 0.8949 0.8750}.

In one example, b=2 and 4 values are 1−v² where v is one of the first four valves (Indicator 0-3) of Table 2, i.e., $$\left\{\left(\frac{1}{32768}\right)^{1/4}, \frac{1}{\sqrt{128}}, \left(\frac{1}{8192}\right)^{1/4}, \frac{1}{8}\right\}.$$

Equivalently, 4 values are 1−u, where u is one of the values $$\left\{\left(\frac{1}{32768}\right)^{1/2}, \frac{1}{128}, \left(\frac{1}{8192}\right)^{1/2}, \frac{1}{64}\right\}.$$

Or equivalently, 4 values are {0.9945 0.9922 0.9890 0.98544}.

In one example, b=2, and 4 values are {0.990 0.987 0.984 0.980} or {0.990 0.984 0.975 0.96} or {0.987 0.980 0.968 0.950}.

In one example, b=2 and 4 values are 1−v, where v is one of the 4 values $$\left\{\left(\frac{1}{2^{15}}\right)^{1/n}, \left(\frac{1}{2^{14}}\right)^{1/n}, \left(\frac{1}{2^{13}}\right)^{1/n}, \left(\frac{1}{2^{12}}\right)^{1/n}\right\},$$

where n is fixed of configured from e.g., 2, or 2.5 (5/2), 3, or 3.5 (7/2) or 4 or 4.5 (9/2) or 5.

In one example, b=2 and 4 values are 1−v, where v is one of the 4 values $$\left\{\left(\frac{1}{2^B}\right)^{1/n}, \left(\frac{1}{2^{B-1}}\right)^{1/n}, \left(\frac{1}{2^{B-2}}\right)^{1/n}, \left(\frac{1}{2^{B-3}}\right)^{1/n}\right\},$$

where n is fixed or configured from e.g., 2, or 2.5 (5/2), 3, or 3.5 (7/2) or 4 or 4.5 (9/2) or 5, and B is fixed or configured from {20, 19, 18, 17, 16, 15, 14, 13, 12, 11, 10}.

In one example, b=2 and 4 values are 1−v, where v is one of the 4 values $$\left\{\left(\frac{1}{2^{C+7}}\right)^{1/n}, \left(\frac{1}{2^{C+6}}\right)^{1/n}, \left(\frac{1}{2^{C+5}}\right)^{1/n}, \left(\frac{1}{2^{C+4}}\right)^{1/n}\right\},$$

where n is fixed or configured from e.g., 2, 2.5 (5/2), 3, or 3.5 (7/2) or 4 or 4.5 (9/2) or 5, and C is fixed or configured from {12, 11, 10, 9, 8, 7, 6}.

In one example, b=3. The 8 values are uniform in a dB scale, [x, x−y, x−2y, . . . , x−7y]. In one example, x=0. In one example, y=3. In one example, y=3/2=1.5.

In one example, b=3. The 8 values are uniform in a linear scale, $$\left[x, \frac{x}{y}, \left(\frac{x}{y}\right)^2, \ldots, \left(\frac{x}{y}\right)^7\right]$$

or $$\left[x, \sqrt{\frac{x}{y}}, \frac{x}{y}, \ldots, \left(\frac{x}{y}\right)^{\frac{7}{2}}\right].$$

In one example, x=1. In one example, y=2. In one example, the 8 values are as shown in Table 1.

In one example, b=3 and 8 values are 1−v, where v is one of the first 8 values (Indicator 0-7) of Table 1, i.e., $$\left\{\frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1\right\}.$$

In one example, b=3 and 8 values are 1−v² where v is one of the first 8 values (Indicator 0-7) or Table 1, i.e., $$\left\{\frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1\right\}.$$

Equivalently, 8 values are 1−u, where u is one of the values $$\left\{\frac{1}{128}, \frac{1}{64}, \frac{1}{32}, \frac{1}{16}, \frac{1}{8}, \frac{1}{4}, \frac{1}{2}, 1\right\}.$$

In one example, b=3 and 8 values are 1−v, where v is one of the first 8 values (Indicator 0-7) of Table 2, i.e., $$\left\{\left(\frac{1}{32768}\right)^{1/4}, \frac{1}{\sqrt{128}}, \left(\frac{1}{8192}\right)^{1/4}, \frac{1}{8}, \left(\frac{1}{2048}\right)^{1/4}, \frac{1}{2\sqrt{8}}, \left(\frac{1}{512}\right)^{1/4}, \frac{1}{4}\right\}.$$

Or equivalently, 8 values are {0.9257 0.9116 0.8949 0.8750 0.8513 0.8232 0.7898 0.7500}.

In one example, b=3 and 8 values are 1−v² where v is one of the first 8 values (Indicator 0-7) of Table 2, i.e., $$\left\{\left(\frac{1}{32768}\right)^{1/4}, \frac{1}{\sqrt{128}}, \left(\frac{1}{8192}\right)^{1/4}, \frac{1}{8}, \left(\frac{1}{2048}\right)^{1/4}, \frac{1}{2\sqrt{8}}, \left(\frac{1}{512}\right)^{1/4}, \frac{1}{4}\right\}.$$

Equivalently, 8 values are 1−u, where u is one of the values $$\left\{\left(\frac{1}{32768}\right)^{1/2}, \frac{1}{128}, \left(\frac{1}{8192}\right)^{1/2}, \frac{1}{64}, \left(\frac{1}{2048}\right)^{1/2}, \frac{1}{32}, \left(\frac{1}{512}\right)^{1/2}, \frac{1}{16}\right\}.$$

Or equivalently, 8 values are {0.9945 0.9922 0.9890 0.9844 0.96779 0.9688 0.9558 0.9375}.

In one example, 8 values are {0.990 0.987 0.984 0.980 0.975 0.968 0.960 0.950}.

In one example, b=3 and 8 values are 1−v, where v is one of the 8 values $$\left\{\left(\frac{1}{2^{15}}\right)^{1/n}, \left(\frac{1}{2^{14}}\right)^{1/n}, \left(\frac{1}{2^{13}}\right)^{1/n},\right.$$

$$\left.\left(\frac{1}{2^{12}}\right)^{1/n}, \left(\frac{1}{2^{11}}\right)^{1/n}, \left(\frac{1}{2^{10}}\right)^{1/n}, \left(\frac{1}{2^{9}}\right)^{1/n}, \left(\frac{1}{2^{8}}\right)^{1/n}\right\},$$

when n is fixed of configured from e.g., 2, or 2.5 (5/2), 3, or 3.5 (7/2) or 4 or 4.5 (9/2) or 5.

In one example, b=3 and 8 values are 1−v, where v is one of the 8 values $$\left\{\left(\frac{1}{2^{B}}\right)^{1/n}, \left(\frac{1}{2^{B-1}}\right)^{1/n}, \left(\frac{1}{2^{B-2}}\right)^{1/n}, \left(\frac{1}{2^{B-3}}\right)^{1/n},\right.$$

$$\left.\left(\frac{1}{2^{B-4}}\right)^{1/n}, \left(\frac{1}{2^{B-5}}\right)^{1/n}, \left(\frac{1}{2^{B-6}}\right)^{1/n}, \left(\frac{1}{2^{B-7}}\right)^{1/n}\right\},$$

where n is fixed of configured from e.g., 2, or 2.5 (5/2), 3, or 3.5 (7/2) or 4 or 4.5 (9/2) or 5, and B is fixed or configured from {20, 19, 18, 17, 16, 15, 14, 13, 12, 11, 10}.

In one example, b=3 and 8 values are 1−v, where v is one of the 8 values $$\left\{\left(\frac{1}{2^{C+7}}\right)^{1/n}, \left(\frac{1}{2^{C+6}}\right)^{1/n}, \left(\frac{1}{2^{C+5}}\right)^{1/n},\right.$$

$$\left.\left(\frac{1}{2^{C+4}}\right)^{1/n}, \left(\frac{1}{2^{C+3}}\right)^{1/n}, \left(\frac{1}{2^{C+2}}\right)^{1/n}, \left(\frac{1}{2^{C+1}}\right)^{1/n}, \left(\frac{1}{2^{C}}\right)^{1/n}\right\},$$

where n is fixed or configured from e.g., 2, or 2.5 (5/2), 3, or 3.5 (7/2) or 4 or 4.5 (9/2) or 5, and C is fixed or configured from {12, 11, 10, 9, 8, 7, 6}.

In one example, b=4. The 16 values are uniform in a dB scale, [x, x−y, x−2y, . . . , x−15y] or [x−y, x−2y, . . . , x−15y, x−16y]. In one example, x=0. In one example, y=3. In one example, y=3/2=1.5.

In one example, b=4. The 16 values are uniform in a linear scale, $$\left[x, \frac{x}{y}, \left(\frac{x}{y}\right)^{2}, \ldots, \left(\frac{x}{y}\right)^{15}\right]$$

$$\text{or}\left[x, \sqrt{\frac{x}{y}}, \frac{x}{y}, \ldots, \left(\frac{x}{y}\right)^{\frac{15}{2}}\right], \left[\frac{x}{y}, \left(\frac{x}{y}\right)^{2}, \ldots, \left(\frac{x}{y}\right)^{15}, \left(\frac{x}{y}\right)^{16}\right]$$

$$\text{or}\left[\sqrt{\frac{x}{y}}, \frac{x}{y}, \ldots, \left(\frac{x}{y}\right)^{\frac{15}{2}}, \left(\frac{x}{y}\right)^{8}\right] \text{or}\left[\left(\frac{x}{y}\right)^{16}, \left(\frac{x}{y}\right)^{15}, \ldots, \left(\frac{x}{y}\right)^{2}, \left(\frac{x}{y}\right)\right]$$

$$\text{or}\left[\left(\frac{x}{y}\right)^{8}, \left(\frac{x}{y}\right)^{\frac{15}{2}}, \ldots, , \frac{x}{y}, \sqrt{\frac{x}{y}}\right].$$

In one example, x=1. In one example, y=2. In one example, the 16 values included all of or a subset of values as shown in Table 2.

In one example, b=4. The 16 values are uniform in a dB scale, [x, x−y, x−2y, . . . , x−15y], In one example, x=0. In one example, y=3. In one example, y=3/2=1.5.

In one example, b=4. The 16 values are uniform in a linear scale, $$\left[x, \frac{x}{y}, \left(\frac{x}{y}\right)^{2}, \ldots, \left(\frac{x}{y}\right)^{15}\right]$$

or $$\left[x, \sqrt{\frac{x}{y}}, \frac{x}{y}, \ldots, \left(\frac{x}{y}\right)^{\frac{15}{2}}\right].$$

In one example, x=1. In one example, y=2. In one example, the 8 values are as shown in Table 2.

In one example, b is configured via higher layer signaling, e.g., from {3,4}.

TABLE 1

| Indicator | Value |
| --- | --- |
| 0 | $\dfrac{1}{8\sqrt{2}}$ |
| 1 | $\dfrac{1}{8}$ |
| 2 | $\dfrac{1}{4\sqrt{2}}$ |
| 3 | $\dfrac{1}{4}$ |
| 4 | $\dfrac{1}{2\sqrt{2}}$ |
| 5 | $\dfrac{1}{2}$ |
| 6 | $\dfrac{1}{\sqrt{2}}$ |
| 7 | 1 |

TABLE 2

| $k_{l,p}^{(1)}$ | $p_{l,p}^{(1)}$ |
| --- | --- |
| 0 | $\left(\dfrac{1}{32768}\right)^{1/4}$ |
| 1 | $\dfrac{1}{\sqrt{128}}$ |
| 2 | $\left(\dfrac{1}{8192}\right)^{1/4}$ |
| 3 | $\dfrac{1}{8}$ |
| 4 | $\left(\dfrac{1}{2048}\right)^{1/4}$ |
| 5 | $\dfrac{1}{2\sqrt{8}}$ |
| 6 | $\left(\dfrac{1}{512}\right)^{1/4}$ |

TABLE 2-continued

| $k_{l,p}^{(1)}$ | $p_{l,p}^{(1)}$ |
|---|---|
| 7 | $\dfrac{1}{4}$ |
| 8 | $\left(\dfrac{1}{128}\right)^{1/4}$ |
| 9 | $\dfrac{1}{\sqrt{8}}$ |
| 10 | $\left(\dfrac{1}{32}\right)^{1/4}$ |
| 11 | $\dfrac{1}{2}$ |
| 12 | $\left(\dfrac{1}{8}\right)^{1/4}$ |
| 13 | $\dfrac{1}{\sqrt{2}}$ |
| 14 | $\left(\dfrac{1}{2}\right)^{1/4}$ |
| 15 | $1$ |

In one embodiment, the example EX-A or EX-B (above) can be used/extended to obtain a codebook for the quantization of wideband normalized amplitude value using b=4.

In one example, b=3 and 8 values are 1−v, where v is one of the 8 values $$\left\{ \left(\frac{1}{2^{B}}\right)^{1/n}, \left(\frac{1}{2^{B-1}}\right)^{1/n}, \left(\frac{1}{2^{B-2}}\right)^{1/n}, \left(\frac{1}{2^{B-3}}\right)^{1/n}, \right.$$
$$\left. \left(\frac{1}{2^{B-4}}\right)^{1/n}, \left(\frac{1}{2^{B-5}}\right)^{1/n}, \left(\frac{1}{2^{B-6}}\right)^{1/n}, \left(\frac{1}{2^{B-7}}\right)^{1/n} \right\},$$

where n is fixed or configured from e.g., 2, or 2.5 (5/2), 3, or 3.5 (7/2) or 4 or 4.5 (9/2) or 5, and B is fixed or configured from {20, 19, 18, 17, 16, 15, 14, 13, 12, 11, 10}.

In one example, (Definition 1) the codebook includes the values of v, i.e., a size-Q quantization alphabet is included in the codebook: $\{2^{-(N-q)s}, q=0, 1, \ldots, 2^{Q}-1\}$. Note that $$v = 2^{-(N-q)s} = \frac{1}{2^{(N-q)s}} = \left(\frac{1}{2^{N-q}}\right)^{s}, S = \frac{1}{n} \text{ and } B = N.$$

In one example, (Definition 2) the codebook includes the values of 1−v, i.e., a size-Q quantization alphabet is included in the codebook: $\{1-2^{-(N-q)s}, q=0, 1, \ldots, 2^{Q}-1\}$. Note that $$v = 2^{-(N-q)s} = \frac{1}{2^{(N-q)s}} = \left(\frac{1}{2^{N-q}}\right)^{s}, S = \frac{1}{n} \text{ and } B = N.$$

In one example, N is fixed (e.g., 7 or 15 or $2^{Q}-1$ or $2^{Q}$). In one example, N is configured (e.g., via higher later RRC) from a set of values (e.g., from $\{2^{Q}-1, 7, 15, 2^{Q}\}$).

In one example, n is fixed (e.g., 2 or 3 or 4). In one example, n is configured (e.g., via higher later RRC) from a set of values (e.g., from {2, 2.5, 3, . . . , 5}).

In one example, n=1/s or s=1/n and s is fixed (e.g., 1/2 or 1/3 or 1/4). In one example, s is configured (e.g., via higher later RRC) from a set of values (e.g., from {1/2, 1/2.5, 1/3, . . . , 1/5}).

In one example, Q is fixed. In one example, Q is configured (e.g., via higher later RRC) from a set of values (e.g., {3,4} or {3, 4, 5} or {4,5}).

In one example, the value of N and/or n and/or s is fixed/configured depending on the value of Y (number of reported quantized amplitude values for different lags/delays).

At least one of the following examples of the codebook is used/supported/configured.

In one example, according to Definition 1, the codebook includes (e.g., when Q=3) at least 8 values (v0-v7), which are one of the columns of Table 4 through Table 10 depending on the values of (n, N).

In one example, according to Definition 2, the codebook includes (e.g., when Q=3) at least 8 values (v0-v7), which are one of the columns of Table 11 through Table 17 depending on the values of (n, N).

In one example, according to Definition 1, the codebook includes (e.g., when Q=4) at least 16 values (v0-v15), which are one of the columns of Table 18 through Table 24 depending on the values of (n, N).

In one example, according to Definition 2, the codebook includes (e.g., when Q=4) at least 16 values (v0-v15), which are one of the columns of Table 25 through Table 31 depending on the values of (n, N).

In one example, when b=Q=4, s=1/2, and $N=2^{Q}=16$, then the amplitude codebook is the $3^{rd}$ column of Table 18. In this case, the reported correlation amplitudes are indicated by $$k_{TDCP} = [k_1 \ldots k_Y]$$
$$k_i \in \{0, 1, \ldots, 15\}$$

and the corresponding amplitude values are obtained from: 1−$a_i$, for i=1, . . . , Y, where the mapping from $k_i$ to $a_i$ is given in Table 3. Note that values v1 . . . v15 corresponds to $v^2$, where v corresponds to first 15 values (Indicator 0-14) of Table 2.

TABLE 3

| $k_i$ | $a_i$ | $a_i$ (up to 4 decimal places) |
|---|---|---|
| v0 | $\dfrac{1}{256}$ | 0.0039 |
| v1 | $\dfrac{1}{128\sqrt{2}}$ | 0.0055 |
| v2 | $\dfrac{1}{128}$ | 0.0078 |
| v3 | $\dfrac{1}{64\sqrt{2}}$ | 0.0110 |
| v4 | $\dfrac{1}{64}$ | 0.0156 |
| v5 | $\dfrac{1}{32\sqrt{2}}$ | 0.0221 |

TABLE 3-continued

| $k_i$ | $a_i$ | $a_i$ (up to 4 decimal places) |
|---|---|---|
| v6 | $\frac{1}{32}$ | 0.0313 |
| v7 | $\frac{1}{16\sqrt{2}}$ | 0.0442 |
| v8 | $\frac{1}{16}$ | 0.0625 |
| v9 | $\frac{1}{8\sqrt{2}}$ | 0.0884 |
| v10 | $\frac{1}{8}$ | 0.1250 |
| v11 | $\frac{1}{4\sqrt{2}}$ | 0.1768 |
| v12 | $\frac{1}{4}$ | 0.2500 |
| v13 | $\frac{1}{2\sqrt{2}}$ | 0.3536 |
| v14 | $\frac{1}{2}$ | 0.5000 |
| v15 | $\frac{1}{\sqrt{2}}$ | 0.7071 |

In one example, the codebook for amplitude reporting is based on at least one of the following parameters.

$Q=5$; $N=[2^Q-1,2^Q]$; $s=[1/4, 1/3]$ $Q=3$; $N=[2^Q-1,2^Q]$; $s=[1/2, 2/3, 3/4]$;

$Q=4$; $N=[2^Q-1,2^Q]$; $s=[1/2, 2/3]$;

$Q=3$; $N=[2^Q-1, \ldots, 2^{Q+1}-1]$; $s=[1/2, 3/5, 2/3, 3/4, 4/5]$;

$Q=3$; $N=[2^Q-1, 2^Q, 2^Q+0.5, \ldots, 2^{Q+1}-0.5]$; $s=[1/2, 3/5, 2/3, 3/4, 4/5]$;

In one example, the codebook alphabet, the set of (all) values for the quantization/reporting of the amplitude values, comprises $2^Q$ values and is according to $CB_1$ or $CB_2$.

$q=0,1, \ldots, (2^Q-1)$ $CB_1=\{f(q)=2^{-(N-q)s}\}$ $CB_2=\{f(q)=1-2^{-(N-q)s}\}$ In one example, the amplitude reporting is according to a reporting scheme 1 (independent reporting), wherein For each delay (index) $y=0, 1, \ldots, Y-1$, the amplitude is quantized/reported using $CB_1$ or $CB_2$.

In one example, the amplitude reporting is according to a reporting scheme 2 (differential reporting), wherein $Q_{diff}<Q$ (e.g., Q-1 or Q-2)

$q_{-1}=0$

For each delay (index) $y=0, 1, \ldots, Y-1$, the amplitude is quantized/reported using $2^{Q_{diff}}$ values from $CB_1$ or $CB_2$ as $f(q_y)$ where $q_y=\{q_{y-1}, \ldots, q_{y-1}+2^{Q_{diff}}-1\}=q_{y-1}+q_{diff}$ where $q_{y-1}$ is an index of the quantized amplitude corresponding to the previous delay, and $q_{diff}=0, 1, \ldots, (2^{Q_{diff}}-1)$ In one example, $$q_{diff}=0, 1, \ldots, (2^{Q_{diff}}-1) \text{ and } K=2^{-\left(N-\left(2^{Q_{diff}}-1\right)\right)}$$

$$f(q_y)=K2^{-\left(2^{Q_{diff}}-1-q_y\right)s}=K2^{-\left(2^{Q_{diff}}-1-q_{y-1}-q_{diff}\right)s} \text{ (for } CB_1)$$

$$f(q_y)=1-K2^{-\left(2^{Q_{diff}}-1-q_y\right)s}=1-K2^{-\left(2^{Q_{diff}}-1-q_{y-1}-q_{diff}\right)s} \text{ (for } CB_2)$$

In one example, $$q_{diff}=0, 1, \ldots, (2^{Q_{diff}}-1) \text{ and } N=2^Q-1 \text{ or } =2^Q$$

$$f(q_y)=2^{-(N-q_y)s}=2^{-\left(N-q_{y-1}-q_{diff}\right)s} \text{ (for } CB_1)$$

$$f(q_y)=1-2^{-(N-q_y)s}=1-2^{-\left(N-q_{y-1}-q_{diff}\right)s} \text{ (for } CB_2)$$

In one example, the amplitude reporting is according to a reporting scheme 3 (differential reporting), wherein For delay $y=0$, the amplitude is quantized/reported using $CB_1$ or $CB_2$ (cf. scheme 1), however, for each of the remaining delay (index) $y=1, \ldots, Y-1$, the amplitude is quantized/reported using $2^{Q_{diff}}$ values from $CB_1$ or $CB_2$ as $f(q_y)$, as described in scheme 2.

In one example, the amplitude reporting is according to a reporting scheme 4 (differential reporting), wherein For delay $y=d$, the amplitude is quantized/reported using $CB_1$ or $CB_2$ (cf. scheme 1), however, for each of the remaining delay (index) $y=\{0, 1, \ldots, Y-1\}\backslash(minus)\{c\}$, the amplitude is quantized/reported using $2^{Q_{diff}}$ values from $CB_1$ or $CB_2$ as $f(q_y)$, as described in scheme 2, where d is fixed (e.g., 1) or configured (e.g., via RRC) or reported by the UE.

In one example, the amplitude reporting is according to a reporting scheme 5 (differential reporting), wherein $Q_{diff}<Q$ (e.g., Q-1 or Q-2)

$f(q_{-1})=c$ where c is fixed (e.g., 1) or configured (e.g., via RRC) or reported by the UE.

For each delay (index) $y=0, 1, \ldots, Y-1$, the amplitude is quantized/reported using $2^{Q_{diff}}$ values from $CB_1$ or $CB_2$ as $f(q_{y-1})f(q_y)$ where $q_y=\{b, \ldots, b+2^{Q_{diff}}-1\}=b+q_{diff}$ where b is fixed (e.g., $b=0$ or $b=q_{y-1}$), and $q_{y-1}$ is an index of the quantized amplitude corresponding to the previous delay, and $q_{diff}=0, 1, \ldots, (2^{Q_{diff}}-1)$ In one example, $$q_{diff}=0, 1, \ldots, (2^{Q_{diff}}-1) \text{ and } K=1 \text{ or } K=2^{-\left(N-\left(2^{Q_{diff}}-1\right)\right)}$$

$$f(q_y)=K2^{-\left(2^{Q_{diff}}-1-q_y\right)s}=K2^{-\left(2^{Q_{diff}}-1-q_{y-1}-q_{diff}\right)s} \text{ (for } CB_1)$$

$$f(q_y)=1-K2^{-\left(2^{Q_{diff}}-1-q_y\right)s}=1-K2^{-\left(2^{Q_{diff}}-1-q_{y-1}-q_{diff}\right)s} \text{ (for } CB_2)$$

In one example, $$q_{diff}=$$
$$0, 1, \ldots, (2^{Q_{diff}}-1) \text{ and } N=2^Q-1 \text{ or } =2^Q \text{ or } 2^{Q_{diff}}-1 \text{ or } =2^{Q_{diff}}$$

$$f(q_y)=2^{-(N-q_y)s}=2^{-\left(N-q_{y-1}-q_{diff}\right)s} \text{ (for } CB_1)$$

$$f(q_y)=1-2^{-(N-q_y)s}=1-2^{-\left(N-q_{y-1}-q_{diff}\right)s} \text{ (for } CB_2)$$

Reporting scheme 6: For delay $y=0$, the amplitude is quantized/reported using $CB_1$ or $CB_2$ (cf. scheme 4), how ever, for each of the remaining delay (index) y=1, . . . , Y–1, the amplitude is quantized/reported using $2^{Q_{diff}}$ values from $CB_1$ or $CB_2$ as $f(q_y)$, as described in scheme 5.

Reporting scheme 7: For delay y=d, the amplitude is quantized/reported using $CB_1$ or $CB_2$ (cf. scheme 4), however, for each of the remaining delay (index) y={0, 1, . . . , Y–1}\(minus){c}, the amplitude is quantized/reported using $2^{Q_{diff}}$ values from $CB_1$ or $CB_2$ as $f(q_y)$, as described in scheme 6, where d is fixed (e.g., 1) or configured (e.g., via RRC) or reported by the UE.

TABLE 4

14 examples of amplitude codebook (definition 1)

| n | 2 | 2 | 2 | 2 | 2 | 2 | 2 | 2 | 2 | 2 | 2 | 2 | 2 | 2 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.0884 | 0.0625 | 0.0442 | 0.0313 | 0.0221 | 0.0156 | 0.0110 | 0.0078 | 0.0055 | 0.0039 | 0.0028 | 0.0020 | 0.0014 | 0.0010 |
| v1 | 0.1250 | 0.0884 | 0.0625 | 0.0442 | 0.0313 | 0.0221 | 0.0156 | 0.0110 | 0.0078 | 0.0055 | 0.0039 | 0.0028 | 0.0020 | 0.0014 |
| v2 | 0.1768 | 0.1250 | 0.0884 | 0.0625 | 0.0442 | 0.0313 | 0.0221 | 0.0156 | 0.0110 | 0.0078 | 0.0055 | 0.0039 | 0.0028 | 0.0020 |
| v3 | 0.2500 | 0.1768 | 0.1250 | 0.0884 | 0.0625 | 0.0442 | 0.0313 | 0.0221 | 0.0156 | 0.0110 | 0.0078 | 0.0055 | 0.0039 | 0.0028 |
| v4 | 0.3536 | 0.2500 | 0.1768 | 0.1250 | 0.0884 | 0.0625 | 0.0442 | 0.0313 | 0.0221 | 0.0156 | 0.0110 | 0.0078 | 0.0055 | 0.0039 |
| v5 | 0.5000 | 0.3536 | 0.2500 | 0.1768 | 0.1250 | 0.0884 | 0.0625 | 0.0442 | 0.0313 | 0.0221 | 0.0156 | 0.0110 | 0.0078 | 0.0055 |
| v6 | 0.7071 | 0.5000 | 0.3536 | 0.2500 | 0.1768 | 0.1250 | 0.0884 | 0.0625 | 0.0442 | 0.0313 | 0.0221 | 0.0156 | 0.0110 | 0.0078 |
| v7 | 1.0000 | 0.7071 | 0.5000 | 0.3536 | 0.2500 | 0.1768 | 0.1250 | 0.0884 | 0.0625 | 0.0442 | 0.0313 | 0.0221 | 0.0156 | 0.0110 |

20

TABLE 5

14 examples of amplitude codebook (definition 1)

| n | 2.5 | 2.5 | 2.5 | 2.5 | 2.5 | 2.5 | 2.5 | 2.5 | 2.5 | 2.5 | 2.5 | 2.5 | 2.5 | 2.5 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.1436 | 0.1088 | 0.0825 | 0.0625 | 0.0474 | 0.0359 | 0.0272 | 0.0206 | 0.0156 | 0.0118 | 0.0090 | 0.0068 | 0.0052 | 0.0039 |
| v1 | 0.1895 | 0.1436 | 0.1088 | 0.0825 | 0.0625 | 0.0474 | 0.0359 | 0.0272 | 0.0206 | 0.0156 | 0.0118 | 0.0090 | 0.0068 | 0.0052 |
| v2 | 0.2500 | 0.1895 | 0.1436 | 0.1088 | 0.0825 | 0.0625 | 0.0474 | 0.0359 | 0.0272 | 0.0206 | 0.0156 | 0.0118 | 0.0090 | 0.0068 |
| v3 | 0.3299 | 0.2500 | 0.1895 | 0.1436 | 0.1088 | 0.0825 | 0.0625 | 0.0474 | 0.0359 | 0.0272 | 0.0206 | 0.0156 | 0.0118 | 0.0090 |
| v4 | 0.4353 | 0.3299 | 0.2500 | 0.1895 | 0.1436 | 0.1088 | 0.0825 | 0.0625 | 0.0474 | 0.0359 | 0.0272 | 0.0206 | 0.0156 | 0.0118 |
| v5 | 0.5744 | 0.4353 | 0.3299 | 0.2500 | 0.1895 | 0.1436 | 0.1088 | 0.0825 | 0.0625 | 0.0474 | 0.0359 | 0.0272 | 0.0206 | 0.0156 |
| v6 | 0.7579 | 0.5744 | 0.4353 | 0.3299 | 0.2500 | 0.1895 | 0.1436 | 0.1088 | 0.0825 | 0.0625 | 0.0474 | 0.0359 | 0.0272 | 0.0206 |
| v7 | 1.0000 | 0.7579 | 0.5744 | 0.4353 | 0.3299 | 0.2500 | 0.1895 | 0.1436 | 0.1088 | 0.0825 | 0.0625 | 0.0474 | 0.0359 | 0.0272 |

TABLE 6

14 examples of amplitude codebook (definition 1)

| n | 3 | 3 | 3 | 3 | 3 | 3 | 3 | 3 | 3 | 3 | 3 | 3 | 3 | 3 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.1984 | 0.1575 | 0.1250 | 0.0992 | 0.0787 | 0.0625 | 0.0496 | 0.0394 | 0.0313 | 0.0248 | 0.0197 | 0.0156 | 0.0124 | 0.0098 |
| v1 | 0.2500 | 0.1984 | 0.1575 | 0.1250 | 0.0992 | 0.0787 | 0.0625 | 0.0496 | 0.0394 | 0.0313 | 0.0248 | 0.0197 | 0.0156 | 0.0124 |
| v2 | 0.3150 | 0.2500 | 0.1984 | 0.1575 | 0.1250 | 0.0992 | 0.0787 | 0.0625 | 0.0496 | 0.0394 | 0.0313 | 0.0248 | 0.0197 | 0.0156 |
| v3 | 0.3969 | 0.3150 | 0.2500 | 0.1984 | 0.1575 | 0.1250 | 0.0992 | 0.0787 | 0.0625 | 0.0496 | 0.0394 | 0.0313 | 0.0248 | 0.0197 |
| v4 | 0.5000 | 0.3969 | 0.3150 | 0.2500 | 0.1984 | 0.1575 | 0.1250 | 0.0992 | 0.0787 | 0.0625 | 0.0496 | 0.0394 | 0.0313 | 0.0248 |
| v5 | 0.6300 | 0.5000 | 0.3969 | 0.3150 | 0.2500 | 0.1984 | 0.1575 | 0.1250 | 0.0992 | 0.0787 | 0.0625 | 0.0496 | 0.0394 | 0.0313 |
| v6 | 0.7937 | 0.6300 | 0.5000 | 0.3969 | 0.3150 | 0.2500 | 0.1984 | 0.1575 | 0.1250 | 0.0992 | 0.0787 | 0.0625 | 0.0496 | 0.0394 |
| v7 | 1.0000 | 0.7937 | 0.6300 | 0.5000 | 0.3969 | 0.3150 | 0.2500 | 0.1984 | 0.1575 | 0.1250 | 0.0992 | 0.0787 | 0.0625 | 0.0496 |

TABLE 7

14 examples of amplitude codebook (definition 1)

| n | 3.5 | 3.5 | 3.5 | 3.5 | 3.5 | 3.5 | 3.5 | 3.5 | 3.5 | 3.5 | 3.5 | 3.5 | 3.5 | 3.5 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.2500 | 0.2051 | 0.1682 | 0.1380 | 0.1132 | 0.0929 | 0.0762 | 0.0625 | 0.0513 | 0.0421 | 0.0345 | 0.0283 | 0.0232 | 0.0190 |
| v1 | 0.3048 | 0.2500 | 0.2051 | 0.1682 | 0.1380 | 0.1132 | 0.0929 | 0.0762 | 0.0625 | 0.0513 | 0.0421 | 0.0345 | 0.0283 | 0.0232 |
| v2 | 0.3715 | 0.3048 | 0.2500 | 0.2051 | 0.1682 | 0.1380 | 0.1132 | 0.0929 | 0.0762 | 0.0625 | 0.0513 | 0.0421 | 0.0345 | 0.0283 |
| v3 | 0.4529 | 0.3715 | 0.3048 | 0.2500 | 0.2051 | 0.1682 | 0.1380 | 0.1132 | 0.0929 | 0.0762 | 0.0625 | 0.0513 | 0.0421 | 0.0345 |
| v4 | 0.5520 | 0.4529 | 0.3715 | 0.3048 | 0.2500 | 0.2051 | 0.1682 | 0.1380 | 0.1132 | 0.0929 | 0.0762 | 0.0625 | 0.0513 | 0.0421 |

TABLE 7-continued

| | | | | | 14 examples of amplitude codebook (definition 1) | | | | | | | | |
|---|---|---|---|---|---|---|---|---|---|---|---|---|---|
| n | 3.5 | 3.5 | 3.5 | 3.5 | 3.5 | 3.5 | 3.5 | 3.5 | 3.5 | 3.5 | 3.5 | 3.5 | 3.5 | 3.5 |
| v5 | 0.6730 | 0.5520 | 0.4529 | 0.3715 | 0.3048 | 0.2500 | 0.2051 | 0.1682 | 0.1380 | 0.1132 | 0.0929 | 0.0762 | 0.0625 | 0.0513 |
| v6 | 0.8203 | 0.6730 | 0.5520 | 0.4529 | 0.3715 | 0.3048 | 0.2500 | 0.2051 | 0.1682 | 0.1380 | 0.1132 | 0.0929 | 0.0762 | 0.0625 |
| v7 | 1.0000 | 0.8203 | 0.6730 | 0.5520 | 0.4529 | 0.3715 | 0.3048 | 0.2500 | 0.2051 | 0.1682 | 0.1380 | 0.1132 | 0.0929 | 0.0762 |

TABLE 8

| | | | | | 14 examples of amplitude codebook (definition 1) | | | | | | | | |
|---|---|---|---|---|---|---|---|---|---|---|---|---|---|---|
| n | 4 | 4 | 4 | 4 | 4 | 4 | 4 | 4 | 4 | 4 | 4 | 4 | 4 | 4 |
| N | 7 | 8 | 9 | 10 | 11 | 12 | 13 | 14 | 15 | 16 | 17 | 18 | 19 | 20 |
| v0 | 0.2973 | 0.2500 | 0.2102 | 0.1768 | 0.1487 | 0.1250 | 0.1051 | 0.0884 | 0.0743 | 0.0625 | 0.0526 | 0.0442 | 0.0372 | 0.0313 |
| v1 | 0.3536 | 0.2973 | 0.2500 | 0.2102 | 0.1768 | 0.1487 | 0.1250 | 0.1051 | 0.0884 | 0.0743 | 0.0625 | 0.0526 | 0.0442 | 0.0372 |
| v2 | 0.4205 | 0.3536 | 0.2973 | 0.2500 | 0.2102 | 0.1768 | 0.1487 | 0.1250 | 0.1051 | 0.0884 | 0.0743 | 0.0625 | 0.0526 | 0.0442 |
| v3 | 0.5000 | 0.4205 | 0.3536 | 0.2973 | 0.2500 | 0.2102 | 0.1768 | 0.1487 | 0.1250 | 0.1051 | 0.0884 | 0.0743 | 0.0625 | 0.0526 |
| v4 | 0.5946 | 0.5000 | 0.4205 | 0.3536 | 0.2973 | 0.2500 | 0.2102 | 0.1768 | 0.1487 | 0.1250 | 0.1051 | 0.0884 | 0.0743 | 0.0625 |
| v5 | 0.7071 | 0.5946 | 0.5000 | 0.4205 | 0.3536 | 0.2973 | 0.2500 | 0.2102 | 0.1768 | 0.1487 | 0.1250 | 0.1051 | 0.0884 | 0.0743 |
| v6 | 0.8409 | 0.7071 | 0.5946 | 0.5000 | 0.4205 | 0.3536 | 0.2973 | 0.2500 | 0.2102 | 0.1768 | 0.1487 | 0.1250 | 0.1051 | 0.0884 |
| v7 | 1.0000 | 0.8409 | 0.7071 | 0.5946 | 0.5000 | 0.4205 | 0.3536 | 0.2973 | 0.2500 | 0.2102 | 0.1768 | 0.1487 | 0.1250 | 0.1051 |

TABLE 9

| | | | | | 14 examples of amplitude codebook (definition 1) | | | | | | | | |
|---|---|---|---|---|---|---|---|---|---|---|---|---|---|---|
| n | 4.5 | 4.5 | 4.5 | 4.5 | 4.5 | 4.5 | 4.5 | 4.5 | 4.5 | 4.5 | 4.5 | 4.5 | 4.5 | 4.5 |
| N | 7 | 8 | 9 | 10 | 11 | 12 | 13 | 14 | 15 | 16 | 17 | 18 | 19 | 20 |
| v0 | 0.3402 | 0.2916 | 0.2500 | 0.2143 | 0.1837 | 0.1575 | 0.1350 | 0.1157 | 0.0992 | 0.0850 | 0.0729 | 0.0625 | 0.0536 | 0.0459 |
| v1 | 0.3969 | 0.3402 | 0.2916 | 0.2500 | 0.2143 | 0.1837 | 0.1575 | 0.1350 | 0.1157 | 0.0992 | 0.0850 | 0.0729 | 0.0625 | 0.0536 |
| v2 | 0.4629 | 0.3969 | 0.3402 | 0.2916 | 0.2500 | 0.2143 | 0.1837 | 0.1575 | 0.1350 | 0.1157 | 0.0992 | 0.0850 | 0.0729 | 0.0625 |
| v3 | 0.5400 | 0.4629 | 0.3969 | 0.3402 | 0.2916 | 0.2500 | 0.2143 | 0.1837 | 0.1575 | 0.1350 | 0.1157 | 0.0992 | 0.0850 | 0.0729 |
| v4 | 0.6300 | 0.5400 | 0.4629 | 0.3969 | 0.3402 | 0.2916 | 0.2500 | 0.2143 | 0.1837 | 0.1575 | 0.1350 | 0.1157 | 0.0992 | 0.0850 |
| v5 | 0.7349 | 0.6300 | 0.5400 | 0.4629 | 0.3969 | 0.3402 | 0.2916 | 0.2500 | 0.2143 | 0.1837 | 0.1575 | 0.1350 | 0.1157 | 0.0992 |
| v6 | 0.8572 | 0.7349 | 0.6300 | 0.5400 | 0.4629 | 0.3969 | 0.3402 | 0.2916 | 0.2500 | 0.2143 | 0.1837 | 0.1575 | 0.1350 | 0.1157 |
| v7 | 1.0000 | 0.8572 | 0.7349 | 0.6300 | 0.5400 | 0.4629 | 0.3969 | 0.3402 | 0.2916 | 0.2500 | 0.2143 | 0.1837 | 0.1575 | 0.1350 |

TABLE 10

| | | | | | 14 examples of amplitude codebook (definition 1) | | | | | | | | |
|---|---|---|---|---|---|---|---|---|---|---|---|---|---|---|
| n | 5 | 5 | 5 | 5 | 5 | 5 | 5 | 5 | 5 | 5 | 5 | 5 | 5 | 5 |
| N | 7 | 8 | 9 | 10 | 11 | 12 | 13 | 14 | 15 | 16 | 17 | 18 | 19 | 20 |
| v0 | 0.3789 | 0.3299 | 0.2872 | 0.2500 | 0.2176 | 0.1895 | 0.1649 | 0.1436 | 0.1250 | 0.1088 | 0.0947 | 0.0825 | 0.0718 | 0.0625 |
| v1 | 0.4353 | 0.3789 | 0.3299 | 0.2872 | 0.2500 | 0.2176 | 0.1895 | 0.1649 | 0.1436 | 0.1250 | 0.1088 | 0.0947 | 0.0825 | 0.0718 |
| v2 | 0.5000 | 0.4353 | 0.3789 | 0.3299 | 0.2872 | 0.2500 | 0.2176 | 0.1895 | 0.1649 | 0.1436 | 0.1250 | 0.1088 | 0.0947 | 0.0825 |
| v3 | 0.5744 | 0.5000 | 0.4353 | 0.3789 | 0.3299 | 0.2872 | 0.2500 | 0.2176 | 0.1895 | 0.1649 | 0.1436 | 0.1250 | 0.1088 | 0.0947 |
| v4 | 0.6598 | 0.5744 | 0.5000 | 0.4353 | 0.3789 | 0.3299 | 0.2872 | 0.2500 | 0.2176 | 0.1895 | 0.1649 | 0.1436 | 0.1250 | 0.1088 |
| v5 | 0.7579 | 0.6598 | 0.5744 | 0.5000 | 0.4353 | 0.3789 | 0.3299 | 0.2872 | 0.2500 | 0.2176 | 0.1895 | 0.1649 | 0.1436 | 0.1250 |
| v6 | 0.8706 | 0.7579 | 0.6598 | 0.5744 | 0.5000 | 0.4353 | 0.3789 | 0.3299 | 0.2872 | 0.2500 | 0.2176 | 0.1895 | 0.1649 | 0.1436 |
| v7 | 1.0000 | 0.8706 | 0.7579 | 0.6598 | 0.5744 | 0.5000 | 0.4353 | 0.3789 | 0.3299 | 0.2872 | 0.2500 | 0.2176 | 0.1895 | 0.1649 |

TABLE 11

| | | | | | 14 examples of amplitude codebook (definition 2) | | | | | | | | |
|---|---|---|---|---|---|---|---|---|---|---|---|---|---|---|
| n | 2 | 2 | 2 | 2 | 2 | 2 | 2 | 2 | 2 | 2 | 2 | 2 | 2 | 2 |
| N | 7 | 8 | 9 | 10 | 11 | 12 | 13 | 14 | 15 | 16 | 17 | 18 | 19 | 20 |
| v0 | 0.9116 | 0.9375 | 0.9558 | 0.9688 | 0.9779 | 0.9844 | 0.9890 | 0.9922 | 0.9945 | 0.9961 | 0.9972 | 0.9981 | 0.9986 | 0.9990 |
| v1 | 0.8750 | 0.9116 | 0.9375 | 0.9558 | 0.9688 | 0.9779 | 0.9844 | 0.9890 | 0.9922 | 0.9945 | 0.9961 | 0.9972 | 0.9981 | 0.9986 |
| v2 | 0.8232 | 0.8750 | 0.9116 | 0.9375 | 0.9558 | 0.9688 | 0.9779 | 0.9844 | 0.9890 | 0.9922 | 0.9945 | 0.9961 | 0.9972 | 0.9981 |
| v3 | 0.7500 | 0.8232 | 0.8750 | 0.9116 | 0.9375 | 0.9558 | 0.9688 | 0.9779 | 0.9844 | 0.9890 | 0.9922 | 0.9945 | 0.9961 | 0.9972 |
| v4 | 0.6465 | 0.7500 | 0.8232 | 0.8750 | 0.9116 | 0.9375 | 0.9558 | 0.9688 | 0.9779 | 0.9844 | 0.9890 | 0.9922 | 0.9945 | 0.9961 |
| v5 | 0.5000 | 0.6465 | 0.7500 | 0.8232 | 0.8750 | 0.9116 | 0.9375 | 0.9558 | 0.9688 | 0.9779 | 0.9844 | 0.9890 | 0.9922 | 0.9945 |

TABLE 11-continued

| 14 examples of amplitude codebook (definition 2) | | | | | | | | | | | | | |
|---|---|---|---|---|---|---|---|---|---|---|---|---|---|
| n | 2 | 2 | 2 | 2 | 2 | 2 | 2 | 2 | 2 | 2 | 2 | 2 | 2 | 2 |
| v6 | 0.2929 | 0.5000 | 0.6465 | 0.7500 | 0.8232 | 0.8750 | 0.9116 | 0.9375 | 0.9558 | 0.9688 | 0.9779 | 0.9844 | 0.9890 | 0.9922 |
| v7 | 0.0000 | 0.2929 | 0.5000 | 0.6465 | 0.7500 | 0.8232 | 0.8750 | 0.9116 | 0.9375 | 0.9558 | 0.9688 | 0.9779 | 0.9844 | 0.9890 |

TABLE 12

| 14 examples of amplitude codebook (definition 2) | | | | | | | | | | | | | |
|---|---|---|---|---|---|---|---|---|---|---|---|---|---|
| n | 2.5 | 2.5 | 2.5 | 2.5 | 2.5 | 2.5 | 2.5 | 2.5 | 2.5 | 2.5 | 2.5 | 2.5 | 2.5 | 2.5 |
| N | 7 | 8 | 9 | 10 | 11 | 12 | 13 | 14 | 15 | 16 | 17 | 18 | 19 | 20 |
| v0 | 0.8564 | 0.8912 | 0.9175 | 0.9375 | 0.9526 | 0.9641 | 0.9728 | 0.9794 | 0.9844 | 0.9882 | 0.9910 | 0.9932 | 0.9949 | 0.9961 |
| v1 | 0.8105 | 0.8564 | 0.8912 | 0.9175 | 0.9375 | 0.9526 | 0.9641 | 0.9728 | 0.9794 | 0.9844 | 0.9882 | 0.9910 | 0.9932 | 0.9949 |
| v2 | 0.7500 | 0.8105 | 0.8564 | 0.8912 | 0.9175 | 0.9375 | 0.9526 | 0.9641 | 0.9728 | 0.9794 | 0.9844 | 0.9882 | 0.9910 | 0.9932 |
| v3 | 0.6701 | 0.7500 | 0.8105 | 0.8564 | 0.8912 | 0.9175 | 0.9375 | 0.9526 | 0.9641 | 0.9728 | 0.9794 | 0.9844 | 0.9882 | 0.9910 |
| v4 | 0.5647 | 0.6701 | 0.7500 | 0.8105 | 0.8564 | 0.8912 | 0.9175 | 0.9375 | 0.9526 | 0.9641 | 0.9728 | 0.9794 | 0.9844 | 0.9882 |
| v5 | 0.4257 | 0.5647 | 0.6701 | 0.7500 | 0.8105 | 0.8564 | 0.8912 | 0.9175 | 0.9375 | 0.9526 | 0.9641 | 0.9728 | 0.9794 | 0.9844 |
| v6 | 0.2421 | 0.4257 | 0.5647 | 0.6701 | 0.7500 | 0.8105 | 0.8564 | 0.8912 | 0.9175 | 0.9375 | 0.9526 | 0.9641 | 0.9728 | 0.9794 |
| v7 | 0.0000 | 0.2421 | 0.4257 | 0.5647 | 0.6701 | 0.7500 | 0.8105 | 0.8564 | 0.8912 | 0.9175 | 0.9375 | 0.9526 | 0.9641 | 0.9728 |

TABLE 13

| 14 examples of amplitude codebook (definition 2) | | | | | | | | | | | | | |
|---|---|---|---|---|---|---|---|---|---|---|---|---|---|
| n | 3 | 3 | 3 | 3 | 3 | 3 | 3 | 3 | 3 | 3 | 3 | 3 | 3 | 3 |
| N | 7 | 8 | 9 | 10 | 11 | 12 | 13 | 14 | 15 | 16 | 17 | 18 | 19 | 20 |
| v0 | 0.8016 | 0.8425 | 0.8750 | 0.9008 | 0.9213 | 0.9375 | 0.9504 | 0.9606 | 0.9688 | 0.9752 | 0.9803 | 0.9844 | 0.9876 | 0.9902 |
| v1 | 0.7500 | 0.8016 | 0.8425 | 0.8750 | 0.9008 | 0.9213 | 0.9375 | 0.9504 | 0.9606 | 0.9688 | 0.9752 | 0.9803 | 0.9844 | 0.9876 |
| v2 | 0.6850 | 0.7500 | 0.8016 | 0.8425 | 0.8750 | 0.9008 | 0.9213 | 0.9375 | 0.9504 | 0.9606 | 0.9688 | 0.9752 | 0.9803 | 0.9844 |
| v3 | 0.6032 | 0.6850 | 0.7500 | 0.8016 | 0.8425 | 0.8750 | 0.9008 | 0.9213 | 0.9375 | 0.9504 | 0.9606 | 0.9688 | 0.9752 | 0.9803 |
| v4 | 0.5000 | 0.6032 | 0.6850 | 0.7500 | 0.8016 | 0.8425 | 0.8750 | 0.9008 | 0.9213 | 0.9375 | 0.9504 | 0.9606 | 0.9688 | 0.9752 |
| v5 | 0.3700 | 0.5000 | 0.6032 | 0.6850 | 0.7500 | 0.8016 | 0.8425 | 0.8750 | 0.9008 | 0.9213 | 0.9375 | 0.9504 | 0.9606 | 0.9688 |
| v6 | 0.2063 | 0.3700 | 0.5000 | 0.6032 | 0.6850 | 0.7500 | 0.8016 | 0.8425 | 0.8750 | 0.9008 | 0.9213 | 0.9375 | 0.9504 | 0.9606 |
| v7 | 0.0000 | 0.2063 | 0.3700 | 0.5000 | 0.6032 | 0.6850 | 0.7500 | 0.8016 | 0.8425 | 0.8750 | 0.9008 | 0.9213 | 0.9375 | 0.9504 |

TABLE 14

| 14 examples of amplitude codebook (definition 2) | | | | | | | | | | | | | |
|---|---|---|---|---|---|---|---|---|---|---|---|---|---|
| n | 3.5 | 3.5 | 3.5 | 3.5 | 3.5 | 3.5 | 3.5 | 3.5 | 3.5 | 3.5 | 3.5 | 3.5 | 3.5 | 3.5 |
| N | 7 | 8 | 9 | 10 | 11 | 12 | 13 | 14 | 15 | 16 | 17 | 18 | 19 | 20 |
| v0 | 0.7500 | 0.7949 | 0.8318 | 0.8620 | 0.8868 | 0.9071 | 0.9238 | 0.9375 | 0.9487 | 0.9579 | 0.9655 | 0.9717 | 0.9768 | 0.9810 |
| v1 | 0.6953 | 0.7500 | 0.7949 | 0.8318 | 0.8620 | 0.8868 | 0.9071 | 0.9238 | 0.9375 | 0.9487 | 0.9579 | 0.9655 | 0.9717 | 0.9768 |
| v2 | 0.6285 | 0.6953 | 0.7500 | 0.7949 | 0.8318 | 0.8620 | 0.8868 | 0.9071 | 0.9238 | 0.9375 | 0.9487 | 0.9579 | 0.9655 | 0.9717 |
| v3 | 0.5471 | 0.6285 | 0.6953 | 0.7500 | 0.7949 | 0.8318 | 0.8620 | 0.8868 | 0.9071 | 0.9238 | 0.9375 | 0.9487 | 0.9579 | 0.9655 |
| v4 | 0.4480 | 0.5471 | 0.6285 | 0.6953 | 0.7500 | 0.7949 | 0.8318 | 0.8620 | 0.8868 | 0.9071 | 0.9238 | 0.9375 | 0.9487 | 0.9579 |
| v5 | 0.3271 | 0.4480 | 0.5471 | 0.6285 | 0.6953 | 0.7500 | 0.7949 | 0.8318 | 0.8620 | 0.8868 | 0.9071 | 0.9238 | 0.9375 | 0.9487 |
| v6 | 0.1797 | 0.3271 | 0.4480 | 0.5471 | 0.6285 | 0.6953 | 0.7500 | 0.7949 | 0.8318 | 0.8620 | 0.8868 | 0.9071 | 0.9238 | 0.9375 |
| v7 | 0.0000 | 0.1797 | 0.3271 | 0.4480 | 0.5471 | 0.6285 | 0.6953 | 0.7500 | 0.7949 | 0.8318 | 0.8620 | 0.8868 | 0.9071 | 0.9238 |

TABLE 15

| 14 examples of amplitude codebook (definition 2) | | | | | | | | | | | | | |
|---|---|---|---|---|---|---|---|---|---|---|---|---|---|
| n | 4 | 4 | 4 | 4 | 4 | 4 | 4 | 4 | 4 | 4 | 4 | 4 | 4 | 4 |
| N | 7 | 8 | 9 | 10 | 11 | 12 | 13 | 14 | 15 | 16 | 17 | 18 | 19 | 20 |
| v0 | 0.7027 | 0.7500 | 0.7898 | 0.8232 | 0.8514 | 0.8750 | 0.8949 | 0.9116 | 0.9257 | 0.9375 | 0.9474 | 0.9558 | 0.9628 | 0.9688 |
| v1 | 0.6465 | 0.7027 | 0.7500 | 0.7898 | 0.8232 | 0.8514 | 0.8750 | 0.8949 | 0.9116 | 0.9257 | 0.9375 | 0.9474 | 0.9558 | 0.9628 |
| v2 | 0.5796 | 0.6465 | 0.7027 | 0.7500 | 0.7898 | 0.8232 | 0.8514 | 0.8750 | 0.8949 | 0.9116 | 0.9257 | 0.9375 | 0.9474 | 0.9558 |
| v3 | 0.5000 | 0.5796 | 0.6465 | 0.7027 | 0.7500 | 0.7898 | 0.8232 | 0.8514 | 0.8750 | 0.8949 | 0.9116 | 0.9257 | 0.9375 | 0.9474 |
| v4 | 0.4054 | 0.5000 | 0.5796 | 0.6465 | 0.7027 | 0.7500 | 0.7898 | 0.8232 | 0.8514 | 0.8750 | 0.8949 | 0.9116 | 0.9257 | 0.9375 |
| v5 | 0.2929 | 0.4054 | 0.5000 | 0.5796 | 0.6465 | 0.7027 | 0.7500 | 0.7898 | 0.8232 | 0.8514 | 0.8750 | 0.8949 | 0.9116 | 0.9257 |
| v6 | 0.1591 | 0.2929 | 0.4054 | 0.5000 | 0.5796 | 0.6465 | 0.7027 | 0.7500 | 0.7898 | 0.8232 | 0.8514 | 0.8750 | 0.8949 | 0.9116 |
| v7 | 0.0000 | 0.1591 | 0.2929 | 0.4054 | 0.5000 | 0.5796 | 0.6465 | 0.7027 | 0.7500 | 0.7898 | 0.8232 | 0.8514 | 0.8750 | 0.8949 |

TABLE 16

14 examples of amplitude codebook (definition 2)

| n | 4.5 | 4.5 | 4.5 | 4.5 | 4.5 | 4.5 | 4.5 | 4.5 | 4.5 | 4.5 | 4.5 | 4.5 | 4.5 | 4.5 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.6598 | 0.7084 | 0.7500 | 0.7857 | 0.8163 | 0.8425 | 0.8650 | 0.8843 | 0.9008 | 0.9150 | 0.9271 | 0.9375 | 0.9464 | 0.9541 |
| v1 | 0.6032 | 0.6598 | 0.7084 | 0.7500 | 0.7857 | 0.8163 | 0.8425 | 0.8650 | 0.8843 | 0.9008 | 0.9150 | 0.9271 | 0.9375 | 0.9464 |
| v2 | 0.5371 | 0.6032 | 0.6598 | 0.7084 | 0.7500 | 0.7857 | 0.8163 | 0.8425 | 0.8650 | 0.8843 | 0.9008 | 0.9150 | 0.9271 | 0.9375 |
| v3 | 0.4600 | 0.5371 | 0.6032 | 0.6598 | 0.7084 | 0.7500 | 0.7857 | 0.8163 | 0.8425 | 0.8650 | 0.8843 | 0.9008 | 0.9150 | 0.9271 |
| v4 | 0.3700 | 0.4600 | 0.5371 | 0.6032 | 0.6598 | 0.7084 | 0.7500 | 0.7857 | 0.8163 | 0.8425 | 0.8650 | 0.8843 | 0.9008 | 0.9150 |
| v5 | 0.2651 | 0.3700 | 0.4600 | 0.5371 | 0.6032 | 0.6598 | 0.7084 | 0.7500 | 0.7857 | 0.8163 | 0.8425 | 0.8650 | 0.8843 | 0.9008 |
| v6 | 0.1428 | 0.2651 | 0.3700 | 0.4600 | 0.5371 | 0.6032 | 0.6598 | 0.7084 | 0.7500 | 0.7857 | 0.8163 | 0.8425 | 0.8650 | 0.8843 |
| v7 | 0.0000 | 0.1428 | 0.2651 | 0.3700 | 0.4600 | 0.5371 | 0.6032 | 0.6598 | 0.7084 | 0.7500 | 0.7857 | 0.8163 | 0.8425 | 0.8650 |

TABLE 17

14 examples of amplitude codebook (definition 2)

| n | 5 | 5 | 5 | 5 | 5 | 5 | 5 | 5 | 5 | 5 | 5 | 5 | 5 | 5 |
|---|---|---|---|---|---|---|---|---|---|---|---|---|---|---|
| N | 7 | 8 | 9 | 10 | 11 | 12 | 13 | 14 | 15 | 16 | 17 | 18 | 19 | 20 |
| v0 | 0.6211 | 0.6701 | 0.7128 | 0.7500 | 0.7824 | 0.8105 | 0.8351 | 0.8564 | 0.8750 | 0.8912 | 0.9053 | 0.9175 | 0.9282 | 0.9375 |
| v1 | 0.5647 | 0.6211 | 0.6701 | 0.7128 | 0.7500 | 0.7824 | 0.8105 | 0.8351 | 0.8564 | 0.8750 | 0.8912 | 0.9053 | 0.9175 | 0.9282 |
| v2 | 0.5000 | 0.5647 | 0.6211 | 0.6701 | 0.7128 | 0.7500 | 0.7824 | 0.8105 | 0.8351 | 0.8564 | 0.8750 | 0.8912 | 0.9053 | 0.9175 |
| v3 | 0.4257 | 0.5000 | 0.5647 | 0.6211 | 0.6701 | 0.7128 | 0.7500 | 0.7824 | 0.8105 | 0.8351 | 0.8564 | 0.8750 | 0.8912 | 0.9053 |
| v4 | 0.3403 | 0.4257 | 0.5000 | 0.5647 | 0.6211 | 0.6701 | 0.7128 | 0.7500 | 0.7824 | 0.8105 | 0.8351 | 0.8564 | 0.8750 | 0.8912 |
| v5 | 0.2421 | 0.3403 | 0.4257 | 0.5000 | 0.5647 | 0.6211 | 0.6701 | 0.7128 | 0.7500 | 0.7824 | 0.8105 | 0.8351 | 0.8564 | 0.8750 |
| v6 | 0.1295 | 0.2421 | 0.3403 | 0.4257 | 0.5000 | 0.5647 | 0.6211 | 0.6701 | 0.7128 | 0.7500 | 0.7824 | 0.8105 | 0.8351 | 0.8564 |
| v7 | 0.0000 | 0.1295 | 0.2421 | 0.3403 | 0.4257 | 0.5000 | 0.5647 | 0.6211 | 0.6701 | 0.7128 | 0.7500 | 0.7824 | 0.8105 | 0.8351 |

TABLE 18

14 examples of amplitude codebook (definition 1)

| n | 2 | 2 | 2 | 2 | 2 | 2 | 2 | 2 | 2 | 2 | 2 | 2 | 2 | 2 |
|---|---|---|---|---|---|---|---|---|---|---|---|---|---|---|
| N | 15 | 15.5 | 16 | 16.5 | 17 | 17.5 | 18 | 18.5 | 19 | 19.5 | 20 | 20.5 | 21 | 21.5 |
| v0 | 0.0055 | 0.0046 | 0.0039 | 0.0033 | 0.0028 | 0.0023 | 0.0020 | 0.0016 | 0.0014 | 0.0012 | 0.0010 | 0.0008 | 0.0007 | 0.0006 |
| v1 | 0.0078 | 0.0066 | 0.0055 | 0.0046 | 0.0039 | 0.0033 | 0.0028 | 0.0023 | 0.0020 | 0.0016 | 0.0014 | 0.0012 | 0.0010 | 0.0008 |
| v2 | 0.0110 | 0.0093 | 0.0078 | 0.0066 | 0.0055 | 0.0046 | 0.0039 | 0.0033 | 0.0028 | 0.0023 | 0.0020 | 0.0016 | 0.0014 | 0.0012 |
| v3 | 0.0156 | 0.0131 | 0.0110 | 0.0093 | 0.0078 | 0.0066 | 0.0055 | 0.0046 | 0.0039 | 0.0033 | 0.0028 | 0.0023 | 0.0020 | 0.0016 |
| v4 | 0.0221 | 0.0186 | 0.0156 | 0.0131 | 0.0110 | 0.0093 | 0.0078 | 0.0066 | 0.0055 | 0.0046 | 0.0039 | 0.0033 | 0.0028 | 0.0023 |
| v5 | 0.0313 | 0.0263 | 0.0221 | 0.0186 | 0.0156 | 0.0131 | 0.0110 | 0.0093 | 0.0078 | 0.0066 | 0.0055 | 0.0046 | 0.0039 | 0.0033 |
| v6 | 0.0442 | 0.0372 | 0.0313 | 0.0263 | 0.0221 | 0.0186 | 0.0156 | 0.0131 | 0.0110 | 0.0093 | 0.0078 | 0.0066 | 0.0055 | 0.0046 |
| v7 | 0.0625 | 0.0526 | 0.0442 | 0.0372 | 0.0313 | 0.0263 | 0.0221 | 0.0186 | 0.0156 | 0.0131 | 0.0110 | 0.0093 | 0.0078 | 0.0066 |
| v8 | 0.0884 | 0.0743 | 0.0625 | 0.0526 | 0.0442 | 0.0372 | 0.0313 | 0.0263 | 0.0221 | 0.0186 | 0.0156 | 0.0131 | 0.0110 | 0.0093 |
| v9 | 0.1250 | 0.1051 | 0.0884 | 0.0743 | 0.0625 | 0.0526 | 0.0442 | 0.0372 | 0.0313 | 0.0263 | 0.0221 | 0.0186 | 0.0156 | 0.0131 |
| v10 | 0.1768 | 0.1487 | 0.1250 | 0.1051 | 0.0884 | 0.0743 | 0.0625 | 0.0526 | 0.0442 | 0.0372 | 0.0313 | 0.0263 | 0.0221 | 0.0186 |
| v11 | 0.2500 | 0.2102 | 0.1768 | 0.1487 | 0.1250 | 0.1051 | 0.0884 | 0.0743 | 0.0625 | 0.0526 | 0.0442 | 0.0372 | 0.0313 | 0.0263 |
| v12 | 0.3536 | 0.2973 | 0.2500 | 0.2102 | 0.1768 | 0.1487 | 0.1250 | 0.1051 | 0.0884 | 0.0743 | 0.0625 | 0.0526 | 0.0442 | 0.0372 |
| v13 | 0.5000 | 0.4205 | 0.3536 | 0.2973 | 0.2500 | 0.2102 | 0.1768 | 0.1487 | 0.1250 | 0.1051 | 0.0884 | 0.0743 | 0.0625 | 0.0526 |
| v14 | 0.7071 | 0.5946 | 0.5000 | 0.4205 | 0.3536 | 0.2973 | 0.2500 | 0.2102 | 0.1768 | 0.1487 | 0.1250 | 0.1051 | 0.0884 | 0.0743 |
| v15 | 1.0000 | 0.8409 | 0.7071 | 0.5946 | 0.5000 | 0.4205 | 0.3536 | 0.2973 | 0.2500 | 0.2102 | 0.1768 | 0.1487 | 0.1250 | 0.1051 |

TABLE 19

14 examples of amplitude codebook (definition 1)

| n | 2.5 | 2.5 | 2.5 | 2.5 | 2.5 | 2.5 | 2.5 | 2.5 | 2.5 | 2.5 | 2.5 | 2.5 | 2.5 | 2.5 |
|---|---|---|---|---|---|---|---|---|---|---|---|---|---|---|
| N | 15 | 15.5 | 16 | 16.5 | 17 | 17.5 | 18 | 18.5 | 19 | 19.5 | 20 | 20.5 | 21 | 21.5 |
| v0 | 0.0156 | 0.0136 | 0.0118 | 0.0103 | 0.0090 | 0.0078 | 0.0068 | 0.0059 | 0.0052 | 0.0045 | 0.0039 | 0.0034 | 0.0030 | 0.0026 |
| v1 | 0.0206 | 0.0179 | 0.0156 | 0.0136 | 0.0118 | 0.0103 | 0.0090 | 0.0078 | 0.0068 | 0.0059 | 0.0052 | 0.0045 | 0.0039 | 0.0034 |
| v2 | 0.0272 | 0.0237 | 0.0206 | 0.0179 | 0.0156 | 0.0136 | 0.0118 | 0.0103 | 0.0090 | 0.0078 | 0.0068 | 0.0059 | 0.0052 | 0.0045 |
| v3 | 0.0359 | 0.0313 | 0.0272 | 0.0237 | 0.0206 | 0.0179 | 0.0156 | 0.0136 | 0.0118 | 0.0103 | 0.0090 | 0.0078 | 0.0068 | 0.0059 |
| v4 | 0.0474 | 0.0412 | 0.0359 | 0.0313 | 0.0272 | 0.0237 | 0.0206 | 0.0179 | 0.0156 | 0.0136 | 0.0118 | 0.0103 | 0.0090 | 0.0078 |
| v5 | 0.0625 | 0.0544 | 0.0474 | 0.0412 | 0.0359 | 0.0313 | 0.0272 | 0.0237 | 0.0206 | 0.0179 | 0.0156 | 0.0136 | 0.0118 | 0.0103 |
| v6 | 0.0825 | 0.0718 | 0.0625 | 0.0544 | 0.0474 | 0.0412 | 0.0359 | 0.0313 | 0.0272 | 0.0237 | 0.0206 | 0.0179 | 0.0156 | 0.0136 |
| v7 | 0.1088 | 0.0947 | 0.0825 | 0.0718 | 0.0625 | 0.0544 | 0.0474 | 0.0412 | 0.0359 | 0.0313 | 0.0272 | 0.0237 | 0.0206 | 0.0179 |
| v8 | 0.1436 | 0.1250 | 0.1088 | 0.0947 | 0.0825 | 0.0718 | 0.0625 | 0.0544 | 0.0474 | 0.0412 | 0.0359 | 0.0313 | 0.0272 | 0.0237 |
| v9 | 0.1895 | 0.1649 | 0.1436 | 0.1250 | 0.1088 | 0.0947 | 0.0825 | 0.0718 | 0.0625 | 0.0544 | 0.0474 | 0.0412 | 0.0359 | 0.0313 |
| v10 | 0.2500 | 0.2176 | 0.1895 | 0.1649 | 0.1436 | 0.1250 | 0.1088 | 0.0947 | 0.0825 | 0.0718 | 0.0625 | 0.0544 | 0.0474 | 0.0412 |
| v11 | 0.3299 | 0.2872 | 0.2500 | 0.2176 | 0.1895 | 0.1649 | 0.1436 | 0.1250 | 0.1088 | 0.0947 | 0.0825 | 0.0718 | 0.0625 | 0.0544 |
| v12 | 0.4353 | 0.3789 | 0.3299 | 0.2872 | 0.2500 | 0.2176 | 0.1895 | 0.1649 | 0.1436 | 0.1250 | 0.1088 | 0.0947 | 0.0825 | 0.0718 |

TABLE 19-continued

| | 14 examples of amplitude codebook (definition 1) | | | | | | | | | | | | |
|---|---|---|---|---|---|---|---|---|---|---|---|---|---|
| v13 | 0.5744 | 0.5000 | 0.4353 | 0.3789 | 0.3299 | 0.2872 | 0.2500 | 0.2176 | 0.1895 | 0.1649 | 0.1436 | 0.1250 | 0.1088 | 0.0947 |
| v14 | 0.7579 | 0.6598 | 0.5744 | 0.5000 | 0.4353 | 0.3789 | 0.3299 | 0.2872 | 0.2500 | 0.2176 | 0.1895 | 0.1649 | 0.1436 | 0.1250 |
| v15 | 1.0000 | 0.8706 | 0.7579 | 0.6598 | 0.5744 | 0.5000 | 0.4353 | 0.3789 | 0.3299 | 0.2872 | 0.2500 | 0.2176 | 0.1895 | 0.1649 |

TABLE 20

| | 14 examples of amplitude codebook (definition 1) | | | | | | | | | | | | |
|---|---|---|---|---|---|---|---|---|---|---|---|---|---|---|
| n | 3 | 3 | 3 | 3 | 3 | 3 | 3 | 3 | 3 | 3 | 3 | 3 | 3 | 3 |
| N | 15 | 15.5 | 16 | 16.5 | 17 | 17.5 | 18 | 18.5 | 19 | 19.5 | 20 | 20.5 | 21 | 21.5 |
| v0 | 0.0313 | 0.0278 | 0.0248 | 0.0221 | 0.0197 | 0.0175 | 0.0156 | 0.0139 | 0.0124 | 0.0110 | 0.0098 | 0.0088 | 0.0078 | 0.0070 |
| v1 | 0.0394 | 0.0351 | 0.0313 | 0.0278 | 0.0248 | 0.0221 | 0.0197 | 0.0175 | 0.0156 | 0.0139 | 0.0124 | 0.0110 | 0.0098 | 0.0088 |
| v2 | 0.0496 | 0.0442 | 0.0394 | 0.0351 | 0.0313 | 0.0278 | 0.0248 | 0.0221 | 0.0197 | 0.0175 | 0.0156 | 0.0139 | 0.0124 | 0.0110 |
| v3 | 0.0625 | 0.0557 | 0.0496 | 0.0442 | 0.0394 | 0.0351 | 0.0313 | 0.0278 | 0.0248 | 0.0221 | 0.0197 | 0.0175 | 0.0156 | 0.0139 |
| v4 | 0.0787 | 0.0702 | 0.0625 | 0.0557 | 0.0496 | 0.0442 | 0.0394 | 0.0351 | 0.0313 | 0.0278 | 0.0248 | 0.0221 | 0.0197 | 0.0175 |
| v5 | 0.0992 | 0.0884 | 0.0787 | 0.0702 | 0.0625 | 0.0557 | 0.0496 | 0.0442 | 0.0394 | 0.0351 | 0.0313 | 0.0278 | 0.0248 | 0.0221 |
| v6 | 0.1250 | 0.1114 | 0.0992 | 0.0884 | 0.0787 | 0.0702 | 0.0625 | 0.0557 | 0.0496 | 0.0442 | 0.0394 | 0.0351 | 0.0313 | 0.0278 |
| v7 | 0.1575 | 0.1403 | 0.1250 | 0.1114 | 0.0992 | 0.0884 | 0.0787 | 0.0702 | 0.0625 | 0.0557 | 0.0496 | 0.0442 | 0.0394 | 0.0351 |
| v8 | 0.1984 | 0.1768 | 0.1575 | 0.1403 | 0.1250 | 0.1114 | 0.0992 | 0.0884 | 0.0787 | 0.0702 | 0.0625 | 0.0557 | 0.0496 | 0.0442 |
| v9 | 0.2500 | 0.2227 | 0.1984 | 0.1768 | 0.1575 | 0.1403 | 0.1250 | 0.1114 | 0.0992 | 0.0884 | 0.0787 | 0.0702 | 0.0625 | 0.0557 |
| v10 | 0.3150 | 0.2806 | 0.2500 | 0.2227 | 0.1984 | 0.1768 | 0.1575 | 0.1403 | 0.1250 | 0.1114 | 0.0992 | 0.0884 | 0.0787 | 0.0702 |
| v11 | 0.3969 | 0.3536 | 0.3150 | 0.2806 | 0.2500 | 0.2227 | 0.1984 | 0.1768 | 0.1575 | 0.1403 | 0.1250 | 0.1114 | 0.0992 | 0.0884 |
| v12 | 0.5000 | 0.4455 | 0.3969 | 0.3536 | 0.3150 | 0.2806 | 0.2500 | 0.2227 | 0.1984 | 0.1768 | 0.1575 | 0.1403 | 0.1250 | 0.1114 |
| v13 | 0.6300 | 0.5612 | 0.5000 | 0.4455 | 0.3969 | 0.3536 | 0.3150 | 0.2806 | 0.2500 | 0.2227 | 0.1984 | 0.1768 | 0.1575 | 0.1403 |
| v14 | 0.7937 | 0.7071 | 0.6300 | 0.5612 | 0.5000 | 0.4455 | 0.3969 | 0.3536 | 0.3150 | 0.2806 | 0.2500 | 0.2227 | 0.1984 | 0.1768 |
| v15 | 1.0000 | 0.8909 | 0.7937 | 0.7071 | 0.6300 | 0.5612 | 0.5000 | 0.4455 | 0.3969 | 0.3536 | 0.3150 | 0.2806 | 0.2500 | 0.2227 |

TABLE 21

| | 14 examples of amplitude codebook (definition 1) | | | | | | | | | | | | |
|---|---|---|---|---|---|---|---|---|---|---|---|---|---|---|
| n | 3.5 | 3.5 | 3.5 | 3.5 | 3.5 | 3.5 | 3.5 | 3.5 | 3.5 | 3.5 | 3.5 | 3.5 | 3.5 | 3.5 |
| N | 15 | 15.5 | 16 | 16.5 | 17 | 17.5 | 18 | 18.5 | 19 | 19.5 | 20 | 20.5 | 21 | 21.5 |
| v0 | 0.0513 | 0.0464 | 0.0421 | 0.0381 | 0.0345 | 0.0313 | 0.0283 | 0.0256 | 0.0232 | 0.0210 | 0.0190 | 0.0173 | 0.0156 | 0.0142 |
| v1 | 0.0625 | 0.0566 | 0.0513 | 0.0464 | 0.0421 | 0.0381 | 0.0345 | 0.0313 | 0.0283 | 0.0256 | 0.0232 | 0.0210 | 0.0190 | 0.0173 |
| v2 | 0.0762 | 0.0690 | 0.0625 | 0.0566 | 0.0513 | 0.0464 | 0.0421 | 0.0381 | 0.0345 | 0.0313 | 0.0283 | 0.0256 | 0.0232 | 0.0210 |
| v3 | 0.0929 | 0.0841 | 0.0762 | 0.0690 | 0.0625 | 0.0566 | 0.0513 | 0.0464 | 0.0421 | 0.0381 | 0.0345 | 0.0313 | 0.0283 | 0.0256 |
| v4 | 0.1132 | 0.1025 | 0.0929 | 0.0841 | 0.0762 | 0.0690 | 0.0625 | 0.0566 | 0.0513 | 0.0464 | 0.0421 | 0.0381 | 0.0345 | 0.0313 |
| v5 | 0.1380 | 0.1250 | 0.1132 | 0.1025 | 0.0929 | 0.0841 | 0.0762 | 0.0690 | 0.0625 | 0.0566 | 0.0513 | 0.0464 | 0.0421 | 0.0381 |
| v6 | 0.1682 | 0.1524 | 0.1380 | 0.1250 | 0.1132 | 0.1025 | 0.0929 | 0.0841 | 0.0762 | 0.0690 | 0.0625 | 0.0566 | 0.0513 | 0.0464 |
| v7 | 0.2051 | 0.1858 | 0.1682 | 0.1524 | 0.1380 | 0.1250 | 0.1132 | 0.1025 | 0.0929 | 0.0841 | 0.0762 | 0.0690 | 0.0625 | 0.0566 |
| v8 | 0.2500 | 0.2264 | 0.2051 | 0.1858 | 0.1682 | 0.1524 | 0.1380 | 0.1250 | 0.1132 | 0.1025 | 0.0929 | 0.0841 | 0.0762 | 0.0690 |
| v9 | 0.3048 | 0.2760 | 0.2500 | 0.2264 | 0.2051 | 0.1858 | 0.1682 | 0.1524 | 0.1380 | 0.1250 | 0.1132 | 0.1025 | 0.0929 | 0.0841 |
| v10 | 0.3715 | 0.3365 | 0.3048 | 0.2760 | 0.2500 | 0.2264 | 0.2051 | 0.1858 | 0.1682 | 0.1524 | 0.1380 | 0.1250 | 0.1132 | 0.1025 |
| v11 | 0.4529 | 0.4102 | 0.3715 | 0.3365 | 0.3048 | 0.2760 | 0.2500 | 0.2264 | 0.2051 | 0.1858 | 0.1682 | 0.1524 | 0.1380 | 0.1250 |
| v12 | 0.5520 | 0.5000 | 0.4529 | 0.4102 | 0.3715 | 0.3365 | 0.3048 | 0.2760 | 0.2500 | 0.2264 | 0.2051 | 0.1858 | 0.1682 | 0.1524 |
| v13 | 0.6730 | 0.6095 | 0.5520 | 0.5000 | 0.4529 | 0.4102 | 0.3715 | 0.3365 | 0.3048 | 0.2760 | 0.2500 | 0.2264 | 0.2051 | 0.1858 |
| v14 | 0.8203 | 0.7430 | 0.6730 | 0.6095 | 0.5520 | 0.5000 | 0.4529 | 0.4102 | 0.3715 | 0.3365 | 0.3048 | 0.2760 | 0.2500 | 0.2264 |
| v15 | 1.0000 | 0.9057 | 0.8203 | 0.7430 | 0.6730 | 0.6095 | 0.5520 | 0.5000 | 0.4529 | 0.4102 | 0.3715 | 0.3365 | 0.3048 | 0.2760 |

TABLE 22

| | 14 examples of amplitude codebook (definition 1) | | | | | | | | | | | | |
|---|---|---|---|---|---|---|---|---|---|---|---|---|---|---|
| n | 4 | 4 | 4 | 4 | 4 | 4 | 4 | 4 | 4 | 4 | 4 | 4 | 4 | 4 |
| N | 15 | 15.5 | 16 | 16.5 | 17 | 17.5 | 18 | 18.5 | 19 | 19.5 | 20 | 20.5 | 21 | 21.5 |
| v0 | 0.0743 | 0.0682 | 0.0625 | 0.0573 | 0.0526 | 0.0482 | 0.0442 | 0.0405 | 0.0372 | 0.0341 | 0.0313 | 0.0287 | 0.0263 | 0.0241 |
| | 0.0884 | 0.0811 | 0.0743 | 0.0682 | 0.0625 | 0.0573 | 0.0526 | 0.0482 | 0.0442 | 0.0405 | 0.0372 | 0.0341 | 0.0313 | 0.0287 |
| v2 | 0.1051 | 0.0964 | 0.0884 | 0.0811 | 0.0743 | 0.0682 | 0.0625 | 0.0573 | 0.0526 | 0.0482 | 0.0442 | 0.0405 | 0.0372 | 0.0341 |
| v3 | 0.1250 | 0.1146 | 0.1051 | 0.0964 | 0.0884 | 0.0811 | 0.0743 | 0.0682 | 0.0625 | 0.0573 | 0.0526 | 0.0482 | 0.0442 | 0.0405 |
| v4 | 0.1487 | 0.1363 | 0.1250 | 0.1146 | 0.1051 | 0.0964 | 0.0884 | 0.0811 | 0.0743 | 0.0682 | 0.0625 | 0.0573 | 0.0526 | 0.0482 |
| v5 | 0.1768 | 0.1621 | 0.1487 | 0.1363 | 0.1250 | 0.1146 | 0.1051 | 0.0964 | 0.0884 | 0.0811 | 0.0743 | 0.0682 | 0.0625 | 0.0573 |
| v6 | 0.2102 | 0.1928 | 0.1768 | 0.1621 | 0.1487 | 0.1363 | 0.1250 | 0.1146 | 0.1051 | 0.0964 | 0.0884 | 0.0811 | 0.0743 | 0.0682 |
| v7 | 0.2500 | 0.2293 | 0.2102 | 0.1928 | 0.1768 | 0.1621 | 0.1487 | 0.1363 | 0.1250 | 0.1146 | 0.1051 | 0.0964 | 0.0884 | 0.0811 |
| v8 | 0.2973 | 0.2726 | 0.2500 | 0.2293 | 0.2102 | 0.1928 | 0.1768 | 0.1621 | 0.1487 | 0.1363 | 0.1250 | 0.1146 | 0.1051 | 0.0964 |

TABLE 22-continued

| | 14 examples of amplitude codebook (definition 1) | | | | | | | | | | | | | |
|---|---|---|---|---|---|---|---|---|---|---|---|---|---|---|
| v9 | 0.3536 | 0.3242 | 0.2973 | 0.2726 | 0.2500 | 0.2293 | 0.2102 | 0.1928 | 0.1768 | 0.1621 | 0.1487 | 0.1363 | 0.1250 | 0.1146 |
| v10 | 0.4205 | 0.3856 | 0.3536 | 0.3242 | 0.2973 | 0.2726 | 0.2500 | 0.2293 | 0.2102 | 0.1928 | 0.1768 | 0.1621 | 0.1487 | 0.1363 |
| v11 | 0.5000 | 0.4585 | 0.4205 | 0.3856 | 0.3536 | 0.3242 | 0.2973 | 0.2726 | 0.2500 | 0.2293 | 0.2102 | 0.1928 | 0.1768 | 0.1621 |
| v12 | 0.5946 | 0.5453 | 0.5000 | 0.4585 | 0.4205 | 0.3856 | 0.3536 | 0.3242 | 0.2973 | 0.2726 | 0.2500 | 0.2293 | 0.2102 | 0.1928 |
| v13 | 0.7071 | 0.6484 | 0.5946 | 0.5453 | 0.5000 | 0.4585 | 0.4205 | 0.3856 | 0.3536 | 0.3242 | 0.2973 | 0.2726 | 0.2500 | 0.2293 |
| v14 | 0.8409 | 0.7711 | 0.7071 | 0.6484 | 0.5946 | 0.5453 | 0.5000 | 0.4585 | 0.4205 | 0.3856 | 0.3536 | 0.3242 | 0.2973 | 0.2726 |
| v15 | 1.0000 | 0.9170 | 0.8409 | 0.7711 | 0.7071 | 0.6484 | 0.5946 | 0.5453 | 0.5000 | 0.4585 | 0.4205 | 0.3856 | 0.3536 | 0.3242 |

TABLE 23

| | 14 examples of amplitude codebook (definition 1) | | | | | | | | | | | | | |
|---|---|---|---|---|---|---|---|---|---|---|---|---|---|---|
| n | 4.5 | 4.5 | 4.5 | 4.5 | 4.5 | 4.5 | 4.5 | 4.5 | 4.5 | 4.5 | 4.5 | 4.5 | 4.5 | 4.5 |
| N | 15 | 15.5 | 16 | 16.5 | 17 | 17.5 | 18 | 18.5 | 19 | 19.5 | 20 | 20.5 | 21 | 21.5 |
| v0 | 0.0992 | 0.0919 | 0.0850 | 0.0787 | 0.0729 | 0.0675 | 0.0625 | 0.0579 | 0.0536 | 0.0496 | 0.0459 | 0.0425 | 0.0394 | 0.0365 |
| v1 | 0.1157 | 0.1072 | 0.0992 | 0.0919 | 0.0850 | 0.0787 | 0.0729 | 0.0675 | 0.0625 | 0.0579 | 0.0536 | 0.0496 | 0.0459 | 0.0425 |
| v2 | 0.1350 | 0.1250 | 0.1157 | 0.1072 | 0.0992 | 0.0919 | 0.0850 | 0.0787 | 0.0729 | 0.0675 | 0.0625 | 0.0579 | 0.0536 | 0.0496 |
| v3 | 0.1575 | 0.1458 | 0.1350 | 0.1250 | 0.1157 | 0.1072 | 0.0992 | 0.0919 | 0.0850 | 0.0787 | 0.0729 | 0.0675 | 0.0625 | 0.0579 |
| v4 | 0.1837 | 0.1701 | 0.1575 | 0.1458 | 0.1350 | 0.1250 | 0.1157 | 0.1072 | 0.0992 | 0.0919 | 0.0850 | 0.0787 | 0.0729 | 0.0675 |
| v5 | 0.2143 | 0.1984 | 0.1837 | 0.1701 | 0.1575 | 0.1458 | 0.1350 | 0.1250 | 0.1157 | 0.1072 | 0.0992 | 0.0919 | 0.0850 | 0.0787 |
| v6 | 0.2500 | 0.2315 | 0.2143 | 0.1984 | 0.1837 | 0.1701 | 0.1575 | 0.1458 | 0.1350 | 0.1250 | 0.1157 | 0.1072 | 0.0992 | 0.0919 |
| v7 | 0.2916 | 0.2700 | 0.2500 | 0.2315 | 0.2143 | 0.1984 | 0.1837 | 0.1701 | 0.1575 | 0.1458 | 0.1350 | 0.1250 | 0.1157 | 0.1072 |
| v8 | 0.3402 | 0.3150 | 0.2916 | 0.2700 | 0.2500 | 0.2315 | 0.2143 | 0.1984 | 0.1837 | 0.1701 | 0.1575 | 0.1458 | 0.1350 | 0.1250 |
| v9 | 0.3969 | 0.3674 | 0.3402 | 0.3150 | 0.2916 | 0.2700 | 0.2500 | 0.2315 | 0.2143 | 0.1984 | 0.1837 | 0.1701 | 0.1575 | 0.1458 |
| v10 | 0.4629 | 0.4286 | 0.3969 | 0.3674 | 0.3402 | 0.3150 | 0.2916 | 0.2700 | 0.2500 | 0.2315 | 0.2143 | 0.1984 | 0.1837 | 0.1701 |
| v11 | 0.5400 | 0.5000 | 0.4629 | 0.4286 | 0.3969 | 0.3674 | 0.3402 | 0.3150 | 0.2916 | 0.2700 | 0.2500 | 0.2315 | 0.2143 | 0.1984 |
| v12 | 0.6300 | 0.5833 | 0.5400 | 0.5000 | 0.4629 | 0.4286 | 0.3969 | 0.3674 | 0.3402 | 0.3150 | 0.2916 | 0.2700 | 0.2500 | 0.2315 |
| v13 | 0.7349 | 0.6804 | 0.6300 | 0.5833 | 0.5400 | 0.5000 | 0.4629 | 0.4286 | 0.3969 | 0.3674 | 0.3402 | 0.3150 | 0.2916 | 0.2700 |
| v14 | 0.8572 | 0.7937 | 0.7349 | 0.6804 | 0.6300 | 0.5833 | 0.5400 | 0.5000 | 0.4629 | 0.4286 | 0.3969 | 0.3674 | 0.3402 | 0.3150 |
| v15 | 1.0000 | 0.9259 | 0.8572 | 0.7937 | 0.7349 | 0.6804 | 0.6300 | 0.5833 | 0.5400 | 0.5000 | 0.4629 | 0.4286 | 0.3969 | 0.3674 |

TABLE 24

| | 14 examples of amplitude codebook (definition 1) | | | | | | | | | | | | | |
|---|---|---|---|---|---|---|---|---|---|---|---|---|---|---|
| n | 5 | 5 | 5 | 5 | 5 | 5 | 5 | 5 | 5 | 5 | 5 | 5 | 5 | 5 |
| N | 15 | 15.5 | 16 | 16.5 | 17 | 17.5 | 18 | 18.5 | 19 | 19.5 | 20 | 20.5 | 21 | 21.5 |
| v0 | 0.1250 | 0.1166 | 0.1088 | 0.1015 | 0.0947 | 0.0884 | 0.0825 | 0.0769 | 0.0718 | 0.0670 | 0.0625 | 0.0583 | 0.0544 | 0.0508 |
| v1 | 0.1436 | 0.1340 | 0.1250 | 0.1166 | 0.1088 | 0.1015 | 0.0947 | 0.0884 | 0.0825 | 0.0769 | 0.0718 | 0.0670 | 0.0625 | 0.0583 |
| v2 | 0.1649 | 0.1539 | 0.1436 | 0.1340 | 0.1250 | 0.1166 | 0.1088 | 0.1015 | 0.0947 | 0.0884 | 0.0825 | 0.0769 | 0.0718 | 0.0670 |
| v3 | 0.1895 | 0.1768 | 0.1649 | 0.1539 | 0.1436 | 0.1340 | 0.1250 | 0.1166 | 0.1088 | 0.1015 | 0.0947 | 0.0884 | 0.0825 | 0.0769 |
| v4 | 0.2176 | 0.2031 | 0.1895 | 0.1768 | 0.1649 | 0.1539 | 0.1436 | 0.1340 | 0.1250 | 0.1166 | 0.1088 | 0.1015 | 0.0947 | 0.0884 |
| v5 | 0.2500 | 0.2333 | 0.2176 | 0.2031 | 0.1895 | 0.1768 | 0.1649 | 0.1539 | 0.1436 | 0.1340 | 0.1250 | 0.1166 | 0.1088 | 0.1015 |
| v6 | 0.2872 | 0.2679 | 0.2500 | 0.2333 | 0.2176 | 0.2031 | 0.1895 | 0.1768 | 0.1649 | 0.1539 | 0.1436 | 0.1340 | 0.1250 | 0.1166 |
| v7 | 0.3299 | 0.3078 | 0.2872 | 0.2679 | 0.2500 | 0.2333 | 0.2176 | 0.2031 | 0.1895 | 0.1768 | 0.1649 | 0.1539 | 0.1436 | 0.1340 |
| v8 | 0.3789 | 0.3536 | 0.3299 | 0.3078 | 0.2872 | 0.2679 | 0.2500 | 0.2333 | 0.2176 | 0.2031 | 0.1895 | 0.1768 | 0.1649 | 0.1539 |
| v9 | 0.4353 | 0.4061 | 0.3789 | 0.3536 | 0.3299 | 0.3078 | 0.2872 | 0.2679 | 0.2500 | 0.2333 | 0.2176 | 0.2031 | 0.1895 | 0.1768 |
| v10 | 0.5000 | 0.4665 | 0.4353 | 0.4061 | 0.3789 | 0.3536 | 0.3299 | 0.3078 | 0.2872 | 0.2679 | 0.2500 | 0.2333 | 0.2176 | 0.2031 |
| v11 | 0.5744 | 0.5359 | 0.5000 | 0.4665 | 0.4353 | 0.4061 | 0.3789 | 0.3536 | 0.3299 | 0.3078 | 0.2872 | 0.2679 | 0.2500 | 0.2333 |
| v12 | 0.6598 | 0.6156 | 0.5744 | 0.5359 | 0.5000 | 0.4665 | 0.4353 | 0.4061 | 0.3789 | 0.3536 | 0.3299 | 0.3078 | 0.2872 | 0.2679 |
| v13 | 0.7579 | 0.7071 | 0.6598 | 0.6156 | 0.5744 | 0.5359 | 0.5000 | 0.4665 | 0.4353 | 0.4061 | 0.3789 | 0.3536 | 0.3299 | 0.3078 |
| v14 | 0.8706 | 0.8123 | 0.7579 | 0.7071 | 0.6598 | 0.6156 | 0.5744 | 0.5359 | 0.5000 | 0.4665 | 0.4353 | 0.4061 | 0.3789 | 0.3536 |
| v15 | 1.0000 | 0.9330 | 0.8706 | 0.8123 | 0.7579 | 0.7071 | 0.6598 | 0.6156 | 0.5744 | 0.5359 | 0.5000 | 0.4665 | 0.4353 | 0.4061 |

TABLE 25

| | 14 examples of amplitude codebook (definition 2) | | | | | | | | | | | | | |
|---|---|---|---|---|---|---|---|---|---|---|---|---|---|---|
| n | 2 | 2 | 2 | 2 | 2 | 2 | 2 | 2 | 2 | 2 | 2 | 2 | 2 | 2 |
| N | 15 | 15.5 | 16 | 16.5 | 17 | 17.5 | 18 | 18.5 | 19 | 19.5 | 20 | 20.5 | 21 | 21.5 |
| v0 | 0.9945 | 0.9954 | 0.9961 | 0.9967 | 0.9972 | 0.9977 | 0.9981 | 0.9984 | 0.9986 | 0.9988 | 0.9990 | 0.9992 | 0.9993 | 0.9994 |
| v1 | 0.9922 | 0.9934 | 0.9945 | 0.9954 | 0.9961 | 0.9967 | 0.9972 | 0.9977 | 0.9981 | 0.9984 | 0.9986 | 0.9988 | 0.9990 | 0.9992 |
| v2 | 0.9890 | 0.9907 | 0.9922 | 0.9934 | 0.9945 | 0.9954 | 0.9961 | 0.9967 | 0.9972 | 0.9977 | 0.9981 | 0.9984 | 0.9986 | 0.9988 |
| v3 | 0.9844 | 0.9869 | 0.9890 | 0.9907 | 0.9922 | 0.9934 | 0.9945 | 0.9954 | 0.9961 | 0.9967 | 0.9972 | 0.9977 | 0.9981 | 0.9984 |
| v4 | 0.9779 | 0.9814 | 0.9844 | 0.9869 | 0.9890 | 0.9907 | 0.9922 | 0.9934 | 0.9945 | 0.9954 | 0.9961 | 0.9967 | 0.9972 | 0.9977 |

TABLE 25-continued

14 examples of amplitude codebook (definition 2)

| | | | | | | | | | | | | | | |
|---|---|---|---|---|---|---|---|---|---|---|---|---|---|
| v5 | 0.9688 | 0.9737 | 0.9779 | 0.9814 | 0.9844 | 0.9869 | 0.9890 | 0.9907 | 0.9922 | 0.9934 | 0.9945 | 0.9954 | 0.9961 | 0.9967 |
| v6 | 0.9558 | 0.9628 | 0.9688 | 0.9737 | 0.9779 | 0.9814 | 0.9844 | 0.9869 | 0.9890 | 0.9907 | 0.9922 | 0.9934 | 0.9945 | 0.9954 |
| v7 | 0.9375 | 0.9474 | 0.9558 | 0.9628 | 0.9688 | 0.9737 | 0.9779 | 0.9814 | 0.9844 | 0.9869 | 0.9890 | 0.9907 | 0.9922 | 0.9934 |
| v8 | 0.9116 | 0.9257 | 0.9375 | 0.9474 | 0.9558 | 0.9628 | 0.9688 | 0.9737 | 0.9779 | 0.9814 | 0.9844 | 0.9869 | 0.9890 | 0.9907 |
| v9 | 0.8750 | 0.8949 | 0.9116 | 0.9257 | 0.9375 | 0.9474 | 0.9558 | 0.9628 | 0.9688 | 0.9737 | 0.9779 | 0.9814 | 0.9844 | 0.9869 |
| v10 | 0.8232 | 0.8514 | 0.8750 | 0.8949 | 0.9116 | 0.9257 | 0.9375 | 0.9474 | 0.9558 | 0.9628 | 0.9688 | 0.9737 | 0.9779 | 0.9814 |
| v11 | 0.7500 | 0.7898 | 0.8232 | 0.8514 | 0.8750 | 0.8949 | 0.9116 | 0.9257 | 0.9375 | 0.9474 | 0.9558 | 0.9628 | 0.9688 | 0.9737 |
| v12 | 0.6465 | 0.7027 | 0.7500 | 0.7898 | 0.8232 | 0.8514 | 0.8750 | 0.8949 | 0.9116 | 0.9257 | 0.9375 | 0.9474 | 0.9558 | 0.9628 |
| v13 | 0.5000 | 0.5796 | 0.6465 | 0.7027 | 0.7500 | 0.7898 | 0.8232 | 0.8514 | 0.8750 | 0.8949 | 0.9116 | 0.9257 | 0.9375 | 0.9474 |
| v14 | 0.2929 | 0.4054 | 0.5000 | 0.5796 | 0.6465 | 0.7027 | 0.7500 | 0.7898 | 0.8232 | 0.8514 | 0.8750 | 0.8949 | 0.9116 | 0.9257 |
| v15 | 0.0000 | 0.1591 | 0.2929 | 0.4054 | 0.5000 | 0.5796 | 0.6465 | 0.7027 | 0.7500 | 0.7898 | 0.8232 | 0.8514 | 0.8750 | 0.8949 |

TABLE 26

14 examples of amplitude codebook (definition 2)

| n | 2.5 | 2.5 | 2.5 | 2.5 | 2.5 | 2.5 | 2.5 | 2.5 | 2.5 | 2.5 | 2.5 | 2.5 | 2.5 | 2.5 |
|---|---|---|---|---|---|---|---|---|---|---|---|---|---|---|
| N | 15 | 15.5 | 16 | 16.5 | 17 | 17.5 | 18 | 18.5 | 19 | 19.5 | 20 | 20.5 | 21 | 21.5 |
| v0 | 0.9844 | 0.9864 | 0.9882 | 0.9897 | 0.9910 | 0.9922 | 0.9932 | 0.9941 | 0.9949 | 0.9955 | 0.9961 | 0.9966 | 0.9970 | 0.9974 |
| v1 | 0.9794 | 0.9821 | 0.9844 | 0.9864 | 0.9882 | 0.9897 | 0.9910 | 0.9922 | 0.9932 | 0.9941 | 0.9949 | 0.9955 | 0.9961 | 0.9966 |
| v2 | 0.9728 | 0.9763 | 0.9794 | 0.9821 | 0.9844 | 0.9864 | 0.9882 | 0.9897 | 0.9910 | 0.9922 | 0.9932 | 0.9941 | 0.9949 | 0.9955 |
| v3 | 0.9641 | 0.9688 | 0.9728 | 0.9763 | 0.9794 | 0.9821 | 0.9844 | 0.9864 | 0.9882 | 0.9897 | 0.9910 | 0.9922 | 0.9932 | 0.9941 |
| v4 | 0.9526 | 0.9588 | 0.9641 | 0.9688 | 0.9728 | 0.9763 | 0.9794 | 0.9821 | 0.9844 | 0.9864 | 0.9882 | 0.9897 | 0.9910 | 0.9922 |
| v5 | 0.9375 | 0.9456 | 0.9526 | 0.9588 | 0.9641 | 0.9688 | 0.9728 | 0.9763 | 0.9794 | 0.9821 | 0.9844 | 0.9864 | 0.9882 | 0.9897 |
| v6 | 0.9175 | 0.9282 | 0.9375 | 0.9456 | 0.9526 | 0.9588 | 0.9641 | 0.9688 | 0.9728 | 0.9763 | 0.9794 | 0.9821 | 0.9844 | 0.9864 |
| v7 | 0.8912 | 0.9053 | 0.9175 | 0.9282 | 0.9375 | 0.9456 | 0.9526 | 0.9588 | 0.9641 | 0.9688 | 0.9728 | 0.9763 | 0.9794 | 0.9821 |
| v8 | 0.8564 | 0.8750 | 0.8912 | 0.9053 | 0.9175 | 0.9282 | 0.9375 | 0.9456 | 0.9526 | 0.9588 | 0.9641 | 0.9688 | 0.9728 | 0.9763 |
| v9 | 0.8105 | 0.8351 | 0.8564 | 0.8750 | 0.8912 | 0.9053 | 0.9175 | 0.9282 | 0.9375 | 0.9456 | 0.9526 | 0.9588 | 0.9641 | 0.9688 |
| v10 | 0.7500 | 0.7824 | 0.8105 | 0.8351 | 0.8564 | 0.8750 | 0.8912 | 0.9053 | 0.9175 | 0.9282 | 0.9375 | 0.9456 | 0.9526 | 0.9588 |
| v11 | 0.6701 | 0.7128 | 0.7500 | 0.7824 | 0.8105 | 0.8351 | 0.8564 | 0.8750 | 0.8912 | 0.9053 | 0.9175 | 0.9282 | 0.9375 | 0.9456 |
| v12 | 0.5647 | 0.6211 | 0.6701 | 0.7128 | 0.7500 | 0.7824 | 0.8105 | 0.8351 | 0.8564 | 0.8750 | 0.8912 | 0.9053 | 0.9175 | 0.9282 |
| v13 | 0.4257 | 0.5000 | 0.5647 | 0.6211 | 0.6701 | 0.7128 | 0.7500 | 0.7824 | 0.8105 | 0.8351 | 0.8564 | 0.8750 | 0.8912 | 0.9053 |
| v14 | 0.2421 | 0.3403 | 0.4257 | 0.5000 | 0.5647 | 0.6211 | 0.6701 | 0.7128 | 0.7500 | 0.7824 | 0.8105 | 0.8351 | 0.8564 | 0.8750 |
| v15 | 0.0000 | 0.1295 | 0.2421 | 0.3403 | 0.4257 | 0.5000 | 0.5647 | 0.6211 | 0.6701 | 0.7128 | 0.7500 | 0.7824 | 0.8105 | 0.8351 |

TABLE 27

14 examples of amplitude codebook (definition 2)

| n | 3 | 3 | 3 | 3 | 3 | 3 | 3 | 3 | 3 | 3 | 3 | 3 | 3 | 3 |
|---|---|---|---|---|---|---|---|---|---|---|---|---|---|---|
| N | 15 | 15.5 | 16 | 16.5 | 17 | 17.5 | 18 | 18.5 | 19 | 19.5 | 20 | 20.5 | 21 | 21.5 |
| v0 | 0.9688 | 0.9722 | 0.9752 | 0.9779 | 0.9803 | 0.9825 | 0.9844 | 0.9861 | 0.9876 | 0.9890 | 0.9902 | 0.9912 | 0.9922 | 0.9930 |
| v1 | 0.9606 | 0.9649 | 0.9688 | 0.9722 | 0.9752 | 0.9779 | 0.9803 | 0.9825 | 0.9844 | 0.9861 | 0.9876 | 0.9890 | 0.9902 | 0.9912 |
| v2 | 0.9504 | 0.9558 | 0.9606 | 0.9649 | 0.9688 | 0.9722 | 0.9752 | 0.9779 | 0.9803 | 0.9825 | 0.9844 | 0.9861 | 0.9876 | 0.9890 |
| v3 | 0.9375 | 0.9443 | 0.9504 | 0.9558 | 0.9606 | 0.9649 | 0.9688 | 0.9722 | 0.9752 | 0.9779 | 0.9803 | 0.9825 | 0.9844 | 0.9861 |
| v4 | 0.9213 | 0.9299 | 0.9375 | 0.9443 | 0.9504 | 0.9558 | 0.9606 | 0.9649 | 0.9688 | 0.9722 | 0.9752 | 0.9779 | 0.9803 | 0.9825 |
| v5 | 0.9008 | 0.9116 | 0.9213 | 0.9299 | 0.9375 | 0.9443 | 0.9504 | 0.9558 | 0.9606 | 0.9649 | 0.9688 | 0.9722 | 0.9752 | 0.9779 |
| v6 | 0.8750 | 0.8886 | 0.9008 | 0.9116 | 0.9213 | 0.9299 | 0.9375 | 0.9443 | 0.9504 | 0.9558 | 0.9606 | 0.9649 | 0.9688 | 0.9722 |
| v7 | 0.8425 | 0.8597 | 0.8750 | 0.8886 | 0.9008 | 0.9116 | 0.9213 | 0.9299 | 0.9375 | 0.9443 | 0.9504 | 0.9558 | 0.9606 | 0.9649 |
| v8 | 0.8016 | 0.8232 | 0.8425 | 0.8597 | 0.8750 | 0.8886 | 0.9008 | 0.9116 | 0.9213 | 0.9299 | 0.9375 | 0.9443 | 0.9504 | 0.9558 |
| v9 | 0.7500 | 0.7773 | 0.8016 | 0.8232 | 0.8425 | 0.8597 | 0.8750 | 0.8886 | 0.9008 | 0.9116 | 0.9213 | 0.9299 | 0.9375 | 0.9443 |
| v10 | 0.6850 | 0.7194 | 0.7500 | 0.7773 | 0.8016 | 0.8232 | 0.8425 | 0.8597 | 0.8750 | 0.8886 | 0.9008 | 0.9116 | 0.9213 | 0.9299 |
| v11 | 0.6032 | 0.6465 | 0.6850 | 0.7194 | 0.7500 | 0.7773 | 0.8016 | 0.8232 | 0.8425 | 0.8597 | 0.8750 | 0.8886 | 0.9008 | 0.9116 |
| v12 | 0.5000 | 0.5546 | 0.6032 | 0.6465 | 0.6850 | 0.7194 | 0.7500 | 0.7773 | 0.8016 | 0.8232 | 0.8425 | 0.8597 | 0.8750 | 0.8886 |
| v13 | 0.3700 | 0.4388 | 0.5000 | 0.5546 | 0.6032 | 0.6465 | 0.6850 | 0.7194 | 0.7500 | 0.7773 | 0.8016 | 0.8232 | 0.8425 | 0.8597 |
| v14 | 0.2063 | 0.2929 | 0.3700 | 0.4388 | 0.5000 | 0.5546 | 0.6032 | 0.6465 | 0.6850 | 0.7194 | 0.7500 | 0.7773 | 0.8016 | 0.8232 |
| v15 | 0.0000 | 0.1091 | 0.2063 | 0.2929 | 0.3700 | 0.4388 | 0.5000 | 0.5546 | 0.6032 | 0.6465 | 0.6850 | 0.7194 | 0.7500 | 0.7773 |

TABLE 28

14 examples of amplitude codebook (definition 2)

| n | 3.5 | 3.5 | 3.5 | 3.5 | 3.5 | 3.5 | 3.5 | 3.5 | 3.5 | 3.5 | 3.5 | 3.5 | 3.5 | 3.5 |
|---|---|---|---|---|---|---|---|---|---|---|---|---|---|---|
| N | 15 | 15.5 | 16 | 16.5 | 17 | 17.5 | 18 | 18.5 | 19 | 19.5 | 20 | 20.5 | 21 | 21.5 |
| v0 | 0.9487 | 0.9536 | 0.9579 | 0.9619 | 0.9655 | 0.9688 | 0.9717 | 0.9744 | 0.9768 | 0.9790 | 0.9810 | 0.9828 | 0.9844 | 0.9859 |

TABLE 28-continued

| | 14 examples of amplitude codebook (definition 2) | | | | | | | | | | | | | |
|---|---|---|---|---|---|---|---|---|---|---|---|---|---|---|
| v1 | 0.9375 | 0.9434 | 0.9487 | 0.9536 | 0.9579 | 0.9619 | 0.9655 | 0.9688 | 0.9717 | 0.9744 | 0.9768 | 0.9790 | 0.9810 | 0.9828 |
| v2 | 0.9238 | 0.9310 | 0.9375 | 0.9434 | 0.9487 | 0.9536 | 0.9579 | 0.9619 | 0.9655 | 0.9688 | 0.9717 | 0.9744 | 0.9768 | 0.9790 |
| v3 | 0.9071 | 0.9159 | 0.9238 | 0.9310 | 0.9375 | 0.9434 | 0.9487 | 0.9536 | 0.9579 | 0.9619 | 0.9655 | 0.9688 | 0.9717 | 0.9744 |
| v4 | 0.8868 | 0.8975 | 0.9071 | 0.9159 | 0.9238 | 0.9310 | 0.9375 | 0.9434 | 0.9487 | 0.9536 | 0.9579 | 0.9619 | 0.9655 | 0.9688 |
| v5 | 0.8620 | 0.8750 | 0.8868 | 0.8975 | 0.9071 | 0.9159 | 0.9238 | 0.9310 | 0.9375 | 0.9434 | 0.9487 | 0.9536 | 0.9579 | 0.9619 |
| v6 | 0.8318 | 0.8476 | 0.8620 | 0.8750 | 0.8868 | 0.8975 | 0.9071 | 0.9159 | 0.9238 | 0.9310 | 0.9375 | 0.9434 | 0.9487 | 0.9536 |
| v7 | 0.7949 | 0.8143 | 0.8318 | 0.8476 | 0.8620 | 0.8750 | 0.8868 | 0.8975 | 0.9071 | 0.9159 | 0.9238 | 0.9310 | 0.9375 | 0.9434 |
| v8 | 0.7500 | 0.7736 | 0.7949 | 0.8143 | 0.8318 | 0.8476 | 0.8620 | 0.8750 | 0.8868 | 0.8975 | 0.9071 | 0.9159 | 0.9238 | 0.9310 |
| v9 | 0.6953 | 0.7240 | 0.7500 | 0.7736 | 0.7949 | 0.8143 | 0.8318 | 0.8476 | 0.8620 | 0.8750 | 0.8868 | 0.8975 | 0.9071 | 0.9159 |
| v10 | 0.6285 | 0.6635 | 0.6953 | 0.7240 | 0.7500 | 0.7736 | 0.7949 | 0.8143 | 0.8318 | 0.8476 | 0.8620 | 0.8750 | 0.8868 | 0.8975 |
| v11 | 0.5471 | 0.5898 | 0.6285 | 0.6635 | 0.6953 | 0.7240 | 0.7500 | 0.7736 | 0.7949 | 0.8143 | 0.8318 | 0.8476 | 0.8620 | 0.8750 |
| v12 | 0.4480 | 0.5000 | 0.5471 | 0.5898 | 0.6285 | 0.6635 | 0.6953 | 0.7240 | 0.7500 | 0.7736 | 0.7949 | 0.8143 | 0.8318 | 0.8476 |
| v13 | 0.3271 | 0.3905 | 0.4480 | 0.5000 | 0.5471 | 0.5898 | 0.6285 | 0.6635 | 0.6953 | 0.7240 | 0.7500 | 0.7736 | 0.7949 | 0.8143 |
| v14 | 0.1797 | 0.2570 | 0.3271 | 0.3905 | 0.4480 | 0.5000 | 0.5471 | 0.5898 | 0.6285 | 0.6635 | 0.6953 | 0.7240 | 0.7500 | 0.7736 |
| v15 | 0.0000 | 0.0943 | 0.1797 | 0.2570 | 0.3271 | 0.3905 | 0.4480 | 0.5000 | 0.5471 | 0.5898 | 0.6285 | 0.6635 | 0.6953 | 0.7240 |

TABLE 29

| | 14 examples of amplitude codebook (definition 2) | | | | | | | | | | | | | |
|---|---|---|---|---|---|---|---|---|---|---|---|---|---|---|
| n | 4 | 4 | 4 | 4 | 4 | 4 | 4 | 4 | 4 | 4 | 4 | 4 | 4 | 4 |
| N | 15 | 15.5 | 16 | 16.5 | 17 | 17.5 | 18 | 18.5 | 19 | 19.5 | 20 | 20.5 | 21 | 21.5 |
| v0 | 0.9257 | 0.9318 | 0.9375 | 0.9427 | 0.9474 | 0.9518 | 0.9558 | 0.9595 | 0.9628 | 0.9659 | 0.9688 | 0.9713 | 0.9737 | 0.9759 |
| v1 | 0.9116 | 0.9190 | 0.9257 | 0.9318 | 0.9375 | 0.9427 | 0.9474 | 0.9518 | 0.9558 | 0.9595 | 0.9628 | 0.9659 | 0.9688 | 0.9713 |
| v2 | 0.8949 | 0.9036 | 0.9116 | 0.9190 | 0.9257 | 0.9318 | 0.9375 | 0.9427 | 0.9474 | 0.9518 | 0.9558 | 0.9595 | 0.9628 | 0.9659 |
| v3 | 0.8750 | 0.8854 | 0.8949 | 0.9036 | 0.9116 | 0.9190 | 0.9257 | 0.9318 | 0.9375 | 0.9427 | 0.9474 | 0.9518 | 0.9558 | 0.9595 |
| v4 | 0.8514 | 0.8637 | 0.8750 | 0.8854 | 0.8949 | 0.9036 | 0.9116 | 0.9190 | 0.9257 | 0.9318 | 0.9375 | 0.9427 | 0.9474 | 0.9518 |
| v5 | 0.8232 | 0.8379 | 0.8514 | 0.8637 | 0.8750 | 0.8854 | 0.8949 | 0.9036 | 0.9116 | 0.9190 | 0.9257 | 0.9318 | 0.9375 | 0.9427 |
| v6 | 0.7898 | 0.8072 | 0.8232 | 0.8379 | 0.8514 | 0.8637 | 0.8750 | 0.8854 | 0.8949 | 0.9036 | 0.9116 | 0.9190 | 0.9257 | 0.9318 |
| v7 | 0.7500 | 0.7708 | 0.7898 | 0.8072 | 0.8232 | 0.8379 | 0.8514 | 0.8637 | 0.8750 | 0.8854 | 0.8949 | 0.9036 | 0.9116 | 0.9190 |
| v8 | 0.7027 | 0.7274 | 0.7500 | 0.7708 | 0.7898 | 0.8072 | 0.8232 | 0.8379 | 0.8514 | 0.8637 | 0.8750 | 0.8854 | 0.8949 | 0.9036 |
| v9 | 0.6465 | 0.6758 | 0.7027 | 0.7274 | 0.7500 | 0.7708 | 0.7898 | 0.8072 | 0.8232 | 0.8379 | 0.8514 | 0.8637 | 0.8750 | 0.8854 |
| v10 | 0.5796 | 0.6145 | 0.6465 | 0.6758 | 0.7027 | 0.7274 | 0.7500 | 0.7708 | 0.7898 | 0.8072 | 0.8232 | 0.8379 | 0.8514 | 0.8637 |
| v11 | 0.5000 | 0.5415 | 0.5796 | 0.6145 | 0.6465 | 0.6758 | 0.7027 | 0.7274 | 0.7500 | 0.7708 | 0.7898 | 0.8072 | 0.8232 | 0.8379 |
| v12 | 0.4054 | 0.4548 | 0.5000 | 0.5415 | 0.5796 | 0.6145 | 0.6465 | 0.6758 | 0.7027 | 0.7274 | 0.7500 | 0.7708 | 0.7898 | 0.8072 |
| v13 | 0.2929 | 0.3516 | 0.4054 | 0.4548 | 0.5000 | 0.5415 | 0.5796 | 0.6145 | 0.6465 | 0.6758 | 0.7027 | 0.7274 | 0.7500 | 0.7708 |
| v14 | 0.1591 | 0.2289 | 0.2929 | 0.3516 | 0.4054 | 0.4548 | 0.5000 | 0.5415 | 0.5796 | 0.6145 | 0.6465 | 0.6758 | 0.7027 | 0.7274 |
| v15 | 0.0000 | 0.0830 | 0.1591 | 0.2289 | 0.2929 | 0.3516 | 0.4054 | 0.4548 | 0.5000 | 0.5415 | 0.5796 | 0.6145 | 0.6465 | 0.6758 |

TABLE 30

| | 14 examples of amplitude codebook (definition 2) | | | | | | | | | | | | | |
|---|---|---|---|---|---|---|---|---|---|---|---|---|---|---|
| n | 4.5 | 4.5 | 4.5 | 4.5 | 4.5 | 4.5 | 4.5 | 4.5 | 4.5 | 4.5 | 4.5 | 4.5 | 4.5 | 4.5 |
| N | 15 | 15.5 | 16 | 16.5 | 17 | 17.5 | 18 | 18.5 | 19 | 19.5 | 20 | 20.5 | 21 | 21.5 |
| v0 | 0.9008 | 0.9081 | 0.9150 | 0.9213 | 0.9271 | 0.9325 | 0.9375 | 0.9421 | 0.9464 | 0.9504 | 0.9541 | 0.9575 | 0.9606 | 0.9636 |
| v1 | 0.8843 | 0.8928 | 0.9008 | 0.9081 | 0.9150 | 0.9213 | 0.9271 | 0.9325 | 0.9375 | 0.9421 | 0.9464 | 0.9504 | 0.9541 | 0.9575 |
| v2 | 0.8650 | 0.8750 | 0.8843 | 0.8928 | 0.9008 | 0.9081 | 0.9150 | 0.9213 | 0.9271 | 0.9325 | 0.9375 | 0.9421 | 0.9464 | 0.9504 |
| v3 | 0.8425 | 0.8542 | 0.8650 | 0.8750 | 0.8843 | 0.8928 | 0.9008 | 0.9081 | 0.9150 | 0.9213 | 0.9271 | 0.9325 | 0.9375 | 0.9421 |
| v4 | 0.8163 | 0.8299 | 0.8425 | 0.8542 | 0.8650 | 0.8750 | 0.8843 | 0.8928 | 0.9008 | 0.9081 | 0.9150 | 0.9213 | 0.9271 | 0.9325 |
| v5 | 0.7857 | 0.8016 | 0.8163 | 0.8299 | 0.8425 | 0.8542 | 0.8650 | 0.8750 | 0.8843 | 0.8928 | 0.9008 | 0.9081 | 0.9150 | 0.9213 |
| v6 | 0.7500 | 0.7685 | 0.7857 | 0.8016 | 0.8163 | 0.8299 | 0.8425 | 0.8542 | 0.8650 | 0.8750 | 0.8843 | 0.8928 | 0.9008 | 0.9081 |
| v7 | 0.7084 | 0.7300 | 0.7500 | 0.7685 | 0.7857 | 0.8016 | 0.8163 | 0.8299 | 0.8425 | 0.8542 | 0.8650 | 0.8750 | 0.8843 | 0.8928 |
| v8 | 0.6598 | 0.6850 | 0.7084 | 0.7300 | 0.7500 | 0.7685 | 0.7857 | 0.8016 | 0.8163 | 0.8299 | 0.8425 | 0.8542 | 0.8650 | 0.8750 |
| v9 | 0.6032 | 0.6326 | 0.6598 | 0.6850 | 0.7084 | 0.7300 | 0.7500 | 0.7685 | 0.7857 | 0.8016 | 0.8163 | 0.8299 | 0.8425 | 0.8542 |
| v10 | 0.5371 | 0.5714 | 0.6032 | 0.6326 | 0.6598 | 0.6850 | 0.7084 | 0.7300 | 0.7500 | 0.7685 | 0.7857 | 0.8016 | 0.8163 | 0.8299 |
| v11 | 0.4600 | 0.5000 | 0.5371 | 0.5714 | 0.6032 | 0.6326 | 0.6598 | 0.6850 | 0.7084 | 0.7300 | 0.7500 | 0.7685 | 0.7857 | 0.8016 |
| v12 | 0.3700 | 0.4167 | 0.4600 | 0.5000 | 0.5371 | 0.5714 | 0.6032 | 0.6326 | 0.6598 | 0.6850 | 0.7084 | 0.7300 | 0.7500 | 0.7685 |
| v13 | 0.2651 | 0.3196 | 0.3700 | 0.4167 | 0.4600 | 0.5000 | 0.5371 | 0.5714 | 0.6032 | 0.6326 | 0.6598 | 0.6850 | 0.7084 | 0.7300 |
| v14 | 0.1428 | 0.2063 | 0.2651 | 0.3196 | 0.3700 | 0.4167 | 0.4600 | 0.5000 | 0.5371 | 0.5714 | 0.6032 | 0.6326 | 0.6598 | 0.6850 |
| v15 | 0.0000 | 0.0741 | 0.1428 | 0.2063 | 0.2651 | 0.3196 | 0.3700 | 0.4167 | 0.4600 | 0.5000 | 0.5371 | 0.5714 | 0.6032 | 0.6326 |

TABLE 31

| | 14 examples of amplitude codebook (definition 2) | | | | | | | | | | | | | |
|---|---|---|---|---|---|---|---|---|---|---|---|---|---|---|
| n | 5 | 5 | 5 | 5 | 5 | 5 | 5 | 5 | 5 | 5 | 5 | 5 | 5 | 5 |
| N | 15 | 15.5 | 16 | 16.5 | 17 | 17.5 | 18 | 18.5 | 19 | 19.5 | 20 | 20.5 | 21 | 21.5 |
| v0 | 0.8750 | 0.8834 | 0.8912 | 0.8985 | 0.9053 | 0.9116 | 0.9175 | 0.9231 | 0.9282 | 0.9330 | 0.9375 | 0.9417 | 0.9456 | 0.9492 |
| v1 | 0.8564 | 0.8660 | 0.8750 | 0.8834 | 0.8912 | 0.8985 | 0.9053 | 0.9116 | 0.9175 | 0.9231 | 0.9282 | 0.9330 | 0.9375 | 0.9417 |
| v2 | 0.8351 | 0.8461 | 0.8564 | 0.8660 | 0.8750 | 0.8834 | 0.8912 | 0.8985 | 0.9053 | 0.9116 | 0.9175 | 0.9231 | 0.9282 | 0.9330 |

TABLE 31-continued

| 14 examples of amplitude codebook (definition 2) | | | | | | | | | | | | | |
|---|---|---|---|---|---|---|---|---|---|---|---|---|---|
| v3 | 0.8105 | 0.8232 | 0.8351 | 0.8461 | 0.8564 | 0.8660 | 0.8750 | 0.8834 | 0.8912 | 0.8985 | 0.9053 | 0.9116 | 0.9175 | 0.9231 |
| v4 | 0.7824 | 0.7969 | 0.8105 | 0.8232 | 0.8351 | 0.8461 | 0.8564 | 0.8660 | 0.8750 | 0.8834 | 0.8912 | 0.8985 | 0.9053 | 0.9116 |
| v5 | 0.7500 | 0.7667 | 0.7824 | 0.7969 | 0.8105 | 0.8232 | 0.8351 | 0.8461 | 0.8564 | 0.8660 | 0.8750 | 0.8834 | 0.8912 | 0.8985 |
| v6 | 0.7128 | 0.7321 | 0.7500 | 0.7667 | 0.7824 | 0.7969 | 0.8105 | 0.8232 | 0.8351 | 0.8461 | 0.8564 | 0.8660 | 0.8750 | 0.8834 |
| v7 | 0.6701 | 0.6922 | 0.7128 | 0.7321 | 0.7500 | 0.7667 | 0.7824 | 0.7969 | 0.8105 | 0.8232 | 0.8351 | 0.8461 | 0.8564 | 0.8660 |
| v8 | 0.6211 | 0.6465 | 0.6701 | 0.6922 | 0.7128 | 0.7321 | 0.7500 | 0.7667 | 0.7824 | 0.7969 | 0.8105 | 0.8232 | 0.8351 | 0.8461 |
| v9 | 0.5647 | 0.5939 | 0.6211 | 0.6465 | 0.6701 | 0.6922 | 0.7128 | 0.7321 | 0.7500 | 0.7667 | 0.7824 | 0.7969 | 0.8105 | 0.8232 |
| v10 | 0.5000 | 0.5335 | 0.5647 | 0.5939 | 0.6211 | 0.6465 | 0.6701 | 0.6922 | 0.7128 | 0.7321 | 0.7500 | 0.7667 | 0.7824 | 0.7969 |
| v11 | 0.4257 | 0.4641 | 0.5000 | 0.5335 | 0.5647 | 0.5939 | 0.6211 | 0.6465 | 0.6701 | 0.6922 | 0.7128 | 0.7321 | 0.7500 | 0.7667 |
| v12 | 0.3403 | 0.3844 | 0.4257 | 0.4641 | 0.5000 | 0.5335 | 0.5647 | 0.5939 | 0.6211 | 0.6465 | 0.6701 | 0.6922 | 0.7128 | 0.7321 |
| v13 | 0.2421 | 0.2929 | 0.3403 | 0.3844 | 0.4257 | 0.4641 | 0.5000 | 0.5335 | 0.5647 | 0.5939 | 0.6211 | 0.6465 | 0.6701 | 0.6922 |
| v14 | 0.1295 | 0.1878 | 0.2421 | 0.2929 | 0.3403 | 0.3844 | 0.4257 | 0.4641 | 0.5000 | 0.5335 | 0.5647 | 0.5939 | 0.6211 | 0.6465 |
| v15 | 0.0000 | 0.0670 | 0.1295 | 0.1878 | 0.2421 | 0.2929 | 0.3403 | 0.3844 | 0.4257 | 0.4641 | 0.5000 | 0.5335 | 0.5647 | 0.5939 |

In one example, phase of each of the K values is reported using e bits.

In one example, e=1. The 2 values corresponds to BPSK [1,−1].

In one example, e=2. The 4 values corresponds to QPSK [1, j, −1, −j].

In one example, e=3. The 8 values corresponds to 8PSK $$\left\{ e^{j\frac{2\pi k}{8}} : k = 0, 1, \ldots , 7 \right\}.$$

In one example, e=4. The 16 values corresponds to 16PSK $$\left\{ e^{j\frac{2\pi k}{16}} : k = 0, 1, \ldots , 15 \right\}.$$

In one example, e is configured via higher layer signaling, e.g., from {3,4}.

For Y>1, if the higher layer parameter phase is configured, the reported TDCP phases are indicated by $$c_{TDCP} = [c_1 \ldots c_Y]$$

$$c_i \in \{0, 1, \ldots , 15\}$$

and the corresponding phase values are given by:

$$e^{j2\pi\frac{c_i}{16}}.$$

In one embodiment, the UE is configured with a TDCP reporting, as described herein, wherein the report includes quantized amplitude only or (amplitude, phase) of the time-domain correlation value(s) corresponding to Y≥1 lag(s), where the details of determining and/or reporting (if needed) are according to this disclosure.

In one example, this reporting is wideband, i.e., Y amplitude/phase value(s) reported that is for the whole reporting band configured for the TDCP reporting.

In one example, this reporting is per subband (one for each SB configured for reporting), i.e., Y amplitude/phase value(s) reported for each SB configured in the reporting band configured for the TDCP reporting.

In one example, this reporting is wideband plus per subband (one for each SB configured for reporting) in a differential manner, i.e., Y amplitude value(s) are reported for each SB, where these values are with respect to a wideband (reference) amplitude (as described earlier).

In one example, Y=1 and only amplitude reporting (no phase reporting) is the basic/mandatory feature, i.e., a UE supporting the TDCP reporting must support this configuration. In one example, the lag corresponding to this reporting is the 1$^{st}$ lag (τ) or the minimum lag value (greater 1) that can be reported based on the measurement RS, e.g., periodicity of the TRS resource. In one example, the min lag can be 1 slot. In one example, the min lag=5 slot.

In one example, Y≥1, both amplitude and phase reporting for each lag is optional feature, hence subject to UE capability (can be separate). That is, a UE supporting the TDCP reporting need to report whether it is also capable to support Y≥1 and both amplitude and phase reporting.

In one example, the value of Y is determined as described earlier. In one example, the value of Y is configured, e.g., via RRC or MAC CE or DCI. In one example, the value of Y is determined based on the configured TRS resource(s) as described earlier.

In one example, for Y>1, the phase reporting can be configured to be absent or present (turned OFF or ON) for all or a subset of the y lags. This can be done via RRC or MAC CE or DCI.

In one example, the candidate value(s) for Y>1 or Y≥1 and/or the corresponding lags are fixed or configured or reported by the UE or can be subject to UE capability reporting. The details are as described earlier.

In one embodiment, the reporting, as described in one or more embodiments herein, can be configured based on (or linked to) X≥1 NZP CSI-RS resources (which can be included in $K_{TRS}$≥1 CSI-RS resource set(s) or a CSI-RS resource set). In one example, such NZP CSI-RS resources correspond to TRS (CSI-RS for tracking). When X>1, at least one of the following examples is used/configured for reporting.

In one example, one TDCP or DD components of the channel is reported per CSI-RS resource. So, there are X separate reports (one for each CSI-RS resource) or X components (one for each CSI-RS resource) in the (single) reported CSI report. In this case, the UE determine the multiple reports/components using the respective CSI-RS resource.

In one example, one (joint) TDCP or DD components of the channel is reported across all CSI-RS resources (regardless of the value of X). In this case, the UE can combine/aggregate all CSI-RS measurements across all resources, and then determine the report using the aggregated measurements.

In one example, a subset of Z CSI-RS resources can be selected, and the TDCP or DD components of the channel can be reported only using (for) the selected CSI-RS resources. The information (e.g., Z value and/or the indices of the selected resources) about the selection can be provided/reported by the UE, e.g., as part of the report. A two-part UCI is used when Z is reported by the UE. Or the value of Z can be fixed, or configured, and the information (e.g., the indices of the selected resources) about the selection can be provided/reported by the UE, e.g., as part of the report. For the selected resources, the report can be separate or one (joint).

The information about the selection can be reported via an indicator. In one example, a new indicator (separate from existing indicators) is used. In one example, an existing indicator is used. For example, CRI (or PMI or PMI component) is used.

> In one example, one (single) joint indicator (new indicator, or CRI, or PMI, or PMI component) is used to indicate Z selected CSI-RS resource(s).
>
> In one example, multiple separate indicator(s) is/are used, i.e., one indicator (new indicator, or CRI, or PMI, or PMI component) is used to indicate each of the Z selected CSI-RS resource(s).

In one embodiment, a UE is configured with K=1 or K>1, as described above. When Y=K=1 is configured, Y=1 correlation value is reported by the UE in CSI (or UCI) part 1. In one example, only amplitude of the correlation value is reported. In one example, both amplitude and phase of the correlation value is reported. In one example, both amplitude and phase of the correlation value is reported. In one example, phase reporting can be turned ON/OFF (disabled/enabled) via higher layer signaling, i.e., when turned OFF, only amplitude is reported and when turned OFF, both are reported. The tap/lag/delay of the correlation value can be fixed, or configured or reported by the UE (details as described above).

> When Y=K>1 is configured, Y correlation values are selected by the UE from a set of supported candidate values. The information about the selected Y correlation values can be reported by the UE via a two-part UCI (or CSI).
>
> In one example, the information comprises amplitudes of the Y correlation values, and the part 1 CSI/UCI includes the amplitude of the first correlation value, and the part 2 UCI/CSI includes the amplitudes of the rest of the Y−1 correlation values.
>
> In one example, the information comprises amplitudes of the Y correlation values, and the part 2 CSI/UCI includes the amplitudes of the Y correlation values.
>
> In one example, the information comprises amplitudes of the Y correlation values, and the part 1 CSI/UCI includes the amplitudes of a first set (S1) of correlation values, and the part 2 UCI/CSI includes the amplitudes of a second set (S2) of correlation values. In one example, S1 comprises amplitudes of $i \in \{0, 1, \ldots, Z\}$ and S2 comprises amplitudes of delay index $i \in \{Z+1, \ldots, Y-1\}$, where Z can be fixed (e.g., 0, Y/2, $\lfloor Y/2 \rfloor$ or $\lceil Y/2 \rceil$), or configured (e.g., via RRC), or reported by the UE (e.g., an information about Z is included in the part 1 CSI/UCI).
>
> In one example, the information comprises amplitudes of the Y correlation values, and the part 1 CSI/UCI includes the amplitudes of the Y correlation values.
>
> In one example, when the part 2 CSI/UCI includes amplitudes of all of or a subset (S2) of the Y correlation values, at least one of the following examples is used or configured.

> In one example, amplitudes of all of or a subset (S2) of the Y correlation values is included in Group 0 of the part 2 UCI/CSI.
>
> In one example, amplitudes of all of or a subset (S2) of the Y correlation values is included in Group 1 of the part 2 UCI/CSI.
>
> In one example, amplitudes of all of or a subset (S2) of the Y correlation values is included in Group 2 of the part 2 UCI/CSI.
>
> In one example, amplitudes of all of or a subset (S2) of the Y correlation values is divided into two (S21, S22). In one example, (S21, S22) is included in (Group0, Group1). In one example, (S21, S22) is included in (Group1, Group2). In one example, S21 comprises amplitude of the 1st correlation value in S2, and S22 comprises amplitudes of the remaining $Y_2−1$ correlation values in S2. In one example, S21 comprises amplitudes of $i \in \{0, 1, \ldots, Z_2\}$ and S22 comprises amplitudes of delay index $i \in \{Z_2+1, \ldots, Y_2−1\}$, where $Z_2$ can be fixed (e.g., 0, $Y_2/2$, $\lfloor Y_2/2 \rfloor$ or $\lceil Y_2/2 \rceil$), or configured (e.g., via RRC), or reported by the UE (e.g., an information about $Z_2$ is included in the part 1 CSI/UCI). Here, $Y_2$ is a number of delay values in S2.
>
> In one example, amplitudes of all of or a subset (S2) of the Y correlation values is divided into three (S21, S22, S23). In one example, (S21, S22, S23) is included in (Group0, Group1, Group2). In one example, S21 comprises amplitude of the 1st correlation value in S2, S22 comprises amplitude of the 2nd correlation value in S2, and S23 comprises amplitudes of the remaining $Y_2−2$ correlation values in S2. In one example, S21 comprises amplitudes of $i \in \{0, 1, \ldots, Z_2\}$, S22 comprises amplitudes of delay index $i \in \{Z_2+1, \ldots, 2Z_2−1\}$, and S23 comprises amplitudes of delay index $i \in \{2Z_2+1, \ldots, Y_2−1\}$, where Z2 can be fixed (e.g., 0, $Y_2/3$, $\lfloor Y_2/3 \rfloor$ or $\lceil Y_2/3 \rceil$), or configured (e.g., via RRC), or reported by the UE (e.g., an information about $Z_2$ is included in the part 1 CSI/UCI). Here, $Y_2$ is a number of delay values in S2.

In one example, the information comprises amplitudes and phases of the Y correlation values, and the part 1 CSI/UCI includes the amplitude and phase of the first correlation value, and the part 2 UCI/CSI includes the amplitudes and phases of the rest of the Y−1 correlation values.

In one example, the information comprises amplitudes and phases of the Y correlation values, and the part 1 CSI/UCI includes the amplitudes and phases of a first set (S1) of correlation values, and the part 2 UCI/CSI includes the amplitudes and phases of the a second set (S2) of correlation values. In one example, S1 comprises amplitudes and phases of $i \in \{0, 1, \ldots, Z\}$ and S2 comprises amplitudes and phases of delay index $i \in \{Z+1, \ldots, Y-1\}$, where Z can be fixed (e.g., 0, Y/2, $\lfloor Y/2 \rfloor$ or $\lceil Y/2 \rceil$), or configured (e.g., via RRC), or reported by the UE (e.g., an information about Z is included in the part 1 CSI/UCI).

In one example, the information comprises amplitudes and phases of the Y correlation values, and the part 2 CSI/UCI includes the amplitudes and phases of the Y correlation values.

In one example, the information comprises amplitudes and phases of the Y correlation values, and the part 1 CSI/UCI includes the amplitudes and phases of the Y correlation values.

In one example, when the part 2 CSI/UCI includes amplitudes and phases of all of or a subset (S2) of the Y correlation values, and amplitude and phase of a correlation value is always reported together, then at least one of the following examples is used or configured.

In one example, amplitudes and phases of all of or a subset (S2) of the Y correlation values is included in Group 0 of the part 2 UCI/CSI.

In one example, amplitudes and phases of all of or a subset (S2) of the Y correlation values is included in Group 1 of the part 2 UCI/CSI.

In one example, amplitudes and phases of all of or a subset (S2) of the Y correlation values is included in Group 2 of the part 2 UCI/CSI.

In one example, amplitudes and phases of all of or a subset (S2) of the Y correlation values is divided into two (S21, S22). In one example, (S21, S22) is included in (Group0, Group1). In one example, (S21, S22) is included in (Group1, Group2). In one example, S21 comprises amplitude and phase of the 1st correlation value in S2, and S22 comprises amplitudes and phases of the remaining $Y_2-1$ correlation values in S2. In one example, S21 comprises amplitudes and phases of $i \in \{0, 1, \ldots, Z_2\}$ and S22 comprises amplitudes and phases of delay index $i \in \{Z_2+1, \ldots, Y_2-1\}$, where $Z_2$ can be fixed (e.g., 0, $Y_2/2$, $\lfloor Y_2/2 \rfloor$ or $\lceil Y_2/2 \rceil$), or configured (e.g., via RRC), or reported by the UE (e.g., an information about $Z_2$ is included in the part 1 CSI/UCI). Here, $Y_2$ is a number of delay values in S2.

In one example, amplitudes and phases of all of or a subset (S2) of the Y correlation values is divided into three (S21, S22, S23). In one example, (S21, S22, S23) is included in (Group0, Group1, Group2). In one example, S21 comprises amplitude and phase of the 1st correlation value in S2, S22 comprises amplitude and phase of the 2nd correlation value in S2, and S23 comprises amplitudes and phases of the remaining $Y_2-2$ correlation values in S2. In one example, S21 comprises amplitudes and phases of $i \in \{0, 1, \ldots, Z_2\}$, S22 comprises amplitudes and phases of delay index $i \in \{Z_2+1, \ldots, 2Z_2-1\}$, and S23 comprises amplitudes and phases of delay index $i \in \{2Z_2+1, \ldots, Y_2-1\}$, where $Z_2$ can be fixed (e.g., 0, $Y_2/3$, $\lfloor Y_2/3 \rfloor$ or $\lceil Y_2/3 \rceil$), or configured (e.g., via RRC), or reported by the UE (e.g., an information about $Z_2$ is included in the part 1 CSI/UCI). Here, $Y_2$ is a number of delay values in S2.

In one example, when the part 2 CSI/UCI includes amplitudes and phases of all of or a subset (S2) of the Y correlation values, and amplitude and phase of a correlation value are included in two different groups, then at least one of the following examples is used or configured.

In one example, amplitudes of all of or a subset (S2) of the Y correlation values are included in Group 0, and phases of all of or a subset (S2) of the Y correlation values are included in Group 1. In one example, phases are included only when phase reporting is supported by the UE and is switched ON (enabled/configured) by the NW.

In one example, amplitudes of all of or a subset (S2) of the Y correlation values are included in Group 0, and phases of all of or a subset (S2) of the Y correlation values are included in Group 1. In one example, phases are included only when phase reporting is supported by the UE and is switched ON (enabled/configured) by the NW.

In one example, amplitudes of all of or a subset (S2) of the Y correlation values are included in Group 1, and phases of all of or a subset (S2) of the Y correlation values are included in Group 2. In one example, phases are included only when phase reporting is supported by the UE and is switched ON (enabled/configured) by the NW.

In one example, amplitudes of all of or a subset (S2) of the Y correlation values are included in Group 0, and phases of all of or a subset (S2) of the Y correlation values are divided into two (S21, S22) and included in (Group 1, Group 2). In one example, phases are included only when phase reporting is supported by the UE and is switched ON (enabled/configured) by the NW. In one example, S21 comprises phase of the 1st correlation value in S2, and S22 comprises phases of the remaining $Y_2-1$ correlation values in S2. In one example, S21 comprises amplitudes of $i \in \{0, 1, \ldots, Z_2\}$ and S22 comprises amplitudes of delay index $i \in \{Z_2+1, \ldots, Y_2-1\}$, where $Z_2$ can be fixed (e.g., 0, $Y_2/2$, $\lfloor Y_2/2 \rfloor$ or $\lceil Y_2/2 \rceil$), or configured (e.g., via RRC), or reported by the UE (e.g., an information about $Z_2$ is included in the part 1 CSI/UCI). Here, $Y_2$ is a number of delay values in S2.

In one example, when the amplitude and phase of the 1st delay value are included in the part 1 and the part 2 CSI/UCI includes amplitudes and phases of all of or a subset of the $Y-1$ correlation values, and amplitude and phase of a correlation value can be included together or separate, then at least one of the following examples is used or configured.

In one example, only amplitudes of the remaining $Y-1$ delay values are included in the part 2 based on at least one of the examples above.

In one example, both amplitudes and phases of the remaining $Y-1$ delay values are included in the part 2 and amplitude and phase of a correlation value is always reported together based on at least one of the examples above.

In one example, both amplitudes and phases of the remaining $Y-1$ delay values are included in the part 2 and amplitude and phase of a correlation value are included in two different groups based on at least one of the examples above.

In one example, when the part 1 CSI/UCI includes the amplitudes and phases of a first set (S1) of correlation values, and the part 2 UCI/CSI includes the amplitudes and phases of a second set (S2) of correlation values, and amplitude and phase of a correlation value can be included together or separate, then at least one of the following examples is used or configured.

In one example, only amplitudes of the remaining $Y_2-1$ delay values are included in the part 2 based on at least one of the examples above.

In one example, both amplitudes and phases of the remaining $Y_2-1$ delay values are included in the part 2 and amplitude and phase of a correlation value is always reported together based on at least one of the examples above.

In one example, both amplitudes and phases of the remaining $Y_2-1$ delay values are included in the part 2 and amplitude and phase of a correlation value are included in two different groups based on at least one of the examples above.

In one example, phase reporting can be turned ON/OFF (disabled/enabled) via higher layer signaling, i.e., when turned OFF, the information comprises amplitudes of the Y correlation value, and the part 1 CSI/UCI includes the amplitude of the first correlation value, and the part 2 UCI/CSI includes the amplitudes of the rest of the $Y-1$ correlation values, and when turned ON, the information comprises amplitudes and phases of the Y correlation value, and the part 1 CSI/UCI includes the amplitude and phase of the first correlation value, and the part 2 UCI/CSI includes the amplitudes and phases of the rest of the Y−1 correlation values.

In one example, phase reporting can be turned ON/OFF (disabled/enabled) via higher layer signaling, i.e., when turned OFF, the information comprises amplitudes of the Y correlation value, and the part 2 CSI/UCI includes the amplitudes of the Y correlation values, and when turned ON, the information comprises amplitudes and phases of the Y correlation value, and the part 2 CSI/UCI includes the amplitudes and phases of the Y correlation values.

In one example, the information comprises (lag/delay/tap) indices and amplitudes of the Y correlation values, and the part 1 CSI/UCI includes the amplitude of the first correlation value and indices of the correlation values, and the part 2 UCI/CSI includes the amplitudes of the rest of the Y−1 correlation values.

In one example, the information comprises indices and amplitudes of the Y correlation value, and the part 2 CSI/UCI includes the amplitudes and indices of the Y correlation values.

In one example, the information comprises indices and amplitudes of the Y correlation values, and the part 1 CSI/UCI includes indices of the correlation value, and the part 2 UCI/CSI includes the amplitudes of the correlation values.

In one example, the information comprises (lag/delay/tap) indices and amplitudes and phases of the Y correlation value, and the part 1 CSI/UCI includes the amplitude and phase of the first correlation value and indices of the correlation values, and the part 2 UCI/CSI includes the amplitudes and phases of the rest of the Y−1 correlation values.

In one example, the information comprises indices and amplitudes and phases of the Y correlation values, and the part 2 CSI/UCI includes indices and the amplitudes and phases of the Y correlation values.

In one example, the information comprises indices and amplitudes and phases of the Y correlation values, and the part 1 CSI/UCI includes indices of the correlation value, and the part 2 UCI/CSI includes the amplitudes and phases of the Y correlation values.

In one example, phase reporting can be turned ON/OFF (disabled/enabled) via higher layer signaling, i.e., when turned OFF, the information comprises indices and amplitudes of the Y correlation value, and the part 1 CSI/UCI includes the amplitude of the first correlation value, and the part 2 UCI/CSI includes the amplitudes of the rest of the Y−1 correlation values, and when turned ON, the information comprises indices and amplitudes and phases of the Y correlation values, and the part 1 CSI/UCI includes indices and amplitude and phase of the first correlation value, and the part 2 UCI/CSI includes the amplitudes and phases of the rest of the Y−1 correlation values.

In one example, phase reporting can be turned ON/OFF (disabled/enabled) via higher layer signaling, i.e., when turned OFF, the information comprises indices and amplitudes of the Y correlation values, and the part 2 CSI/UCI includes the amplitudes and indices of the Y correlation values, and when turned ON, the information comprises indices and amplitudes and phases of the Y correlation values, and the part 2 UCI/CSI includes the amplitudes and phases of the Y correlation values.

In one example, phase reporting can be turned ON/OFF (disabled/enabled) via higher layer signaling, i.e., when turned OFF, the information comprises indices and amplitudes of the Y correlation values, and the part 1 CSI/UCI includes indices of the correlation value, and the part 2 UCI/CSI includes the amplitudes of the correlation values, and when turned ON, the information comprises indices and amplitudes and phases of the Y correlation values, and the part 1 CSI/UCI includes indices of the correlation values, and the part 2 UCI/CSI includes the amplitudes and phases of the correlation values.

In one example, when Y=1, the associated delay d can be according to one of the following:

In one example, the associated delay $d \leq D_{basic}$ symbols (or slots).

In one example, the associated delay $d > D_{basic}$ symbols (or slots).

In one example, both $d \leq D_{basic}$ and $d > D_{basic}$ are supported. However, $d \leq D_{basic}$ is a basic (mandatory) feature, i.e., any UE supporting TDCP reporting must support $d \leq D_{basic}$. And $d > D_{basic}$ is an optional feature, i.e., a UE needs to report via separate UE capability reporting whether it can support $d > D_{basic}$.

In one example, the configuration in which Y≥1 and amplitude and phase for each delay are reported is an optional feature, i.e., a UE needs to report via separate UE capability reporting whether it can support it.

In one example, a set of candidate values for delay d includes all of or a subset of {4, 14, 18p, 14p} symbols, where p=periodicity of the TRS resource.

In one example, a set of candidate values for delay $D_{basic}$ includes all of or a subset of {4, 14, 18p, 14p} symbols, where p=periodicity of the TRS resource.

In one example, when Y>1, the phase can be configured to be absent (OFF, not reported) for all the Y delays, e.g., via higher layer.

In one example, the value of Y is configurable (e.g., RRC) or following the delays (all or a subset) from the configured TRS resource, details as described above.

In one example, the value of parameter Y is determined, e.g., fixed/pre-determined, gNB-configured (RRC), or UE-selected/reported (via CSI part 1 or part 2 or UE capability signaling), details as described above.

In one embodiment, for TDCP or Doppler component reporting (or a CSI reporting that includes TDCP or Doppler components), a UE is configured to receive a CSI reporting setting (e.g., via higher layer CSI-ReportConfig) that is linked to a CSI resource setting (e.g., via higher layer CSI-ResourceConfig), and includes the higher layer parameter reportQuantity set to other than 'none', where the CSI resource setting includes NZP CSI-RS resource set(s) for tracking. That is, the CSI-Resource setting contains (reference) ID(s) of S≥1 NZP CSI-RS resource set(s), and each NZP CSI-RS resource set is configured via higher layer NZP-CSI-RS-ResourceSet configured with higher layer parameter trs-Info. Each NZP-CSI-RS-ResourceSet consists of Either four periodic NZP CSI-RS resources in two consecutive slots with two periodic NZP CSI-RS resources in each slot, or two periodic NZP CSI-RS resources in one slot.

Such a NZP CSI-RS resource is referred to as tracking RS (TRS) later in this disclosure.

Also, NZP-CSI-RS-ResourceSet(s) may have the CSI-RS resources configured as:

Periodic, with the CSI-RS resources in the NZP-CSI-RS-ResourceSet configured with same periodicity, bandwidth and subcarrier location.

Periodic CSI-RS resources in one set and aperiodic CSI-RS resources in a second set, with the aperiodic CSI-RS and periodic CSI-RS resources having the same bandwidth (with same RB location) and the aperiodic CSI-RS being configured with qcl-Type set to 'typeA' and 'typeD', where applicable, with the periodic CSI-RS resources.

Each CSI-RS resource is configured by the higher layer parameter NZP-CSI-RS-Resource with some restrictions. For example, each resource is a single port CSI-RS resource with density $\rho=3$.

The rest of the details about NZP CSI-RS resources for tracking (TRS) can be as described in Section 5.1.6.1.1 of [REF8].

When TRS is configured for CSI (or TDCP or Doppler component) reporting with reportQuantity set to other than 'none', a value of S can be according to at least one of the following examples.

In one example, a value of S is fixed (e.g., to S=1) when TRS is configured for CSI reporting with reportQuantity set to other than 'none'.

In one example, a value of S is can be 1 or more than 1 (e.g., S=2) based on the configuration, The value S>1 can be subject to UE capability reporting (i.e., only when the UE supports, it can be configured).

Also, when TRS is configured for CSI (or TDCP or Doppler component) reporting with reportQuantity set to other than 'none', there can be at least one restriction on such a TRS. A few examples of the restriction are as follows.

In one example, TRS can only be a periodic NZP CSI-RS resource.

In one example, the periodicity and slot offset for periodic NZP CSI-RS resources, as given by the higher layer parameter periodicityAndOffset configured by NZP-CSI-RS-Resource, is $2^{\mu}X_p$ slots, where $X_p$ is fixed (e.g., 10) and where $\mu$ is defined in Clause 4.3 of [REF10].

Note that when TRS is a periodic NZP CSI-RS resource, it can be used/configured to measure a CSI-RS burst for TDCP or Doppler component reporting. This can be achieved by associating a measurement window (comprising B>1 time slots) from the TRS measurement instances/occasions to the reporting. In one example, the measurement window is defined/configured based on a CSI reference resource (cf. 5.2.2.5, REF8). In one example, the measurement window can be fixed, or configured, or reported by the UE. In one example, the measurement window can be identified based on a starting (first or reference) time slot ($T_0$) and a number of time slots B (starting from the first time slot).

In one example, both $T_0$ and B are fixed.
In one example, both $T_0$ and B are configured.
In one example, both $T_0$ and B are reported by the UE.
In one example, $T_0$ is fixed and B is configured.
In one example, $T_0$ is fixed and B is reported.
In one example, $T_0$ is configured and B is fixed.
In one example, $T_0$ is configured and B is reported.
In one example, $T_0$ is reported and B is configured.
In one example, $T_0$ is reported and B is fixed.

When configured, the measurement window is configured via RRC (e.g., as a parameter in CSI-ReportConfig). Or it is indicated via MAC CE or DCI. When reported, the measurement window is reported via CSI (e.g., as a CSI parameter).

When TRS is configured for CSI (or TDCP or Doppler component) reporting with reportQuantity set to other than 'none', the higher layer parameter time Restriction ForChannelMeasurements in CSI-ReportConfig can be determined/configured according to at least one of the following examples.

In one example, timeRestrictionForChannelMeasurements in CSI-ReportConfig is set to 'notConfigured'. The UE is expected to be configured with timeRestriction ForChannelMeasurements='notConfigured'. Or the UE is not expected to be configured with time Restriction ForChannelMeasurements='configured'.

In one example, timeRestrictionForChannelMeasurements in CSI-ReportConfig is set to 'configured'. The UE is expected to be configured with timeRestriction ForChannelMeasurements='configured'. Or the UE is not expected to be configured with timeRestriction ForChannelMeasurements='notConfigured'.

If the higher layer parameter timeRestrictionForChannelMeasurements in CSI-ReportConfig is set to 'notConfigured', the UE shall derive the channel measurements for CSI (or TDCP or Doppler component) reporting in uplink slot n based on only the NZP CSI-RS, no later than the CSI reference resource, (defined in REF10) associated with the CSI resource setting.

If the higher layer parameter timeRestriction ForChannelMeasurements in CSI-ReportConfig is set to 'configured', the UE shall derive the channel measurements for CSI (or TDCP or Doppler component) reporting in uplink slot n based on only the most recent, no later than the CSI reference resource, occasion of NZP CSI-RS (defined in REF10) associated with the CSI resource setting.

Depending on the value of the reportQuantity (for example, when CQI is included in the CSI reporting), at least one interference measurement resource (IMR) can also be configured via CSI-ReportConfig. The IMR can be a CSI-IM resource, or a NZP CSI-RS configured for interference measurement.

Examples of reportQuantity set to other than 'none' are provided later in this disclosure.

The content of the CSI report (including TDCP or Doppler components reporting) configured via reportQuantity or reportQuantity-r18 set to other than 'none', as described above, is configured according to at least one of the following embodiments.

In one embodiment, reportQuantity or reportQuantity-r18 set to other than 'none' corresponds to a separate report.

In one example, reportQuantity='new quantity' or 'TDCP' or 'DD', where the new quantity is according to (corresponds to) at least one of the examples herein.

In one example, reportQuantity=an existing indicator 'I', which indicates one of the TDCP or Doppler components as described in one or more examples herein.

In one example, 'I'='PMI' or 'PMI component'.
In one example, 'I'='CRI'.

The time-domain behavior for such reporting can be configured according to at least one of the following examples.

In one example, the TD behavior is fixed to periodic (P).
In one example, the TD behavior is fixed to semi-persistent on PUCCH (SPonPUCCH).
In one example, the TD behavior is fixed to semi-persistent on PUSCH (SPonPUSCH).

In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

When configured, the TD behavior of the CSI-Report-Config is indicated by the higher layer parameter report-ConfigType.

In one embodiment, reportQuantity set to other than 'none' corresponds to a joint report, wherein the joint report comprises (A) the TDCP or Doppler component of the channel and (B) the other CSI parameters from {CRI, LI, PMI, CQI, RI}.

At least one of the following examples is used/configured regarding the reportQuantity.

In one example, reportQuantity set to 'cri-RI-LI-PMI-CQI-X', where cri-RI-LI-PMI-CQI corresponds to (B), and X corresponds to 'new quantity' or 'TDCP' or 'DD' for (A).

In one example, reportQuantity set to 'RI-LI-PMI-CQI-X', where RI-LI-PMI-CQI corresponds to (B), and X corresponds to 'new quantity' or 'TDCP' or 'DD' for (A).

In one example, reportQuantity set to 'cri-RI-PMI-CQI-X', where cri-RI-PMI-CQI corresponds to (B), and X corresponds to 'new quantity' or 'TDCP' or 'DD' for (A).

In one example, reportQuantity set to 'RI-PMI-CQI-X', where RI-PMI-CQI corresponds to (B), and X corresponds to 'new quantity' or 'TDCP' or 'DD' for (A).

In one example, reportQuantity set to 'cri-RI-CQI-X', where cri-RI-CQI corresponds to (B), and X corresponds to 'new quantity' or 'TDCP' or 'DD' for (A).

In one example, reportQuantity set to 'RI-CQI-X', where RI-CQI corresponds to (B), and X corresponds to 'new quantity' or 'TDCP' or 'DD' for (A).

In one example, reportQuantity set to 'cri-CQI-X', where cri-CQI corresponds to (B), and X corresponds to 'new quantity' or 'TDCP' or 'DD' for (A).

In one example, reportQuantity set to 'CQI-X', where CQI corresponds to (B), and X corresponds to 'new quantity' or 'TDCP' or 'DD' for (A).

In one example, reportQuantity set to 'cri-RI-LI-PMI-CQI', where (A) is reported jointly (together with) one of indicators from {CRI, LI, RI, PMI, CQI} for (B).

For example, PMI={X, Y}, where X corresponds to 'new quantity' or 'TDCP' or 'DD' for (A), and Y corresponds to the PMI components.

In one example, reportQuantity set to 'RI-LI-PMI-CQI', where (A) is reported jointly (together with) one of indicators from {LI, RI, PMI, CQI} for (B).

For example, PMI={X, Y}, where X corresponds to 'new quantity' or 'TDCP' or 'DD' for (A), and Y corresponds to the PMI components.

In one example, reportQuantity set to 'cri-RI-PMI-CQI', where (A) is reported jointly (together with) one of indicators from {CRI, RI, PMI, CQI} for (B).

For example, PMI={X, Y}, where X corresponds to 'new quantity' or 'TDCP' or 'DD' for (A), and Y corresponds to the PMI components.

In one example, reportQuantity set to 'RI-PMI-CQI', where (A) is reported jointly (together with) one of indicators from {RI, PMI, CQI} for (B).

For example, PMI={X, Y}, where X corresponds to 'new quantity' or 'TDCP' or 'DD' for (A), and Y corresponds to the PMI components.

In one example, reportQuantity set to 'cri-RI-CQI', where (A) is reported jointly (together with) one of indicators from {CRI, RI, CQI} for (B).

For example, RI={X,Y}, where X corresponds to 'new quantity' or 'TDCP' or 'DD' for (A), and Y corresponds to the RI component.

In one example, reportQuantity set to 'RI-CQI', where (A) is reported jointly (together with) one of indicators from {RI, CQI} for (B).

For example, RI={X,Y}, where X corresponds to 'new quantity' or 'TDCP' or 'DD' for (A), and Y corresponds to the RI component.

In one example, reportQuantity set to 'cri-CQI', where (A) is reported jointly (together with) one of indicators from {CRI, CQI} for (B).

For example, CQI={X,Y}, where X corresponds to 'new quantity' or 'TDCP' or 'DD' for (A), and Y corresponds to the CQI component.

In one example, reportQuantity set to 'CQI', where (A) is reported jointly (together with) CQI for (B).

For example, CQI={X, Y}, where X corresponds to 'new quantity' or 'TDCP' or 'DD' for (A), and Y corresponds to the CQI component.

The CQI reporting can help/assist NW implementations such as scaling for MU precoding. Also, the CQI reporting can provide accurate interference information to the NW.

At least one of the following examples is used/configured regarding the NZP CSI-RS resource(s) and/or resource set(s).

In one example, the NZP CSI-RS resource(s) are configured common for both (A) and (B). That is, the CSI-ResourceConfig includes CSI-RS resource set(s) that are used common for both (A) and (B). In one example, the number of resource sets is fixed to 1.

In one example, two types of resource sets linked to (configured within) a CSI reporting.

SetType1: CSI-RS resource set(s) configured with trs-Info, i.e., sets comprising TRS(s)

SetType2: CSI-RS resource set(s) configured without trs-Info, i.e., sets comprising NZP CSI-RS resources for normal CSI A set with SetType1 is configured for reporting of (A), and a set with SetType2 is configured for reporting of (B).

Let S1 be a number of sets with SetType1, and S2 be a number of sets with SetType2.

In one example, (S1,S2) is fixed, e.g., (1,1) or (2,1).

In one example, (S1,S2)=(z,1), and a value of z depends on the configuration. In one example, z can take a value from {1,2}.

In one example, (S1,S2) depends on the configuration.

Let R1 be a number of resources in each of the S1 sets with SetType1, and R2 be a number of resources in each of the S2 sets with SetType2.

In one example, (R1,R2) is fixed, e.g., (4,1) or (2,1).

In one example, (R1,R2)=(2,1) or (4,1) based on a condition.

In one example, the condition is based on the FR type. For instance, (R1,R2)=(2,1) for FR2, and (R1,R2)= (4,1) for FR1. Or, For instance, (R1,R2)=(2,1) for FR2, and (R1,R2)=(2,1) or (4,1) for FR1.

In one example, (R1,R2)=(2, b) or (4, b), where b>1. For example, b=2.

In one example, (R1,R2)=(2, b) or (4, b), where b>=1. For example, b takes a value from {1,2}.

In one example, a CSI-RS resource set in a CSI reporting is partitioned into two subsets/groups of resources.

Group1: CSI-RS resource(s) configured with trs-Info, i.e., resources comprising TRS(s)

Group2: CSI-RS resource(s) configured without trs-Info, i.e., resources comprising NZP CSI-RS resources for normal CSI.

A resource in Group1 is configured for reporting of (A), and a resource Group2 is configured for reporting of (B).

Let W1 be a number of resources in Group1, and W2 be a number of resources in Group2.

In one example, (W1,W2) is fixed, e.g., (4,1) or (2,1).

In one example, (W1,W2)=(2,1) or (4,1) based on a condition.

In one example, the condition is based on the FR type. For instance, (W1, W2)=(2,1) for FR2, and (W1, W2)=(4,1) for FR1. Or, For instance, (W1, W2)=(2, 1) for FR2, and (W1,W2)=(2,1) or (4,1) for FR1.

In one example, (W1,W2)=(2, b) or (4, b), where b>1. For example, b=2.

In one example, (W1,W2)=(2, b) or (4, b), where b>=1. For example, b takes a value from { 1,2}.

The time-domain behavior for such reporting can be configured according to at least one of the following examples.

In one example, the TD behavior is fixed to periodic (P).

In one example, the TD behavior is fixed to semi-persistent on PUCCH (SPonPUCCH).

In one example, the TD behavior is fixed to semi-persistent on PUSCH (SPonPUSCH).

In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

Figure 16:
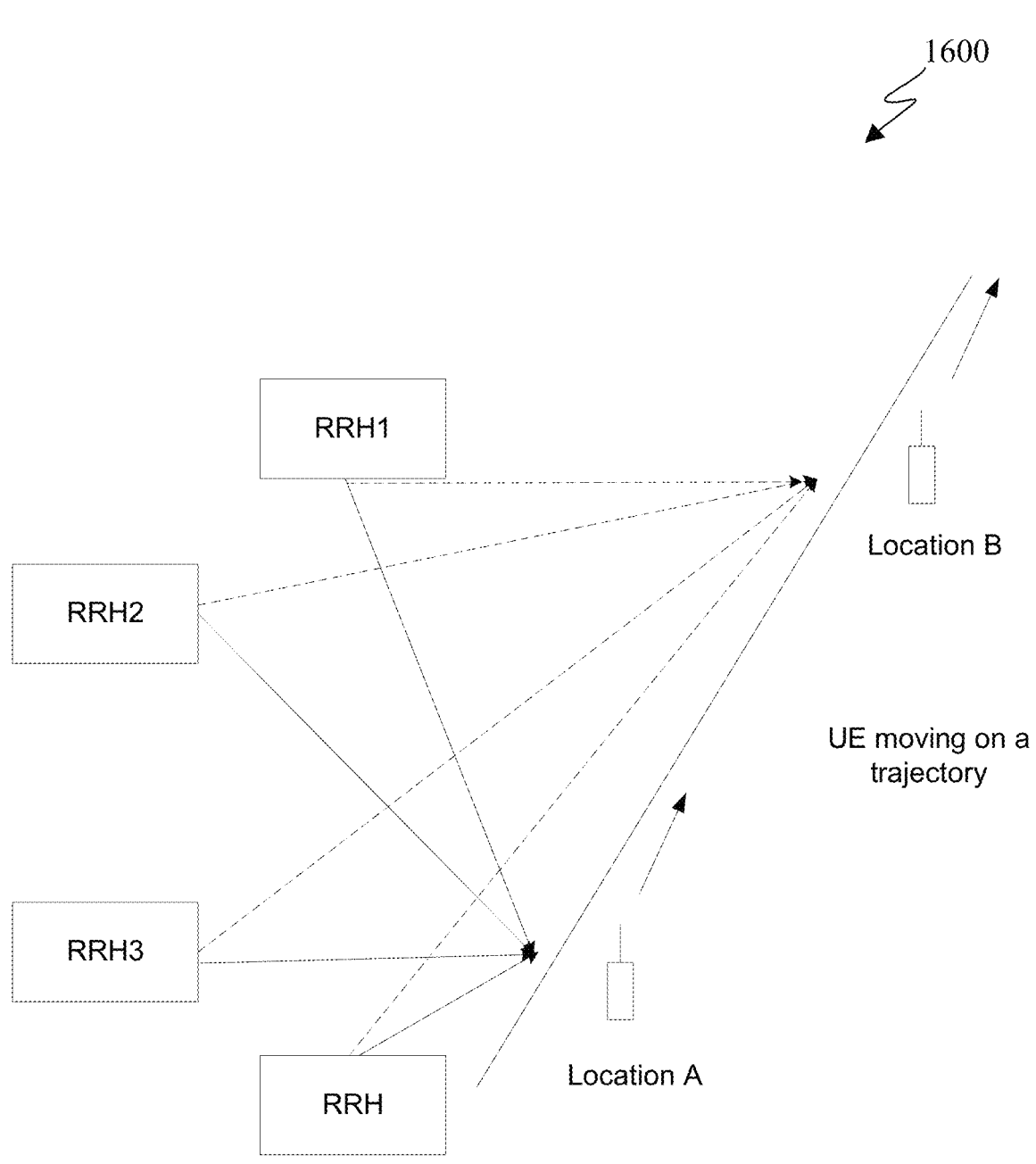
FIG. 16 illustrates an example of a UE moving on a linear trajectory in a distributed multiple-input multiple-output (DMIMO) system according to embodiments of the present disclosure.

FIG. 16 illustrates an example of a UE moving on a linear trajectory in a distributed DMIMO system 1600 according to embodiments of the present disclosure. The embodiment of the UE moving on a linear trajectory in a distributed DMIMO system 1600 illustrated in FIG. 16 is for illustration only. FIG. 16 does not limit the scope of this disclosure to any particular implementation of the UE moving on a linear trajectory in a distributed DMIMO system 1600.

Abovementioned embodiments on the TDCP or Doppler component reporting can be extended to the case of multiple RRHs/TRPs or distributed MIMO system, wherein CSI-RS resource(s) are transmitted from multiple locations (RRHs/TRPs) within a cell. An illustration of a UE moving on a trajectory located in such a system is shown in FIG. 16. While the UE moves from a location A to another location B at high speed (e.g., 60 kmph), the UE measures the channel and the interference (e.g., via NZP CSI-RS resources and CSI-IM resources, respectively), uses them to determine/report CSI considering joint transmission from multiple RRHs. The reported CSI can be based on a codebook, which includes components considering both multiple RRHs, and time-/Doppler-domain channel compression. An RRH/TRP can be associated with (or correspond to) a NZP CSI-RS resource, or a group/subset of ports within a resource.

In one embodiment, a UE is configured to measure TRS resources transmitted from multiple ($N_{RRH}$>1) TRPs/RRHs, and use them report TDCP or Doppler components of the measured channels from multiple RRHs/TRPs.

In one example, the TRS or NZP CSI-RS resource(s) with trs-Info configured for such a reporting is according to at least one of the following examples.

In one example, the number of NZP CSI-RS resources (M) in a CSI-RS resource set is $N_{RRH}$, i.e., one resource for each TRP/RRH.

In one example, the number of NZP CSI-RS resources (M) in a CSI-RS resource set is $\geq N_{RRH}$, at least one for each TRP/RRH. The M resources can be partitioned into $N_{RRH}$ subsets, each including at least one resource for an RRH.

In one example, the number of NZP CSI-RS resource sets (S) configured via CSI-ResourceConfig is $N_{RRH}$, one set for each TRP/RRH.

In one example, the number of NZP CSI-RS resource sets (S) configured via CSI-ResourceConfig is $\geq N_{RRH}$, at least one set for each TRP/RRH. The S resource sets can be partitioned into $N_{RRH}$ subsets, each including at least one resource set for an RRH.

In one example, the TDCP or Doppler component reporting is according to at least one of the following examples.

In one example, the TDCP or Doppler component reporting is separate for each of $N_{RRH}$ TRPs/RRHs. So, there are $N_{RRH}$ reports in total. The indicator for this reporting can be a joint indicator. Or a separate indicator is reported for each TRP. There can be only one CSI-ReportConfig configured for all reports with a reportQuantity that can set to a value other than 'none', details as described earlier. Or there can be multiple CSI-ReportConfigs (e.g., one for each report) for these reports. The TD behavior of these multiple reports are expected to be configured the same.

In one example, the TDCP or Doppler component reporting is joint for all of $N_{RRH}$ TRPs/RRHs. So, there is only report that is joint for all TRPs.

In one example, the TDCP or Doppler component reporting is only for one of the $N_{RRH}$ TRPs/RRHs. The index of the one TRP is fixed (e.g., 1), or configured (e.g., RRC, MAC CE, or DCI), or reported by the UE (e.g., as part of the CSI report).

In one example, the TDCP or Doppler component reporting is a subset comprising Z out of the $N_{RRH}$ TRPs/RRHs. The value of Z and/or indices of the Z TRPs can be fixed (e.g., 1), or configured (e.g., RRC, MAC CE, or DCI), or reported by the UE (e.g., as part of the CSI report). The details can be according to one or more embodiments herein. When Z>1, the reporting for the Z TRPs can be separate (cf. the first example above) or joint (cf. the second example above).

Figure 17:
FIG. 17 illustrates a graph showing the phase of a number of correlation values for different speeds according to embodiments of the present disclosure.
Figure 17:
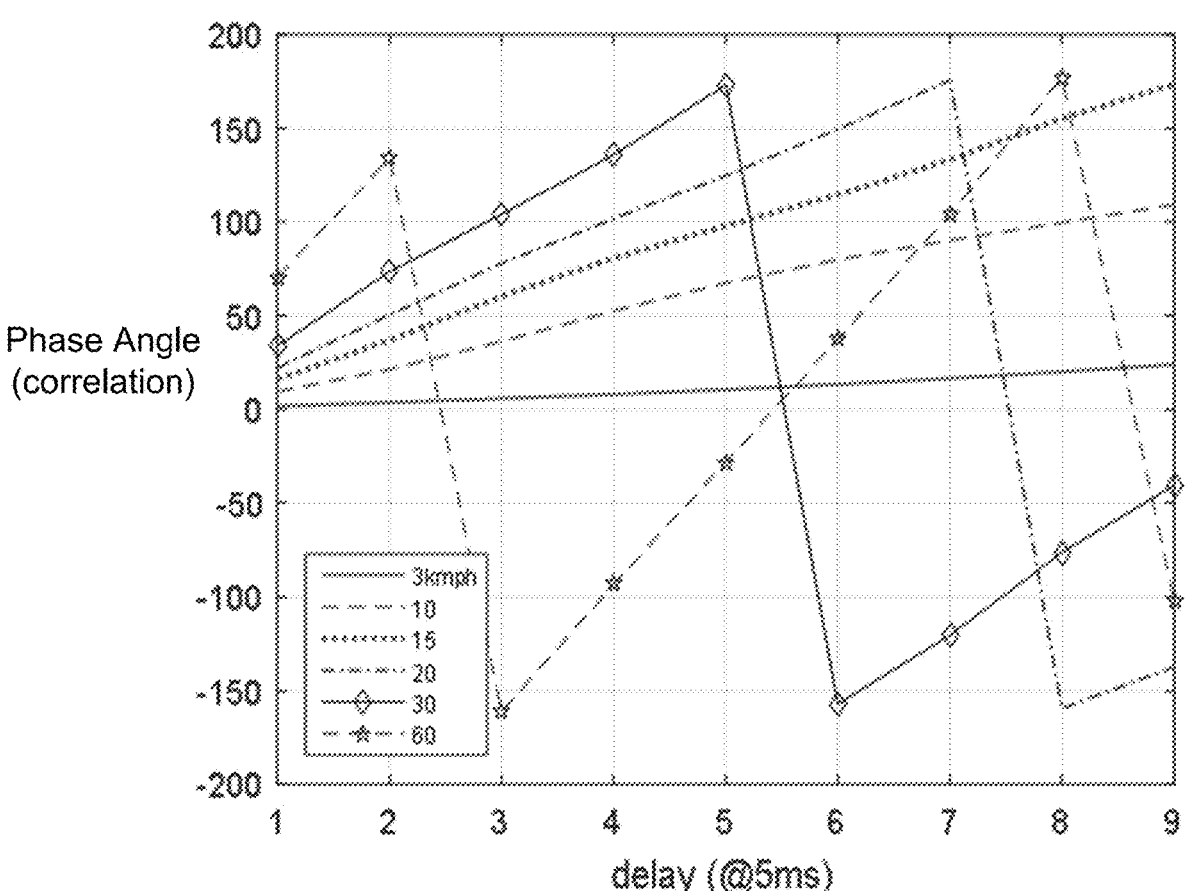

FIG. 17 illustrates a graph 1700 showing the phase of a number of correlation values for different speeds according to embodiments of the present disclosure. The embodiment of the graph 1700 showing the phase of a number of correlation values for different speeds illustrated in FIG. 17 is for illustration only. FIG. 17 does not limit the scope of this disclosure to any particular implementation of the graph 1700 showing the phase of a number of correlation values for different speeds.

As illustrated in FIG. 17, the phase (angle) of Y=9 correlation values for different speeds are plotted. The phase variation is almost linear. This implies that for phase quantization, a linear phase model is provided according to at least one of the following embodiments and examples.

In one embodiment, a phase of a correlation value is given by $p_n = e^{jGa_n}$ or $e^{j2\pi a_n}$ or $e^{j\pi a_n}$, where G is a fixed scaling, e.g., 1 or $\pi$ or $2\pi$ and $a_n$ is a corresponding phase angle. The angle can be in radian or degree. The phase angle $a_n$ is determined assuming a linear phase variation across lag/delay values (associated with Y correlations) according to at least one of the following examples.

In one example, the UE reports one or both of (i) a phase angle $(a_i)$ of the i-th correlation value corresponding to lag/delay $\tau_i$ and (ii) a slope m. Assuming a linear phase, a phase angle $(a_n)$ of the n-th correlation corresponding to lag/delay $\tau_n$ is represented as $$a_n = m(\tau_n - \tau_i) + a_i.$$

Alternatively, a reference phase angle $(a_{ref})$ of a reference correlation value (e.g., 1) corresponding to a reference lag/delay $\tau_i$ (e.g., 0) is fixed or configured, and the UE reports at least one value of the slope m depending on the reference phase angle. In one example, the reference phase angle is $a_{ref} = 0$ or $2\pi$ or $\pi$ or $-\pi$ or $\pi/2$ or $-\pi/2$.

Note that regardless of the Y value (Y=1, 2 or Y>2), the UE reports only 2 quantities, as mentioned above. In a variation, the UE can be configured to report (iii) at least one additional phase angle $(a_j)$ of at least one j-th correlation value. Alternatively, the UE reports one slope value (m) for each of the Y delay values.

In one example, i=1 and the UE reports a phase angle $(\alpha_1)$ of the 1st correlation value corresponding to (e.g., the smallest non-zero) lag/delay $\tau_1$. In one example, i is the index of the smallest non-zero lag/delay that can be calculated/reported by the UE, e.g., based on the measurement (e.g., TRS measurement) or based on the configuration (e.g., the UE is configured with an information about the lag/delay values that the UE can report the correlation value for). In one example, the index i is configured (e.g., RRC). In one example, the index i is fixed (e.g., 1). In one example, the index i is reported by the UE (e.g., CSI report or UE capability reporting).

In one example, m is reported using a $b_m$-bit codebook, where $b_m$ can be fixed (e.g., 2 or 3 or 4) or configured (e.g., via RRC). In one example, the codebook for reporting m is uniform between [x, y]G, i.e., the codebook is $$\{x, x+s, x+2s, \ldots, x+(2^{b_m}-1)s\}G \text{ or } \{s, 2s, 3s, \ldots, 2^{b_m}s\}G$$

or $$\left\{x+\frac{1}{2}s, x+\frac{3}{2}s, x+\frac{5}{2}s, \ldots, x+\frac{(2^{b_m+1}-1)}{2}s\right\}G$$

where s is the step size (quantization interval). In one example, x=0. In one example, y=1 or 1.5 or 2. In one example, x=−y, i.e., the interval is [−y, y]G. In one example, x≤0 and y>0. In one example, $$s = \frac{y-x}{2^{b_m}}.$$

In one example, $$s = \frac{y-x}{k \times 2^{b_m}}$$

and k is scaling factor. In one example, s=

$$\frac{y-x}{2^M \times 2^{b_m}}$$

and $2^M$ is scaling factor. In one example, $Q=b_m$, $y=q\in \{0, 1, \ldots, 2^Q-1\}$, $x=\varphi_0=2^{Q-1}$, and k or $2^M=G/\varphi$ and $$\varphi \in \left\{2\pi, \pi, \frac{\pi}{2}, \frac{\pi}{4}, \frac{\pi}{8}, \frac{\pi}{2^Q}, \frac{\pi}{2^{Q-1}}\right\}.$$

In one example, when $b_m=2$, the codebook is {x, x+s, x+2s, x+3s} or {s, 2s, 3s, 4s} or $$\left\{x+\frac{1}{2}s, x+\frac{3}{2}s, x+\frac{5}{2}s, x+\frac{7}{2}s\right\}$$

and $$s = \frac{y-x}{4}.$$

When x=0 and y=1, the codebook is {0, 1/4, 1/2, 3/4} or {1/4, 1/2, 3/4, 1} or {1/8, 3/8, 5/8, 7/8}.

In one example, when $b_m=3$, the codebook is {x, x+s, x+2s, ..., x+7s} or {s, 2s, 3s, ..., 8s} or $$\left\{x+\frac{1}{2}s, x+\frac{3}{2}s, x+\frac{5}{2}s, \ldots, x+\frac{15}{2}s\right\}$$

and $$s = \frac{y-x}{8}.$$

When x=0 and y=1, the codebook is $$\left\{0, \frac{1}{8}, \frac{1}{4}, \frac{3}{8}, \ldots \frac{7}{8}\right\} \text{ or } \left\{\frac{1}{8}, \frac{1}{4}, \frac{3}{8}, \ldots \frac{7}{8}, 1\right\} \text{ or } \left\{\frac{1}{16}, \frac{3}{16}, \frac{5}{16}, \ldots, \frac{15}{16}\right\}.$$

In one example, when $a_i$ is reported, $a_i$ is reported using a $b_a$-bit codebook, where $b_a$ can be fixed (e.g., 2 or 3 or 4) or configured (e.g., via RRC). In one example, the codebook for $a_i$ reporting is uniform between [x, y]G, i.e., the codebook is $$\{x, x+s, x+2s, \ldots, x+(2^{b_a}-1)s\}G$$

or $$\{s, 2s, 3s, \ldots, 2^{b_a}s\}G$$

or $$\left\{x+\frac{1}{2}s, x+\frac{3}{2}s, x+\frac{5}{2}s, \ldots, x+\frac{(2^{b_a+1}-1)}{2}s\right\}G$$

where s is the step size (quantization interval). In one example, x=0. In one example, y=45° or π/4 radian, or y=60° or π/3 radian. In one example, x=−y, i.e., the interval is [−y, y]G. In one example, x≤0 and y>0. In one example, $$s = \frac{y-x}{2^{b_a}}.$$

In one example, $$s = \frac{y-x}{k \times 2^{b_m}}$$

and k is scaling factor. In one example, $$s = \frac{y-x}{2^M \times 2^{b_m}}$$

and $2^M$ is scaling factor. In one example, $Q=b_a$, $y=q\in \{0, 1, \ldots, 2^Q-1\}$, $x=\varphi_0=2^{Q-1}-1$, and k or $2^M=G/\varphi$ and $$\varphi \in \left\{2\pi, \pi, \frac{\pi}{2}, \frac{\pi}{4}, \frac{\pi}{8}, \frac{\pi}{2^Q}, \frac{\pi}{2^{Q-1}}\right\}.$$

In one example, when $b_a$=2, the codebook is {x, x+s, x+2s, x+3s} or {s, 2s, 3s, 4s} or $$\left\{x+\frac{1}{2}s, x+\frac{3}{2}s, x+\frac{5}{2}s, x+\frac{7}{2}s\right\}$$

and s=y−x/4. When x=0 and y=π/4, the codebook is C×π/4, where C is {0, 1/4, 1/2, 3/4} or {1/4, 1/2, 3/4, 1} or {1/8, 3/8, 5/8, 7/8}.

In one example, when $b_m$=3, the codebook is {x, x+s, x+2s, . . . , x+7s} or {s, 2s, 3s, . . . , 8s} or $$\left\{x+\frac{1}{2}s, x+\frac{3}{2}s, x+\frac{5}{2}s, \ldots, x+\frac{15}{2}s\right\}$$

and $$s = \frac{y-x}{8}.$$

When x=0 and y=π/4, the codebook is $$C \times \frac{\pi}{4},$$

where C is {0, 1/8, 1/4, 3/8, . . . 7/8} or {1/8, 1/4, 3/8, . . . 7/8, 1} or {1/16, 3/16, 5/16, . . . , 15/16}.

In one example, the phase quantization codebook is adaptive or gNB-configurable based on {m×f(n)+c, q=0, 1, 2, . . . , $2^{B-1}$}, where f(n): is based on the legacy (Rel. 16) eType II amplitude or phase codebooks.

In one example, f (n) is linear and is based on Rel. 16 $2^B$-PSK alphabet, i.e., $$e^{j\frac{2\pi n}{2^B}} \text{ or } e^{j\frac{Gn}{2^B}}$$

where n=0, 1, . . . , $2^{B-1}$ or 2n=q−$\varphi_0$ where q=0, 1, . . . , $2^B-1$, $\varphi_0=2^{B-1}-1$.

In one example, f(n) is exponential and is based on Rel.16 amplitude codebook, i.e., $2^{-(2^B-1-n)\cdot 0.25}$ or $2^{-(2^B-1-n)\cdot 0.5}$, n=0, 1, . . . , $2^B-1$ or 2n=q−$\varphi_0$ where q=0, 1, . . . , $2^B-1$, $\varphi_0=2^{B-1}-1$.

m=a slope value from [−x, x] depending on the amplitude ($a_1$) of the 1st correlation (smallest delay), e.g., the slope decreases towards 0 as $a_1$ increases towards 1 c∈{0,2π}.

In one example, the phase quantization codebook is given by: {$2^{-(N-n)\cdot s}\cdot\pi$, n=0, 1, 2, . . . , $2^B-1$}∪{$-2^{-(B-n)\cdot s}\cdot\pi$, n=0, 1, 2, . . . , $2^B-2$}∪{0}, where B=3, 4, N=7, 15 or $2^B-1$, and s=0.25, 0.5 or 1. Or, the codebook comprises $2^{B+1}-2$ values, {$\rho^{-(N-n)}\cdot\pi$, n=0, 1, 2, . . . , $2^B-1$}∪{$-\rho^{-(N-n)}\cdot\pi$, n=0, 1, 2, . . . , $2^B-2$}∪{0}. In one example, N=$2^Q-1$.

The value of ρ is according to at least one of the following examples.

In one example, ρ=2.

In one example, ρ=$2^s$, where s<1. The value of s can be fixed (e.g., 1/2 or 1/4 or 1/8 or 3/4 or 3/8), or configured (e.g., via RRC), or reported by the UE (e.g., via UE capability reporting or TDCP reporting).

The values of Q=B is according to at least one of the following examples.

In one example, Q=2 or 3 or 4.

In one example, Q is configured (e.g., via RRC) from a set of values, e.g., {2,3}, {2,4}, {3,4}.

In one example, the phase quantization codebook is based on the following alphabet (where D denotes delay and p(.) denotes amplitude quantization values used for Rel-16 e-TypeII codebook and ε>0):

$$\text{Mode 1: } \hat{\theta}(D) \in \{p(n)^2 \cdot 2\pi, \, n = 0, 1, 2, \dots, 2^B - 1\},$$

$$\text{Mode 2: } \hat{\theta}(D) \in \{(1 - p(n)^2) \cdot 2\pi, \, n = 0, 1, 2, \dots, 2^B - 1\}$$

The quantization mode is selected by UE and reported to gNB, or it is configured (higher layer) or it is fixed (e.g., Mode 1).

$p(n) = 2^{-(N-n) \cdot s} = 2^{-(7-n) \cdot 0.5}$ (B=3) or $2^{-(15-n) \cdot 0.25}$ (B=4). In one example, s=1. In one example, $N = 2^B - 1$. Or $p(n) = \rho^{-(N-n)} = \rho^{-(7-n) \cdot 0.5}$ (B=3) or $\rho^{-(15-n) \cdot 0.25}$ (B=4), where $\rho$ is as defined above. In on example, $N = 2^B - 1$.

In one example, the phase quantization codebook is according to a combination/merge of at least two of example A, B, and C. The details as described in Table 32.

TABLE 32

| Example | m | $f(n)$ | c | Comment |
|---|---|---|---|---|
| A | 1 | $2^{-(B-n) \cdot s} \cdot \pi$ | 0 | This is similar to v or $1 - v$ |
|  | −1 |  | 0 | we discussed for amp |
|  | 0 |  | 0 |  |
| B | 1 | $p(n)^2 \cdot 2\pi$ | 0 | If $p(n) = 2^{-(N-n) \cdot s} =$ |
|  | −1 |  | $2\pi$ | $2^{-(7-n) \cdot 0.5}$ (B = 3) or $2^{-(15-n) \cdot 0.25}$ (B = 4), i.e., legacy Rel.16 (ref or diff amp), Example A is essentially a differential (derivative) of Example B w.r.t. $p(n)$ This is similar to $v^2$ or $1 - v^2$ we discussed for amp |
| C | adaptive slope, depending on the amplitude $(m_1)$ of the $1^{st}$ correlation, e.g., $m_1 = 2^{-(N-q1) \cdot s}$, $q_1 \in \{0, 1, \dots, 2^{Qamp} - 1\}$ is index of quantized amplitude |  |  |  |
| D | A value from $\{0, 1, -1, S\}$, $S =$ other values (e.g., $\pm1/2, \pm1/4 \dots$) depending on the amplitude $(m_1)$ of the $1^{st}$ correlation (smallest delay) In one example, S is empty (null). In one example, S is non-empty (e.g., $\pm1/2, \pm1/4 \dots$) | B = 3, 4 N = 7, 15 S = 0.25, 0.5 | 0, $2\pi$ In one example, c depends on s ( e.g., 0 when s = 0.25, and $2\pi$ when s = 0.5) | B = 3: $p(n) = 2^{-(7-n) \cdot 0.25}$ or $2^{-(7-n) \cdot 0.5}$ B = 4: $p(n) = 2^{-(15-n) \cdot 0.25}$ or $2^{-(15-n) \cdot 0.5}$ |

In one example, the UE reports two phase angles ($a_{i_1}$ and $a_{i_2}$) of the $i_1$-th and $i_2$-th correlations corresponding to lags/delays $\tau_{i_1}$ and $\tau_{i_2}$. Assuming a linear phase, a phase angle ($a_n$) of the n-th correlation corresponding to lag/delay $\tau_n$ is represented as $$a_n = m\left(\tau_n - \tau_{i_1}\right) + a_{i_1},$$

or $$a_n = m\left(\tau_n - \tau_{i_2}\right) + a_{i_2},$$

where $$m = \frac{\left(a_{i_1} - a_{i_2}\right)}{\left(\tau_{i_1} - \tau_{i_2}\right)} = \frac{\left(a_{i_2} - a_{i_1}\right)}{\left(\tau_{i_2} - \tau_{i_1}\right)}.$$

In one example, $i_1 = 1$ and $i_2 = 2$ and the UE reports phase angles ($a_1$ and $a_2$) of the $1^{st}$ and $2^{nd}$ correlation values corresponding to (the two smallest non-zero) lags/delays $\tau_1$ and $\tau_2$. In one example, $i_1$ and $i_2$ are indices of the two smallest non-zero lags/delays that can be calculated/reported by the UE, e.g., based on the measurement (e.g., TRS measurement) or based on the configuration (e.g., the UE is configured with an information about the lag/delay values that the UE can report the correlation value for). In one example, one or both of indices $i_1$ and $i_2$ are configured (e.g., RRC). In one example, one or both of indices $i_1$ and $i_2$ are fixed (e.g., $i_1 = 1$). In one example, one or both of indices $i_1$ and $i_2$ are reported by the UE (e.g., CSI report or UE capability reporting).

In one example, $a_{i_1}$ and $a_{i_2}$ are reported using a $b_a$-bit codebook, where $b_a$ can be fixed (e.g., 2 or 3 or 4) or configured (e.g., via RRC). In one example, the codebook is uniform between [x, y], i.e., the codebook is $\{x, x+s, x+2s, \dots, x+(2^{b_a}-1)s\}$ or $\{s, 2s, 3s, \dots, 2^{b_a}s\}$ or $$\left\{x + \frac{1}{2}s, \, x + \frac{3}{2}s, \, x + \frac{5}{2}s, \, \dots, \, x + \frac{(2^{b_a+1} - 1)}{2}s\right\}$$

where s is the step size (quantization interval). In one example, x=0. In one example, y=45° or $\pi/4$ radian, or y=60° or $\pi/3$ radian. In one example, $$s = \frac{y - x}{2^{b_a}}.$$

In one example, $$s = \frac{y - x}{k \times 2^{b_m}}$$

and k is scaling factor. In one example, $s = y-x/2^M \times 2^{b_m}$ and $2^M$ is scaling factor.

In one example, when $b_a = 2$, the codebook is {x, x+s, x+2s, x+3s} or {s, 2s,3s, 4s} or $$\left\{ x + \frac{1}{2}s, x + \frac{3}{2}s, x + \frac{5}{2}s, x + \frac{7}{2}s \right\}$$

and $$s = \frac{y - x}{4}.$$

When x=0 and y=π/4, the codebook is C×π/4, where C is {0, 1/4, 1/2, 3/4} or {1/4, 1/2, 3/4, 1} or {1/8, 3/8, 5/8, 7/8}.

In one example, when $b_m = 3$, the codebook is {x, x+s, x+2s, . . . , x+7s} or {s, 2s,3s, . . . , 8s} or $$\left\{ x + \frac{1}{2}s, x + \frac{3}{2}s, x + \frac{5}{2}s, \ldots, x + \frac{15}{2}s \right\}$$

and s=y−x/8. When x=0 and y=π/4, the codebook is C×π/4, where C is {0, 1/8, 1/4, 3/8, . . . 7/8} or {1/8, 1/4, 3/8, . . . 7/8, 1} or {1/16, 3/16, 5/16, . . . , 15/16}.

At least one of the following examples is used regarding k.

In one example, k is fixed, e.g., 1 or k=1/φ and $$\varphi \in \left\{ 2\pi, \pi, \frac{\pi}{2}, \frac{\pi}{4}, \frac{\pi}{8}, \frac{\pi}{2^Q}, \frac{\pi}{2^{Q-1}} \right\}.$$

In one example, k is reported by the UE. The set of candidate values for this reporting can be fixed (e.g., {1, 2, 4, 8, 16}) or configured (e.g., UE can be configured all of or a subset of {1, 2, 4, 8, 16}). When configured, the configured can be subject to a UE capability reporting for the support of the set of candidate values. This configuration can be via RRC, and/or MAC CE and/or DCI. Or, for reporting, a max value or a min value or both max and min values of k can be configured via RRC, and/or MAC CE and/or DCI.

In one example, k is configured e.g., from {1, 2, 4, 8, 16} (e.g., via RRC, and/or MAC CE and/or DCI).

In one example, k is determined implicitly, without any signaling/reporting/configuration. For example, when the amplitude (or absolute value) $m_1$ of the $1^{st}$ correlation corresponding to (the smallest non-zero) lag/delay $\tau_1$ is (Ex1) $m_1 \geq v$ or $m_1 = v$, (Ex2) $m_1 \leq u$ or $m_1 = u$, or (Ex3) $v \leq m_1 \leq u$, k takes a value from a set of candidate values {$k_0$, $k_1$, . . . , $k_{P-1}$}. Three examples are shown in Table 33.

In one example, k=$2^{(N-q_1) \cdot s}$, $q_1 \in$ {0, 1, . . . , $2^Q-1$}, $Q_{ph}=3$, 4, N=7, 15, and s=0.25, 0.5, and $m_1=2^{-(N-q_1) \cdot s}$. In one example, s=1. In on example, N=$2^B-1$.

At least one of the following examples is used regarding M.

In one example, M is fixed, e.g., 0 or $2^M=G/\varphi$ and $$\varphi \in \left\{ 2\pi, \pi, \frac{\pi}{2}, \frac{\pi}{4}, \frac{\pi}{8}, \frac{\pi}{2^Q}, \frac{\pi}{2^{Q-1}} \right\}.$$

In one example, M is reported by the UE. The set of candidate values for this reporting can be fixed (e.g., {0, 1, 2, . . . , 4}) or configured (e.g., UE can be configured all of or a subset of {0, 1, 2, . . . , 4}). When configured, the configured can be subject to a UE capability reporting for the support of the set of candidate values. This configuration can be via RRC, and/or MAC CE and/or DCI. Or, for reporting, a max value or a min value or both max and min values of k can be configured via RRC, and/or MAC CE and/or DCI.

In one example, M is configured e.g., from {0, 1, 2, . . . , 4} (e.g., via RRC, and/or MAC CE and/or DCI).

In one example, M is determined implicitly, without any signaling/reporting/configuration. For example, when the amplitude (or absolute value) $m_1$ of the $1^{st}$ correlation corresponding to (the smallest non-zero) lag/delay $\tau_1$ is $m_1 \geq v$ or $m_1 \leq u$ or $v \leq m_1 \leq u$, M takes a value from a set of candidate values {$M_0$, $M_1$, . . . , $M_{P-1}$}. Three examples are shown in Table 34.

In one example, k=$(N-q_1) \cdot s$, $q_1 \in$ {0, 1, . . . , $2^Q-1$}, $Q_{ph}=3$, 4, N=7, 15, and s=0.25, 0.5, and $m_1=2^{-(N-q_1) \cdot s}$. In one example, s=1. In on example, N=$2^B-1$.

TABLE 33

| Ex1: $m_1 \geq v$ or $m_1 = v$ Value of v | Ex2: $m_1 \leq u$ or $m_1 = u$ Value of u | Ex3: $v \leq m_1 \leq u$ Value of (v, u) | Value of k |
|---|---|---|---|
| $v_0$ | $u_0$ | $(v_0, u_0)$ | $k_0$ |
| $v_1$ | $u_1$ | $(u_0, u_1)$ | $k_1$ |
| . | . | . | . |
| . | . | . | . |
| . | . | . | . |
| $v_{P-1}$ | $u_{P-1}$ | $(u_{P-2}, u_{P-1})$ | $k_{P-1}$ |

TABLE 34

| Ex1: $m_1 \geq v$ or $m_1 = v$ Value of v | Ex2: $m_1 \leq u$ or $m_1 = u$ Value of u | Ex3: $v \leq m_1 \leq u$ Value of (v, u) | Value of M |
|---|---|---|---|
| $v_0$ | $u_0$ | $(v_0, u_0)$ | $M_0$ |
| $v_1$ | $u_1$ | $(u_0, u_1)$ | $M_1$ |
| . | . | . | . |
| . | . | . | . |
| . | . | . | . |
| $v_{Q-1}$ | $u_{Q-1}$ | $(u_{Q-2}, u_{Q-1})$ | $M_{Q-1}$ |

In one embodiment, a B-bit phase codebook is given by $$\varphi_n = e^{j\frac{2\pi n}{k \times 2^B}} e^{j\frac{Gn}{k \times 2^B}}$$

where n=0, 1, . . . , $2^{B-1}$ or 2n=$\varphi_0$ where q=0, 1, . . . , $2^B-1$, $\varphi_0=2^{B-1}$, and k is scaling factor. At least one of the following examples is used regarding k.

In one example, k is fixed, e.g., 1 or k=G/φ and $$\varphi \in \left\{ 2\pi, \pi, \frac{\pi}{2}, \frac{\pi}{4}, \frac{\pi}{8}, \frac{\pi}{2^Q}, \frac{\pi}{2^{Q-1}} \right\}.$$

In one example, k is reported by the UE. The set of candidate values for this reporting can be fixed (e.g., {1, 2, 4, 8, 16}) or configured (e.g., UE can be configured all of or a subset of {1, 2, 4, 8, 16}). When configured, the configured can be subject to a UE capability reporting for the support of the set of candidate values. This configuration can be via RRC, and/or MAC CE and/or DCI. Or, for reporting, a max value or a min value or both max and min values of k can be configured via RRC, and/or MAC CE and/or DCI.

In one example, k is configured e.g., from {1, 2, 4, 8, 16} (e.g., via RRC, and/or MAC CE and/or DCI).

In one example, k is determined implicitly, without any signaling/reporting/configuration. For example, when the amplitude (or absolute value) $m_1$ of the $1^{st}$ correlation corresponding to (the smallest non-zero) lag/delay $\tau_1$ is $m_1 \geq v$ or $m_1 \leq u$ or $v \leq m_1 \leq u$, k takes a value from a set of candidate values $\{k_0, k_1, \ldots, k_{P-1}\}$. Three examples are shown in Table 33.

In one example, $k=2^{(N-q1)\cdot s}$, $q_1 \in \{0, 1, \ldots, 2^Q-1\}$, $Q_{ph}=3$, 4, N=7, 15, and s=0.25, 0.5, and $m_1=2^{-(N-q1)\cdot s}$. In one example, s=1. In on example, N=$2^B-1$.

In one embodiment, a B-bit phase codebook is given by $$\varphi_n = e^{j\frac{2\pi n}{2^M \times 2^B}} \text{ or } e^{j\frac{Gn}{k \times 2^B}}$$

where n=0, 1, . . . , $2^B-1$ or 2n=q−$\varphi_0$ where q=0, 1, . . . , $2^B-1$, $\varphi_0=2^{B-1}-1$, and $2^M$ is scaling factor and M is a positive integer (i.e., M≥1). At least one of the following examples is used regarding M.

In one example, M is fixed, e.g., 0 or $2^M$=G/φ and $$\varphi \in \left\{ 2\pi, \pi, \frac{\pi}{2}, \frac{\pi}{4}, \frac{\pi}{8}, \frac{\pi}{2^Q}, \frac{\pi}{2^{Q-1}} \right\}.$$

In one example, M is reported by the UE. The set of candidate values for this reporting can be fixed (e.g., {0, 1, 2, . . . , 4}) or configured (e.g., UE can be configured all of or a subset of {0, 1, 2, . . . , 4}). When configured, the configured can be subject to a UE capability reporting for the support of the set of candidate values. This configuration can be via RRC, and/or MAC CE and/or DCI. Or, for reporting, a max value or a min value or both max and min values of k can be configured via RRC, and/or MAC CE and/or DCI.

In one example, M is configured e.g., from {0, 1, 2, . . . , 4} (e.g., via RRC, and/or MAC CE and/or DCI).

In one example, M is determined implicitly, without any signaling/reporting/configuration. For example, when the amplitude (or absolute value) $m_1$ of the $1^{st}$ correlation corresponding to (the smallest non-zero) lag/delay $\tau_1$ is $m_1 \geq v$ or $m_1 \leq u$ or $v \leq m_1 \leq u$, M takes a value from a set of candidate values $\{M_0, M_1, \ldots, M_{P-1}\}$. Three examples are shown in Table 34.

82

In one example, k=(N−$q_1$)·s, $q_1 \in \{0, 1, \ldots, 2^Q-1\}$, $Q_{ph}=3$, 4, N=7, 15, and s=0.25, 0.5, and $m_1=2^{-(N-q1)\cdot s}$. In one example, s=1. In on example, N=$2^{B-1}$.

In one embodiment, a phase codebook for reporting the phase angle values, $\phi_0$, $\phi_1$, . . . , $\phi_{Y-1}$, is given by $\{v_0, \ldots, v_{X-1}\}+\theta_0$, where $\theta_0$ is a reference, which can be fixed (e.g., 0) or configured (e.g., via RRC) or reported by the UE (e.g., as a reference phase angle) or determined implicitly e.g., based on the amplitude of the $1^{st}$ correlation corresponding to the smallest delay value, or based on the previous phase value (a for phase of y-th correlation is determined based on phase of (y−1)-th phase), and at least one of the following examples is used or configured for $\{v_0, \ldots, v_{X-1}\}$. In one example, the same/one common phase angle value is reported for all Y phase values, i.e., only a 1-bit indicator is used to report a single-phase angle value, and the reported value. In one example, for each of the Y phase values, a phase angle value is reported.

In one example, the codebook includes at least 2 values $\{v_0, v_1\}$.

In one example, $\{v_0, v_1\}=\{\pi, 0\}$ and $\{-\pi, 0\}$, and the corresponding phase is BPSK $\{e^{jv_i}\}=\{-1,1\}$.

In one example, the codebook includes at least 3 values $\{v_0, v_1, v_2\}$.

In one example, $$\{v_0, v_1, v_2\} = \left\{ \pi, 0, \frac{\pi}{A} \right\} \text{ or } \left\{ -\pi, 0, -\pi + \frac{\pi}{A} \right\}$$

$$\text{or } \left\{ -\pi, 0, \pi + \frac{\pi}{A} \right\} \text{ or } \left\{ -\frac{\pi}{A}, 0, \frac{\pi}{A} \right\} \left\{ 2\pi - \frac{\pi}{A}, 0, \frac{\pi}{A} \right\}.$$

In one example, A=2. In one example, A=−2. In one example, A=4. In one example, A=−4. In one example, A=$2^a$ or −$2^a$, where a is either fixed (e.g., 2, 4, 8, 16) or configured (e.g., via RRC) or determined implicitly, e.g., based on the amplitude of the $1^{st}$ correlation corresponding to the smallest delay value, or based on the previous phase value (a for phase of y-th correlation is determined based on phase of (y−1)-th phase). The corresponding phase is $$\{e^{jv_i}\} = \left\{ -1, 1, e^{j\frac{j\pi}{A}} \right\}.$$

In one example, $$\{v_0, v_1, v_2\} = \left\{ -\frac{\pi}{A}, 0, \frac{\pi}{A} \right\} \text{ or } \left\{ 2\pi - \frac{\pi}{A}, 0, \frac{\pi}{A} \right\}.$$

In one example, A=2. In one example, A=−2. In one example, A=4. In one example, A=−4. In one example, A=$2^a$ or −$2^a$, where a is either fixed (e.g., 2, 4, 8, 16) or configured or determined implicitly, e.g., based on the amplitude of the $1^{st}$ correlation corresponding to the smallest delay value, or based on the previous phase value (a for phase of y-th correlation is determined based on phase of (y−1)-th phase). The corresponding phase is $$\{e^{jv_i}\} = \left\{ e^{-j\frac{j\pi}{A}}, 1, e^{j\frac{j\pi}{A}} \right\} \text{ or } \left\{ e^{j(2\pi - \frac{\pi}{A})}, 1, e^{j\frac{j\pi}{A}} \right\}.$$

In one example, the codebook includes at least 4 values $\{v_0, v_1, v_2, v_3\}$, where $\{v_0, v_1, v_2\}$ is according to at least one of the previous two examples. In one example, $v_3$ is fixed (e.g., $\pi$), or configured (e.g., via RRC). In one example, $v_3 = 2^b$ or $-2^b$, where b is either fixed (e.g., 2, 4, 8, 16) or configured (e.g., via RRC) or determined implicitly, e.g., based on the amplitude of the $1^{st}$ correlation corresponding to the smallest delay value, or based on the previous phase value (a for phase of y-th correlation is determined based on phase of (y−1)-th phase).

In one example, the codebook includes at least 7 values $\{v_0, \ldots, v_6\}$.

In one example, $$\left\{ -\frac{\pi}{A_3}, -\frac{\pi}{A_2}, -\frac{\pi}{A_1}, 0, \frac{\pi}{A_1}, \frac{\pi}{A_2}, \frac{\pi}{A_3} \right\}.$$

In one example, $A_i = 2^{Z-i+1}$ and i=1,2,3, where Z can be 3, 4, or 5. In one example, $A_i = m*i+c$, where m is one of $\{-4, -3, -2, 1, 1, 2, 3, 4\}$ and c is one of $\{0, 1, -1, 2, -2\}$.

In one example, $$\left\{ -\frac{\pi}{2^{a_3}}, -\frac{\pi}{2^{a_2}}, -\frac{\pi}{2^{a_1}}, 0, \frac{\pi}{2^{a_1}}, \frac{\pi}{2^{a_2}}, \frac{\pi}{2^{a_3}} \right\}.$$

In one example, $a_i = i$ and i=1, 2, 3. In one example, $a_i = m*i+c$ and i=1, 2, 3 where m is one of $\{-4, -3, -2, 1, 1, 2, 3, 4\}$ and c is one of $\{0, 1, -1, 2, -2\}$.

In one example, the codebook includes at least 8 values $\{v_0, \ldots, v_7\}$, where $\{v_0, \ldots, v_6\}$ is according to at least one of the previous two examples. In one example, $v_7$ is fixed (e.g., $\pi/2^{a_4}$), or configured (e.g., via RRC). In one example, $v_3 = \pi 2^b$ or $-\pi 2^b$, where b is either fixed (e.g., 2, 4, 8, 16) or configured (e.g., via RRC) or determined implicitly, e.g., based on the amplitude of the $1^{st}$ correlation corresponding to the smallest delay value, or based on the previous phase value (a for phase of y-th correlation is determined based on phase of (y−1)-th phase).

In one embodiment, a phase codebook for reporting the phase angle values, $\phi_0, \phi_1, \ldots, \phi_{Y-1}$, is given by a differential codebook comprising values, $x_1 x_2$.

In one example, $x_1 \in \{-1, 1\}$, and $x_2 \in X_2$ where $X_2$ comprises 4, 8, or 16, values around $x_1$.

In one example, $x_1$ belongs to a 2-bit codebook CB1 and $x_2 \in X_2$ where $X_2$ comprises 4, 8, or 16, values around $x_1$. In one example, CB1 includes 4 values, one value in each of the 4 quadrants of the x–y space, $1^{st}$ quad, $2^{nd}$ quad, ... $4^{th}$ quad), or CB1 includes QPSK $\{1, j, -1, -j\}$, or CB1 includes $\{1, j, -1, -j\}$+positive angle (e.g., pi/4).

In one example, a phase value is quantized differentially as $c_p = x_1 x_2 = a_p b_p = e^{j(\alpha+\beta)}$, where $a_p = e^{j\alpha}$ is a reference phase; and $b_p = e^{j\beta}$ is a differential phase (w.r.t. to the reference phase). In one example, the reference can be common (i.e., one reference phase) for all Y phase values, so, the total number of reported phase values is 1+Y. In one example, the $1^{st}$ of the Y phase values is the reference for the remaining Y−1 phase values, so, the total number of reported phase values is Y. In one example, for i≥2, (i−1)-th phase value is the reference for i-th phase value, so, the total number of reported phase values is Y. In one example, $$a_p \in \left\{ e^{\frac{j\pi}{4}}, e^{\frac{j3\pi}{4}}, e^{\frac{j5\pi}{4}}, e^{\frac{j7\pi}{4}} \right\} \text{ and } b_p \in \left\{ e^{-\frac{j\pi}{4}}, e^{\frac{j\pi}{4}} \right\}$$

$$a_p = \left\{ e^{j\pi\left(\frac{k}{2}+\frac{1}{4}\right)}: k = 0,1,2,3 \right\} \text{ or } \left\{ e^{j\pi\left(\frac{2k+1}{4}\right)}: k = 0,1,2,3 \right\};$$

-continued $$\text{and } b_p = \left\{ e^{j\pi\left(\frac{k}{2}-\frac{1}{4}\right)}: k = 0, 1 \right\} \text{ or } \left\{ e^{j\pi\left(\frac{2k-1}{4}\right)}: k = 0,1 \right\}$$

$a_p=\{1, j, -1, -j\}$ (2 bit reference) and $b_p=\{1, j\}$ (1-bit differential), $a_p=\{1, j, -1, -j\}$ (2 bit reference) and $b_p=\{1, -j\}$ (1-bit differential), $a_p=\{1, j, -1, -j\}$ (2 bit reference) and $b_p=\{e^{-j\pi/4}, e^{j\pi/4}\}$ (1-bit differential), $$a_p = \left\{ e^{\frac{j\pi}{4}}, e^{\frac{j3\pi}{4}}, e^{\frac{j5\pi}{4}}, e^{\frac{j7\pi}{4}} \right\} \text{(2 bit reference) and } b_p =$$
$$\left\{ e^{-\frac{j\pi}{4}}, e^{\frac{j\pi}{4}} \right\} \text{(1−bit differential)},$$

$$a_p = \left\{ e^{\frac{j\pi}{4}}, e^{\frac{j3\pi}{4}}, e^{\frac{j5\pi}{4}}, e^{\frac{j7\pi}{4}} \right\} \text{(2 bit reference) and } b_p =$$
$$\{1, -j\} \text{(1−bit differential)},$$

$$a_p =$$
$$\left\{ e^{\frac{j\pi}{4}}, e^{\frac{j3\pi}{4}}, e^{\frac{j5\pi}{4}}, e^{\frac{j7\pi}{4}} \right\} \text{(2 bit reference) and } b_p = \{1, j\} \text{(1−bit differential)}.$$

$a_p=$(3 bit) and $b_p=$(1 bit)
$a_p=$(3 bit) and $b_p=$(2 bit)
$a_p=$(4 bit) and $b_p=$(2 bit)
$a_p=$(4 bit) and $b_p=$(3 bit)
$a_p=$(1 bit) and $b_p=$(2 bit)
$a_p=$(1 bit) and $b_p=$(3 bit)
$a_p=$(2 bit) and $b_p=$(3 bit)

In one example, the quantities $a_p$, $b_p$, are given by $$a_p = e^{j\pi\left(\frac{p}{2}+\frac{1}{4}\right)} = e^{\frac{j\pi}{4}} e^{\frac{j\pi p}{2}}$$

$$b_p = e^{j\pi\left(\frac{p}{2}-\frac{1}{4}\right)} = e^{-\frac{j\pi}{4}} e^{\frac{j\pi p}{2}}$$

In one example, $a_p=\{-1,1\}$ (sign value, or, $e^{j\pi n}$, $n=0, 1$, BSPK) (1 bit), and $$b_p = \left\{ e^{j2\pi\frac{(n-n_0)}{2^M}} \right\},$$

(n=0, ..., B−1, where B=2, 3, 4).

In one example, $$a_p = \{-1+aj, -1-aj, 1-aj, 1+aj\} = \left\{ e^{j\pi\left(p+\frac{q}{2R}\right)}, \right\}$$

(values in four quadrant, 2 bit). Note $$e^{j\pi\left(p+\frac{q}{2R}\right)} = e^{j\pi p} e^{j\pi\left(\frac{q}{2R}\right)} \text{ or } e^{j\pi\left(p+\frac{q}{2R}\right)} = e^{j2\pi\left(\frac{2^{R-1}p+q}{2R}\right)}.$$

In one example, p=0, 1 and q=−1, 1. In one example, q values are from $\{0, 1, \ldots, 2R-1\}$ is such that all Y phases are in the same quadrant, or in either side of the 2 quads (around 1 or −1), or in any of the 4 quads. In one example, R=4 (resolution based on 16PSK). In one example, R is fixed, determined implicitly based on (min) delay value ($R \leq R_0$ decreases as delay increases, $R_0$ is the max supported resolution), or R is configured (RRC, MAC CE or DCI), or reported by the UE via UE cap.

In one example, for a given R, q values may be linear or exponential

In one example, the codebook for $a_p$ is based on $R_0$ for smallest delay ($1^{st}$ of the Y values) or the previous delay. For y=1, ..., Y−1, the phase value is $a_p b_p$ from a codebook $CB_y$, where $a_p$=value of phase at y=0 from $CB_0$ or $a_p$=value of phase at y−1, and $b_p$=is linear or exponential, described above. In one example, $CB_0$ and $CB_y$ are the same codebook. In one example, $CB_0$ is different from $CB_y$. When different, the number of bits can be the same, or different, (e.g., less bits for $CB_0$ and more bits for $CB_y$, or vice versa). In one example, $CB_y$ can be the same for all y=1, ..., Y−1. In one example, $CB_y$ is different for all y.

In one example, the phase quantization for phase y is dependent on the phase quantization for phase<y. In one example, the CB for y=j is less in size or is a subset of the CB for y=j−1. In one example, the CB for y=j is less in size or is a subset of the CB for y=0.

In one example, when the phase quantization for y=j is the largest possible phase value from codebook, then the phase for y>j is either assumed to be the same phase as that for y=j, or can't be reported or is not reported (either way there is no phase reporting for y>j).

86

In one example, $a_p b_p = \{m2^{-(M'Q)}\}\cdot\pi$, where $a_p = m = (p-\varphi_0) = q'$, where $q' = -2^{Q-1}+1, \ldots, -1, 0, 1, \ldots, 2^{Q-1}$
$b_p = 2^{-(M+Q)}\pi$, where (M+Q)=$(2^Q-1-q)$ When $Q = 3$, $\varphi = 2^{-M}\pi = 2\pi\{2^0, 2^{-1}, 2^{-2}, 2^{-3}, 2^{-4}\}$, same as: $\varphi \in \left\{2\pi, \pi, \dfrac{\pi}{2}, \dfrac{\pi}{4}, \dfrac{\pi}{8}\right\}$ In one example, $\{[a_p b_p = \{mf(q)\}\cdot\pi], m=-1, 0, 1, q=0, 1, 2, \ldots, 2^Q-1\}$
 $a_p$=m (acts as a reference phase, i.e., phase of y-th lag is $a_{y-1} b_y$ or $a_0 b_y$, where $a_0$ is fixed reference and $a_{y-1}$ is adaptive reference $b_p$ is relative phase).
 $b_p$=f(q). π is a differential phase
In one example, $$f(q) = 2^{-(N-q-\frac{r}{2s})(r+1)s},$$

is fixed (0 or 1), can take two values r=0, 1. In one example, f(q)=$2^{-(M+Q)}$, where M can be function of q.

In one example, m=−1, 0, 1. In one example, m=(q−$\varphi_0$)=q'= ..., −2, −1, 0, 1, 2, ....

In one example, Q=3, 4, (N,s)=(7,0.5), (15,0.25) (7,1), (15,1) ($2^Q-1$,1).

In one example, the phase quantization codebook is according to a combination/merge of at least two of example E-I. The details as described in Table 35.

TABLE 35

| Linear | Exponential |
|---|---|
| *Ex E*: $\left\{\varphi\dfrac{q-\varphi_0}{2^Q}\right\}$ | *Ex F*: |
| $q = 0, 1, \ldots, 2^Q-1$, $\varphi_0 = 2^{Q-1}-1$, $\varphi = 2^{-M}\pi$ | $\theta(D) \in \{2^{-(N-q)\cdot s}\cdot\pi, q = 0, 1, 2, \ldots,$ |
| $\varphi \in \left\{2\pi, \pi, \dfrac{\pi}{2}, \dfrac{\pi}{4}, \dfrac{\pi}{8}\right\}$ | $2^Q-1\} \cup \{-2^{-(N-q)\cdot s}\cdot\pi, q = 0, 1, 2, \ldots,$ |
| | $2^Q-2\} \cup \{0\}$ |
| *Ex I*: *Ex E* = *Ex F* with $s = 1$ and $r = 0$ and | Ex G: when p(q) = $2^{-(N-q)\cdot s}$, then Alt6 is similar to Alt5, please see below (red). |
| M = 4,3,2,1,0, −1, −2, −3 - 4,3,2,1,0 −1, −2, −3 _ same as 0 (phase wrap), hence can be removed Therefore, $\varphi = 2^{-M}\pi$ = $2\pi\{2^0, 2^{-1}, 2^{-2}, 2^{-3}, 2^{-4}\}$ | Ex H: merged (*F* and *G*) |
| Same as: $\varphi \in \left\{2\pi, \pi, \dfrac{\pi}{2}, \dfrac{\pi}{4}, \dfrac{\pi}{8}\right\}$ (Alt7) | $\theta(D) \in \left\{2^{-(N-q-\frac{1}{2s})2s}\cdot\pi, q = 0, 1, 2, \ldots,\right.$ |
| $N = 2^Q-1$ | If we fix $s = 1$, $\left\{\left[\left\{m2^{-(N-q-\frac{r}{2}(r+1))}\right\}\cdot\pi\right]\right\}$ |
| $\left\{\left[\left\{m2^{-(M+Q)}\right\}\cdot\pi\right]\right\}$ | If we fix $s = 1$ and $r = 0$, $\left\{\left[\left\{m2^{-(N-q)}\right\}\cdot\pi\right]\right\}$ |
| $m = (q - \varphi_0) = q'$, | If we fix $s = 1$ and $r = 0$ and $N = 2^Q-1$, |
| $q' = -2^{Q-1}+1, \ldots, -1, 0, 1, \ldots, 2^{Q-1}$ | $\left\{\left[\left\{m2^{-(2^Q-1-q)}\right\}\cdot\pi\right]\right\}$ |
| If $(M + Q) = (2^Q - 1 - q)$ | |
| $M = -q + (2^Q - 1 - Q)$ | |
| For $Q = 3$, $N = 2^Q-1$ | |

In one example, the codebook for phase $e^{j\alpha}$ reporting is based on the at least one of the following parameters for reporting phase angle $\alpha$.

$Q=3, 4; N=[2^Q-1, 2^Q]; s=[1, 1/2]$

In one example, $CB_1=\{2^{-(N-q)\cdot s}\cdot\pi, q=0, 1, 2, \ldots, 2^Q-1\}\cup\{-2^{-(N-q)\cdot s}\cdot\pi, q=0, 1, 2, \ldots, 2^Q-1\}$ In one example, $CB_2=\{2^{-(N-q)\cdot s}\cdot\pi, q=0, 1, 2, \ldots, 2^Q-1\}\cup\{-2^{-(N-q)\cdot s}\cdot\pi, q=0, 1, 2, \ldots, 2^Q-2\}$ In one example, $CB_3=\{2^{-(N-q)\cdot s}\cdot\pi, q=0, 1, 2, \ldots, 2^Q-2\}\cup\{-2^{-(N-q)\cdot s}\cdot\pi, q=0, 1, 2, \ldots, 2^Q-2\}$ In one example, $CB_4=\{2^{-(N-q)\cdot s}\cdot\pi, q=0, 1, 2, \ldots, 2^Q-2\}\cup\{-2^{-(N-q)\cdot s}\cdot\pi, q=0, 1, 2, \ldots, 2^Q-1\}$ In one example, $CB_5=CB_i\cup\{0\}$ where $i\in\{1, \ldots, 4\}$ In one example, $CB_6=\{m2^{-(N-q)\cdot s}\cdot\pi, q=0, 1, 2, \ldots, 2^Q-1\}$ where $m=\{-1,1\}$ or $m=\{-1, 0, 1\}$ In one example, the codebook for phase $e^{j\alpha}$ reporting is based on the at least one of the following parameters for reporting phase angle $\alpha$.

$$Q = 3, 4; N = [2^Q - 1, 2^Q]$$

In one example, $CB_7=\{2^{-N}q\cdot\pi, q=0, 1, 2, \ldots, 2^Q-1\}\cup\{-2^{-N}q\cdot\pi, q=0, 1, 2, \ldots, 2^Q-1\}$ In one example, $CB_8=\{2^{-N}q\cdot\pi\cdot2\pi, q=0, 1, 2, \ldots, 2^Q-1\}$ Codebook alphabet: the set of (all) values for the quantization/reporting of the phase values, comprises $2^Q$ values and is according to $CB_i$ where i is one value from $\{1, 2, \ldots, 8\}$ In one example, the phase reporting is according to a reporting scheme 1 (independent reporting), wherein For each delay (index) $y=0, 1, \ldots, Y-1$, the phase is quantized/reported using $CB_i$.

Reporting scheme 2: differential reporting $Q_{diff}<Q$ (e.g., Q-1 or Q-2)

$q_{-1}=0$

For each delay (index) $y=0, 1, \ldots, Y-1$, the phase is quantized/reported using $2^{Q_{diff}}$ values from $CB_i$ as $f(q_y)$ where $q_y=\{q_{y-1}, \ldots, q_{y-1}+2^{Q_{diff}}-1\}=q_{y-1}+q_{diff}$ where $q_{y-1}$ is an index of the quantized phase corresponding to the previous delay, and $q_{diff}=0, 1, \ldots, (2^{Q_{diff}}-1)$ In one example, $$q_{diff} = 0, 1, \ldots, (2^{Q_{diff}} - 1) \text{ and } K = 2^{-\left(N-\left(2^{Q_{diff}}-1\right)\right)}$$

$$f(q_y) = K2^{-\left(2^{Q_{diff}}-1-q_y\right)s} = K2^{-\left(2^{Q_{diff}}-1-q_{y-1}-q_{diff}\right)s} \text{ (for } CB_1)$$

$$f(q_y) = 1 - K2^{-\left(2^{Q_{diff}}-1-q_y\right)s} = 1 - K2^{-\left(2^{Q_{diff}}-1-q_{y-1}-q_{diff}\right)s} \text{ (for } CB_2)$$

In one example, $$q_{diff} = 0, 1, \ldots, (2^{Q_{diff}} - 1) \text{ and } N = 2^Q - 1 \text{ or } = 2^Q$$

$$f(q_y) = 2^{-(N-q_y)s} = 2^{-(N-q_{y-1}-q_{diff})s} \text{ (for } CB_1)$$

$$f(q_y) = 1 - 2^{-(N-q_y)s} = 1 - 2^{-(N-q_{y-1}-q_{diff})s} \text{ (for } CB_2)$$

Reporting scheme 3: For delay $y=0$, the phase is quantized/reported using $CB_i$ (cf. scheme 1), however, for each of the remaining delay (index) $y=1, \ldots, Y-1$, the phase is quantized/reported using $2^{Q_{diff}}$ values from $CB_i$ as $f(q_y)$, as described in scheme 2.

Reporting scheme 4: For delay $y=d$, the phase is quantized/reported using $CB_i$ (cf. scheme 1), however, for each of the remaining delay (index) $y=\{0, 1, \ldots, Y-1\}\backslash\text{(minus)}\{c\}$, the phase is quantized/reported using $2^{Q_{diff}}$ values from $CB_i$ as $f(q_y)$, as described in scheme 2, where d is fixed (e.g., 1) or configured (e.g., via RRC) or reported by the UE.

In one example, the phase reporting is according to a reporting scheme 5 (differential reporting), wherein $Q_{diff}<Q$ (e.g., Q-1 or Q-2)

$f(q_{q-1})=c$ where c is fixed (e.g., 1) or configured (e.g., via RRC) or reported by the UE.

For each delay (index) $y=0, 1, \ldots, Y-1$, the phase is quantized/reported using $2^{Q_{diff}}$ values from $CB_i$ as $f(q_{y-1})f(q_y)$ where $q_y=\{b, \ldots, b+2^{Q_{diff}}-1\}=b+q_{diff}$ where b is fixed (e.g., b=0 or b=$q_{y-1}$), and $q_{y-1}$ is an index of the quantized phase corresponding to the previous delay, and $q_{diff}=0, 1, \ldots, (2^{Q_{diff}}-1)$ In one example, $$q_{diff} = 0, 1, \ldots, (2^{Q_{diff}} - 1) \text{ and } K = 1 \text{ or } K = 2^{-\left(N-\left(2^{Q_{diff}}-1\right)\right)}$$

$$f(q_y) = K2^{-\left(2^{Q_{diff}}-1-q_y\right)s} = K2^{-\left(2^{Q_{diff}}-1-q_{y-1}-q_{diff}\right)s} \text{ (for } CB_1)$$

$$f(q_y) = 1 - K2^{-\left(2^{Q_{diff}}-1-q_y\right)s} = 1 - K2^{-\left(2^{Q_{diff}}-1-q_{y-1}-q_{diff}\right)s} \text{ (for } CB_2)$$

In one example, $$q_{diff} = 0, 1, \ldots,$$

$$(2^{Q_{diff}} - 1) \text{ and } N = 2^Q - 1 \text{ or } = 2^Q \text{ or } 2^{Q_{diff}} - 1 \text{ or } = 2^{Q_{diff}}$$

$$f(q_y) = 2^{-(N-q_y)s} = 2^{-(N-q_{y-1}-q_{diff})s} \text{ (for } CB_1)$$

$$f(q_y) = 1 - 2^{-(N-q_y)s} = 1 - 2^{-(N-q_{y-1}-q_{diff})s} \text{ (for } CB_2)$$

Reporting scheme 6: For delay $y=0$, the phase is quantized/reported using $CB_i$ (cf. scheme 4), however, for each of the remaining delay (index) $y=1, \ldots, Y-1$, the phase is quantized/reported using $2^{Q_{diff}}$ values from $CB_i$ as $f(q_y)$, as described in scheme 5.

Reporting scheme 7: For delay $y=d$, the phase is quantized/reported using $CB_i$ (cf. scheme 4), however, for each of the remaining delay (index) $y=\{0, 1, \ldots, Y-1\}\backslash\text{(minus)}\{c\}$, the phase is quantized/reported using $2^{Q_{diff}}$ values from $CB_i$ as $f(q_y)$, as described in scheme 6, where d is fixed (e.g., 1) or configured (e.g., via RRC) or reported by the UE.

Figure 18:
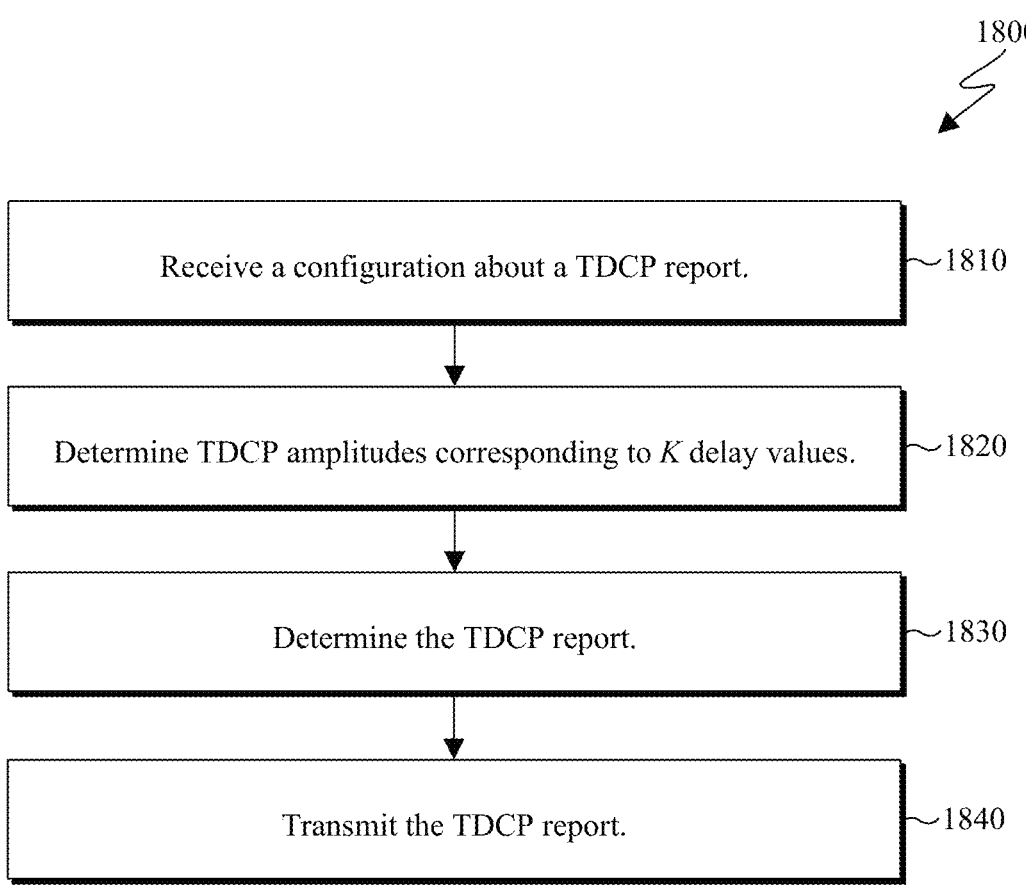
FIG. 18 illustrates an example method performed by a UE in a wireless communication system according to embodiments of the present disclosure.

FIG. 18 illustrates an example method 1800 performed by a UE in a wireless communication system according to embodiments of the present disclosure. The method 1800 of FIG. 18 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1800 is for illustration only and other embodiments can be used without departing from the scope of the present disclosure.

The method 1800 begins with the UE receiving a configuration about a TDCP report 1810. For example, in 1810, the configuration includes information about K delay values $\{\tau_i\}$ for i=1, \ldots, K, where K≥1. In various embodiments, the UE may also transmit, via UE capability reporting, whether values $\tau_i=d>D_{basic}$ can be configured, where $D_{basic}=14$ symbols or 1 slot. In various embodiments, the UE may also transmit, via UE capability reporting, whether a value of K>1 can be configured or whether a TDCP phase report can be configured when K>1.

The UE then determines TDCP amplitudes corresponding to the K delay values 1820. In various embodiments, the delay values $\{\tau_i\}$ belong to a set including at least two values: (i) 4 symbols and (ii) 14 symbols or 1 slot. In various embodiments, a value of K belongs to a set $\{1, x_1, \ldots, x_N\}$ where $x_i>1$ and $N\geq1$. The UE then determines the TDCP report 1830.

The UE then transmits the TDCP report 1840. For example, in 1840, the TDCP report includes (i) indicators $[k_1 \ldots k_K]$ indicating values $[a_1 \ldots a_K]$ and (ii) corresponding TDCP amplitude values obtained from: $1-a_i$, i=1, ..., K, where a mapping from $k_i$ to $a_i$ is given in a table In various embodiments, the UE may also receive information about M NZP CSI-RS resources for tracking, where $M\geq1$, measure the M NZP CSI-RS resources, and determine the TDCP amplitudes based on the measurement. In various embodiments, the TDCP amplitudes correspond to quantized amplitudes of TDCP corresponding to the K delay values, respectively, and the TDCP is defined as a wideband normalized correlation between two CSI-RS transmission occasions, corresponding to the M NZP CSI-RS resources for tracking, that are separated by a delay value $\tau_i$.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive a configuration about a time domain channel property (TDCP) report, the configuration including information about K delay values $\{\tau_i\}$ for i=1, ..., K, where $K\geq1$; and
a processor operably coupled to the transceiver, the processor, based on the configuration, configured to:
determine TDCP amplitudes corresponding to the K delay values, respectively; and
determine the TDCP report,
wherein the transceiver is further configured to transmit the TDCP report, wherein the TDCP report includes indicators $[k_1 \ldots k_K]$ indicating (i) values $[a_1 \ldots a_K]$ and (ii) TDCP amplitude values obtained from: $1-a_i$, i=1, ..., K, where a mapping from $k_i$ to $a_i$ is given in the table below:

| $k_i$ | $a_i$ | $a_i$ (up to 4 decimal places) |
|---|---|---|
| v0 | $\frac{1}{256}$ | 0.0039 |
| v1 | $\frac{1}{128\sqrt{2}}$ | 0.0055 |
| v2 | $\frac{1}{128}$ | 0.0078 |
| v3 | $\frac{1}{64\sqrt{2}}$ | 0.0110 |
| v4 | $\frac{1}{64}$ | 0.0156 |
| v5 | $\frac{1}{32\sqrt{2}}$ | 0.0221 |
| v6 | $\frac{1}{32}$ | 0.0313 |
| v7 | $\frac{1}{16\sqrt{2}}$ | 0.0442 |
| v8 | $\frac{1}{16}$ | 0.0625 |
| v9 | $\frac{1}{8\sqrt{2}}$ | 0.0884 |
| v10 | $\frac{1}{8}$ | 0.1250 |
| v11 | $\frac{1}{4\sqrt{2}}$ | 0.1768 |
| v12 | $\frac{1}{4}$ | 0.2500 |
| v13 | $\frac{1}{2\sqrt{2}}$ | 0.3536 |
| v14 | $\frac{1}{2}$ | 0.5000 |
| v15 | $\frac{1}{\sqrt{2}}$ | 0.7071. |

2. The UE of claim 1, wherein:
the transceiver is further configured to receive information about M non-zero power (NZP) channel state information reference signal (CSI-RS) resources for tracking, where $M\geq1$, and
the processor is further configured to:
measure the M NZP CSI-RS resources, and
determine the TDCP amplitudes based on the measurement.

3. The UE of claim 2, wherein:
the TDCP amplitudes correspond to quantized amplitudes of TDCP corresponding to the K delay values, respectively, and
the TDCP is defined as a wideband normalized correlation between two CSI-RS transmission occasions, corresponding to the M NZP CSI-RS resources for tracking, that are separated by a delay value $\tau_i$.

4. The UE of claim 1, wherein the delay values $\{\tau_i\}$ belong to a set including at least two values: (i) 4 symbols and (ii) 14 symbols or 1 slot.

5. The UE of claim 1, wherein the transceiver is further configured to transmit, via UE capability reporting, whether values $\tau_i=d>D_{basic}$ can be configured, where $D_{basic}=14$ symbols or 1 slot.

6. The UE of claim 1, wherein a value of K belongs to a set $\{1, x_1, \ldots x_N\}$ where $x_i>1$ and $N\geq1$.

7. The UE of claim 6, wherein the transceiver is further configured to transmit, via UE capability reporting, whether a value of K>1 can be configured or whether a TDCP phase report can be configured when K>1.

8. A base station (BS) comprising:
a processor; and
a transceiver operably coupled to the processor, the transceiver configured to:
transmit a configuration about a time domain channel property (TDCP) report, the configuration including information about K delay values $\{\tau_i\}$ for i=1, . . . , K, where K≥1; and
receive the TDCP report that includes indicators $[k_1 \ldots k_K]$ indicating (i) values $[a_1 \ldots a_K]$ and (ii) TDCP amplitude values obtained from: $1-a_i$, i= 1, . . . , K, where a mapping from $k_i$ to $a_i$ is given in the table below:

| $k_i$ | $a_i$ | $a_i$ (up to 4 decimal places) |
|---|---|---|
| v0 | $\dfrac{1}{256}$ | 0.0039 |
| v1 | $\dfrac{1}{128\sqrt{2}}$ | 0.0055 |
| v2 | $\dfrac{1}{128}$ | 0.0078 |
| v3 | $\dfrac{1}{64\sqrt{2}}$ | 0.0110 |
| v4 | $\dfrac{1}{64}$ | 0.0156 |
| v5 | $\dfrac{1}{32\sqrt{2}}$ | 0.0221 |
| v6 | $\dfrac{1}{32}$ | 0.0313 |
| v7 | $\dfrac{1}{16\sqrt{2}}$ | 0.0442 |
| v8 | $\dfrac{1}{16}$ | 0.0625 |
| v9 | $\dfrac{1}{8\sqrt{2}}$ | 0.0884 |
| v10 | $\dfrac{1}{8}$ | 0.1250 |
| v11 | $\dfrac{1}{4\sqrt{2}}$ | 0.1768 |
| v12 | $\dfrac{1}{4}$ | 0.2500 |

-continued

| $k_i$ | $a_i$ | $a_i$ (up to 4 decimal places) |
|---|---|---|
| v13 | $\dfrac{1}{2\sqrt{2}}$ | 0.3536 |
| v14 | $\dfrac{1}{2}$ | 0.5000 |
| v15 | $\dfrac{1}{\sqrt{2}}$ | 0.7071. |

9. The BS of claim 8, wherein:
the transceiver is further configured to transmit information about M non-zero power (NZP) channel state information reference signal (CSI-RS) resources for tracking, where M≥1, and
TDCP amplitudes corresponding to the TDCP amplitude values are based on the M NZP CSI-RS resources.

10. The BS of claim 9, wherein:
the TDCP amplitudes correspond to quantized amplitudes of TDCP corresponding to the K delay values, respectively, and
the TDCP is defined as a wideband normalized correlation between two CSI-RS transmission occasions, corresponding to the M NZP CSI-RS resources for tracking, that are separated by a delay value $\tau_i$.

11. The BS of claim 8, wherein the delay values $\{\tau_i\}$ belong to a set including at least two values: (i) 4 symbols and (ii) 14 symbols or 1 slot.

12. The BS of claim 8, wherein the transceiver is further configured to receive, via user equipment capability reporting, whether values $\tau_i=d>D_{basic}$ can be configured, where $D_{basic}=14$ symbols or 1 slot.

13. The BS of claim 8, wherein a value of K belongs to a set $\{1, x_1, \ldots x_N\}$ where $x_i>1$ and $N\geq1$.

14. The BS of claim 13, wherein the transceiver is further configured to receive, via user equipment capability reporting, whether a value of K>1 can be configured or whether a TDCP phase report can be configured when K>1.

15. A method for operating a user equipment (UE), the method comprising:
receiving a configuration about a time domain channel property (TDCP) report, the configuration including information about K delay values $\{\tau_i\}$ for i=1, . . . , K, where K≥1;
determining, based on the configuration, TDCP amplitudes corresponding to the K delay values, respectively;
determining, based on the configuration, the TDCP report; and
transmitting the TDCP report,
wherein the TDCP report includes indicators $[k_1 \ldots k_K]$ indicating (i) values $[a_1 \ldots a_K]$ and (ii) TDCP amplitude values obtained from: $1-a_i$, i=1, . . . , K, where a mapping from $k_i$ to $a_i$ is given in the table below:

| $k_i$ | $a_i$ | $a_i$ (up to 4 decimal places) |
|---|---|---|
| v0 | $\dfrac{1}{256}$ | 0.0039 |
| v1 | $\dfrac{1}{128\sqrt{2}}$ | 0.0055 |

-continued

| $k_i$ | $a_i$ | $a_i$ (up to 4 decimal places) |
|---|---|---|
| v2 | $\dfrac{1}{128}$ | 0.0078 |
| v3 | $\dfrac{1}{64\sqrt{2}}$ | 0.0110 |
| v4 | $\dfrac{1}{64}$ | 0.0156 |
| v5 | $\dfrac{1}{32\sqrt{2}}$ | 0.0221 |
| v6 | $\dfrac{1}{32}$ | 0.0313 |
| v7 | $\dfrac{1}{16\sqrt{2}}$ | 0.0442 |
| v8 | $\dfrac{1}{16}$ | 0.0625 |
| v9 | $\dfrac{1}{8\sqrt{2}}$ | 0.0884 |
| v10 | $\dfrac{1}{8}$ | 0.1250 |
| v11 | $\dfrac{1}{4\sqrt{2}}$ | 0.1768 |
| v12 | $\dfrac{1}{4}$ | 0.2500 |
| v13 | $\dfrac{1}{2\sqrt{2}}$ | 0.3536 |

-continued

| $k_i$ | $a_i$ | $a_i$ (up to 4 decimal places) |
|---|---|---|
| v14 | $\dfrac{1}{2}$ | 0.5000 |
| v15 | $\dfrac{1}{\sqrt{2}}$ | 0.7071. |

16. The method of claim 15, further comprising:

receiving information about M non-zero power (NZP) channel state information reference signal (CSI-RS) resources for tracking, where M≥1; and measuring the M NZP CSI-RS resources, wherein determine the TDCP amplitudes comprises determining the TDCP amplitudes based on the measurement.

17. The method of claim 16, wherein:

the TDCP amplitudes correspond to quantized amplitudes of TDCP corresponding to the K delay values, respectively, and the TDCP is defined as a wideband normalized correlation between two CSI-RS transmission occasions, corresponding to the M NZP CSI-RS resources for tracking, that are separated by a delay value $\tau_i$.

18. The method of claim 15, wherein the delay values $\{\tau_i\}$ belong to a set including at least two values: (i) 4 symbols and (ii) 14 symbols or 1 slot.

19. The method of claim 15, further comprising transmitting, via UE capability reporting, whether values $\tau_i = d > D_{basic}$ can be configured, where $D_{basic} = 14$ symbols or 1 slot.

20. The method of claim 15, wherein a value of K belongs to a set $\{1, x_1, \ldots x_N\}$ where $x_i > 1$ and N≥1.

* * * * *